US011952559B2

(12) United States Patent
Herbst et al.

(10) Patent No.: US 11,952,559 B2
(45) **Date of Patent: *Apr. 9, 2024**

(54) DETERGENT COMPOSITIONS COMPRISING BACTERIAL MANNANASES

(71) Applicant: AB Enzymes Oy, Rajamäki (FI)

(72) Inventors: Daniela Herbst, Duesseldorf (DE); Susanne Wieland, Dormagen (DE); Nina Mussmann, Willich (DE); Taija Leinonen, Riihimaeki (FI); Leena Valtakari, Rajamaeki (FI); Michael Seefried, Grossostheim (DE); Kari Juntunen, Espoo (FI); Daniela Dollak, Stockstadt a. Rhein (DE); Patrick Lorenz, Stockstadt a. Rhein (DE); Jari Vehmaanperae, Helsinki (FI); Pentti Ojapalo, Tuusula (FI); Terhi Puranen, Nurmijaervi (FI); Kristiina Jaervinen, Espoo (FI)

(73) Assignee: AB Enzymes Oy, Rajamäki (FI)

( * ) Notice: Subject to any disclaimer, the term of this patent is extended or adjusted under 35 U.S.C. 154(b) by 49 days.

This patent is subject to a terminal disclaimer.

(21) Appl. No.: 16/500,603

(22) PCT Filed: Mar. 1, 2018

(86) PCT No.: PCT/EP2018/055007
§ 371 (c)(1),
(2) Date: Oct. 3, 2019

(87) PCT Pub. No.: WO2018/184767
PCT Pub. Date: Oct. 11, 2018

(65) Prior Publication Data
US 2020/0109355 A1 Apr. 9, 2020

(30) Foreign Application Priority Data
Apr. 5, 2017 (EP) .................................... 17164901

(51) Int. Cl.
*C11D 3/386* (2006.01)
*C11D 11/00* (2006.01)
(Continued)

(52) U.S. Cl.
CPC ...... *C11D 3/38636* (2013.01); *C11D 3/38609* (2013.01); *C11D 3/38618* (2013.01);
(Continued)

(58) Field of Classification Search
CPC . C11D 3/38636; C11D 3/0036; C11D 3/3723; C11D 3/386; C11D 3/38681;
(Continued)

(56) References Cited

U.S. PATENT DOCUMENTS

| | | | | |
|---|---|---|---|---|
| 6,376,445 B1 * | 4/2002 | Bettiol | ................. | C11D 3/0036 510/226 |
| 6,420,331 B1 * | 7/2002 | Bettiol | ............... | C11D 3/38636 510/137 |

(Continued)

FOREIGN PATENT DOCUMENTS

| | | |
|---|---|---|
| CN | 105754970 A | 7/2016 |
| WO | 9964619 A2 | 12/1999 |
| WO | WO 2018/185367 | 11/2018 |

OTHER PUBLICATIONS

Stephen F. Altschul, Warren Gish, Webb Miller , Eugene W. Myers, David J. Lipman, Basic local alignment search tool, 1990, Journal of Molecular Biology, vol. 215, Issue 3, pp. 403-410 (Abstract only) (Year: 1990).*

(Continued)

*Primary Examiner* — David W Berke-Schlessel
*Assistant Examiner* — Trent R Clarke
(74) *Attorney, Agent, or Firm* — KNOBBE MARTENS OLSON & BEAR LLP

(57) ABSTRACT

This present disclosure relates to novel detergent compositions comprising bacterial mannanase enzymes. The deter-
(Continued)

gent compositions comprising bacterial mannanases are useful in laundry and cleaning applications wherein degradation or modification of mannan is desired. The present disclosure also relates to the use of said detergent compositions in laundry and cleaning applications as well as a method for degrading mannan.

8 Claims, 7 Drawing Sheets

Specification includes a Sequence Listing.

(51) Int. Cl.
*C11D 17/00* (2006.01)
*C11D 17/04* (2006.01)
*C11D 17/06* (2006.01)

(52) U.S. Cl.
CPC ...... *C11D 3/38627* (2013.01); *C11D 3/38645* (2013.01); *C11D 3/38654* (2013.01); *C11D 3/38681* (2013.01); *C11D 11/0017* (2013.01); *C11D 17/0069* (2013.01); *C11D 17/0078* (2013.01); *C11D 17/043* (2013.01); *C11D 17/044* (2013.01); *C11D 17/045* (2013.01); *C11D 17/06* (2013.01)

(58) Field of Classification Search
CPC ... C11D 3/3942; C11D 3/122; C11D 3/38609; C11D 3/38627; C11D 3/38645; C11D 11/0023; C11D 1/525; C11D 1/72; C11D 3/3905; C11D 3/3945; C11D 3/38618; C11D 3/38654; C11D 11/0017; C11D 17/0069; C11D 17/0078; C11D 17/043; C11D 17/044; C11D 17/045; C11D 17/06; C12N 9/20; C12N 15/52; C12N 9/2448; C12N 9/248; C12N 9/2482; C12N 9/2491; C12Y 301/01; C12Y 302/01008; C12Y 302/01025; C12Y 302/01073; C12Y 302/01078; A23L 29/06; A61K 38/47
See application file for complete search history.

(56) References Cited

U.S. PATENT DOCUMENTS

| | | | | |
|---|---|---|---|---|
| 6,440,911 | B1 * | 8/2002 | Bettiol | C11D 3/0036<br>510/119 |
| 6,566,114 | B1 * | 5/2003 | Kauppinen | C12N 9/2491<br>435/211 |
| 6,964,943 | B1 * | 11/2005 | Bettiol | C11D 1/525<br>510/300 |
| 10,760,037 | B2 * | 9/2020 | Malten | C12N 9/20 |
| 2015/0175992 | A1 * | 6/2015 | Sibbesen | A61K 38/47<br>424/94.62 |
| 2019/0071619 | A1 * | 3/2019 | Malten | C12N 9/20 |
| 2019/0382691 | A1 * | 12/2019 | Weber | C12N 9/2448 |

OTHER PUBLICATIONS

Masahiro Yuki et al., Draft Genome Sequences of Three Alkaliphilic *Bacillus* Strains, *Bacillus wakoensis* JCM 9140T, *Bacillus akibai* JCM 9157T, and *Bacillus hemicellulosilyticus* JCM 9152, 2014, Genome Announc. vol. 2, Issue 1, e01258-13, pp. 1-2 (Year: 2014).*

Hattori, M., Oshima, K., Inaba, H., Suda, W., Sakamoto, M., Iino, T., Kitahara, M., Oshida, Y. , Iida, T., Kudo, T., Itoh, T., Yuki, M. and Ohkuma, M, mannanase [*Alkalihalobacillus hemicellulosilyticus* JCM 9152], GenBank document GAE32229.1, available online since Sep. 15, 2015 (Year: 2015).*

* cited by examiner

1. Man6 Tr
2. Man7 Tr
3. Man14
4. Man6 Bs
5. Man7 Bs
6. Mw -marker

DETERGENT COMPOSITIONS COMPRISING BACTERIAL MANNANASES

CROSS-REFERENCE TO RELATED APPLICATION

This application is a U.S. National-Stage entry under 35 U.S.C. § 371 based on International Application No. PCT/EP2018/055007, filed Mar. 1, 2018, which was published under PCT Article 21(2) and which claims priority to European Application No. 17164901.5, filed Apr. 5, 2017, which are all hereby incorporated in their entirety by reference.

TECHNICAL FIELD

This present disclosure relates to novel detergent compositions comprising bacterial mannanase enzymes. The detergent compositions comprising bacterial mannanases are useful in laundry and cleaning applications wherein degradation or modification of mannan is desired. The present disclosure also relates to the use of said detergent compositions in laundry and cleaning applications as well as a method for degrading mannan.

BACKGROUND

Mannans are mannose containing polysaccharides found in various plants. Mannans are poorly soluble in an aqueous environment and their physicochemical properties give rise to viscous dispersions. Additionally, mannans have high water-binding capacity. All of these characteristics cause problems in several industries including brewing, baking, animal nutrition, and laundry and cleaning applications.

In plant based diets different B-mannans are present and depending on their amounts and properties they can compromise nutrient digestion, microbial colonisation and growth performance. Enzymatic degradation of mannans reduces digesta viscosity of high water soluble mannans and leads to production of manno-oligosaccharides that may form water-insoluble linear mannans present in leguminoseae. Mannanase increases average daily gain, feed efficiency, weight uniformity and livability in all monogastric animals.

For animal feed applications, such as feed for monogastric animals with cereal diets, mannan is a contributing factor to viscosity of gut contents and it thereby adversely affects the feed digestibility and animal growth rate. For ruminants, mannan represents a substantial component of fiber intake and a more complete digestion of mannan would facilitate higher feed conversion efficiencies.

For laundry and cleaning applications detergent compositions comprising mannanase can be used to degrade mannan. However, providing mannanases that are stable in varying storage and use conditions while still showing good mannan degrading activity is difficult.

BRIEF SUMMARY

It is an object of the present disclosure to provide detergent compositions comprising novel enzymes exhibiting mannanase activity when applied in these detergent compositions. It is a further object of the present disclosure to provide detergent compositions having increased stain removal performance on mannan containing stains.

This disclosure provides a detergent composition comprising at least one enzyme having an amino acid sequence having at least about 74% sequence identity to the amino acid sequence of SEQ ID NO: 16, about 95% sequence identity to the amino acid sequence of SEQ ID NO: 12, and/or about 79% sequence identity to the amino acid sequence of SEQ ID NO: 20.

According to the first aspect of the present disclosure there is provided a detergent composition comprising at least one enzyme having an amino acid sequence having at least about 74% sequence identity to the amino acid sequence of SEQ ID NO: 16 (Man7), and/or about 93% sequence identity to the amino acid sequence of SEQ ID NO: 12 (Man6), and/or about 79% sequence identity to the amino acid sequence of SEQ ID NO: 20 (Man14).

In one embodiment as contemplated herein the at least one enzyme has an amino acid sequence having at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% sequence identity to SEQ ID NO: 16.

In one embodiment as contemplated herein the at least one enzyme has an amino acid sequence having at least about 94%, at least about 95%, at least about 96%, at least about 97%, at least about 98%, or at least about 99% sequence identity to SEQ ID NO: 12.

In a further embodiment of the present disclosure the at least one enzyme has mannan degrading activity. The mannanases comprised in the detergent composition of the present disclosure are suitable for degrading and modifying mannan containing material in various chemical environments, preferably in detergent compositions.

In one embodiment of the present disclosure the detergent composition further comprises one or more additional enzymes selected from the group including protease, lipase, cutinase, amylase, carbohydrase, cellulase, pectinase, pectatlyase, mannanase, arabinase, galactanase, xylanase, oxidase, xanthanase, laccase, and/or peroxidase, preferably selected from the group including proteases, amylases, cellulases and lipases.

In a further embodiment of the present disclosure the detergent composition is in form of a bar, a homogenous tablet, a tablet having two or more layers, a pouch having one or more compartments, a regular or compact powder, a granule, a paste, a gel, or a regular, compact or concentrated liquid. In one embodiment the detergent composition can be a laundry detergent composition, preferably a liquid or solid laundry detergent composition.

The present disclosure furthermore relates to the use of the detergent composition as herein disclosed for degrading mannan.

In a further embodiment the present disclosure relates to the use of the detergent composition as herein disclosed in a laundry process.

The present disclosure furthermore relates to a method for removing a stain from a surface, comprising contacting the surface with a detergent composition as herein disclosed.

The present disclosure also relates to a method for degrading mannan comprising applying a detergent composition as herein disclosed to mannan, preferably wherein the mannan is on the surface of a textile.

BRIEF DESCRIPTION OF THE DRAWINGS

The present disclosure will hereinafter be described in conjunction with the following drawing figures, wherein like numerals denote like elements, and.

SEQUENCE LISTINGS

Figure 1:
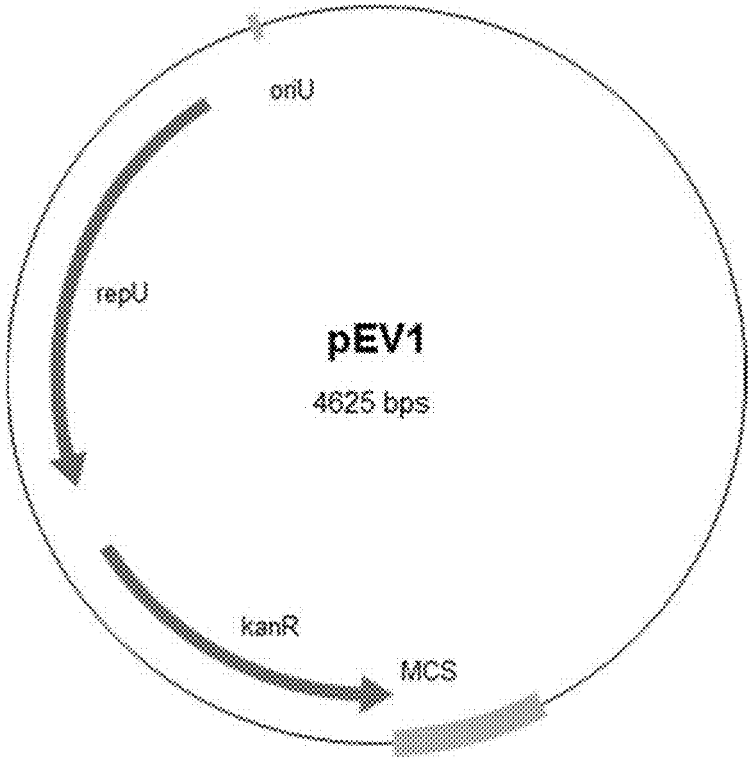
FIG. 1 shows schematic representation of vector pEV1 for replication in *Bacillus.*

SEQ ID NO: 1 Sequence of the oligonucleotide primer Man6_1

SEQ ID NO: 2 Sequence of the oligonucleotide primer Man6_2

SEQ ID NO: 3 Sequence of the oligonucleotide primer Man7_1

SEQ ID NO: 4 Sequence of the oligonucleotide primer Man7_2

SEQ ID NO: 5 Sequence of the oligonucleotide primer Man14_1

SEQ ID NO: 6 Sequence of the oligonucleotide primer Man14_2

SEQ ID NO: 7 Sequence of the oligonucleotide primer Vec_1

SEQ ID NO: 8 Sequence of the oligonucleotide primer Vec_2

SEQ ID NO: 9 The nucleotide sequence of the *Bacillus clausii* man6

SEQ ID NO: 10 The nucleotide sequence of the *Bacillus clausii* man6 without signal peptide encoding sequence and with codon optimization to *Trichoderma reesei*

SEQ ID NO: 11 The deduced amino acid sequence of the *Bacillus clausii* Man6

SEQ ID NO: 12 The deduced amino acid sequence of the *Bacillus clausii* Man6 without signal peptide SEQ ID NO: 13 The nucleotide sequence of the *Bacillus* hemicellulosilyticus man7

SEQ ID NO:14 The nucleotide sequence of the *Bacillus* hemicellulosilyticus man7 without signal peptide encoding sequence and with codon optimization to *Trichoderma reesei*

SEQ ID NO: 15 The deduced amino acid sequence of the *Bacillus* hemicellulosilyticus Man7

SEQ ID NO: 16 The deduced amino acid sequence of the *Bacillus* hemicellulosilyticus Man7 without signal peptide SEQ ID NO: 17 The nucleotide sequence of the *Virgibacillus soli* man14

SEQ ID NO: 18 The nucleotide sequence of the *Virgibacillus soli* man14 without signal peptide encoding sequence and with codon optimization to *Trichoderma reesei*

SEQ ID NO: 19 The deduced amino acid sequence of the *Virgibacillus soli* Man14

SEQ ID NO: 20 The deduced amino acid sequence of the *Virgibacillus soli* Man14 without signal peptide SEQ ID NO: 21 Sequence of the oligonucleotide primer BMAN1

SEQ ID NO: 22 Sequence of the oligonucleotide primer BMAN2

SEQ ID NO: 23 Sequence of the oligonucleotide primer BMAN3

SEQ ID NO: 24 Sequence of the oligonucleotide primer BMAN4

SEQ ID NO: 25 The nucleotide sequence of *Bacillus pumilus* man31

SEQ ID NO: 26 The deduced amino acid sequence of the *Bacillus pumilus* Man31

SEQ ID NO: 27 The nucleotide sequence of the *Bacillus amyloliquefaciens* man32

SEQ ID NO: 28 The deduced amino acid sequence of the *Bacillus amyloliquefaciens* Man32

SEQ ID NO: 29 The nucleotide sequence of the *Amphibacillus xylanus* man33

SEQ ID NO: 30 The deduced amino acid sequence of the *Amphibacillus xylans* Man33

SEQ ID NO: 31 The nucleotide sequence of the *Paenibacillus polymyxa* man34

SEQ ID NO: 32 The deduced amino acid sequence of the *Paenibacillus polymyxa* Man34

SEQ ID NO: 33 The nucleotide sequence of the *Bacillus hemicellulosilyticus* man35

SEQ ID NO: 34 The deduced amino acid sequence of the *Bacillus hemicellulosilyticus* Man35

SEQ ID NO: 35 The nucleotide sequence of the *Bacillus alcalophilus* man36

SEQ ID NO: 36 The deduced amino acid sequence of the *Bacillus alcalophilus* Man36

SEQ ID NO: 37 The nucleotide sequence of the *Bacillus* sp. man37

SEQ ID NO: 38 The deduced amino acid sequence of the *Bacillus* sp. Man37

SEQ ID NO: 39 The nucleotide sequence of the *Bacillus circulans* man38

SEQ ID NO: 40 The deduced amino acid sequence of the *Bacillus circulans* Man38

SEQ ID NO: 41 The nucleotide sequence of the *Paenibacillus* sp. man39

SEQ ID NO: 42 The deduced amino acid sequence of the *Paenibacillus* sp. Man39

SEQ ID NO: 43 The nucleotide sequence of the *Bacillus circulans* man40

SEQ ID NO: 44 The deduced amino acid sequence of the *Bacillus circulans* Man40

SEQ ID NO: 45 The nucleotide sequence of the *Bacillus nealsonii* man41

SEQ ID NO: 46 The deduced amino acid sequence of the *Bacillus nealsonii* Man41

SEQ ID NO: 47 The nucleotide sequence of the *Bacillus circulans* man42

SEQ ID NO: 48 The nucleotide sequence of the *Bacillus circulans* Man42

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

As used herein, "isolated" means a substance in a form or environment that does not occur in nature. Non-limiting examples of isolated substances include (1) any non-naturally occurring substance, (2) any substance including any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing or decreasing the amount of the substance relative to other components with which it is naturally associated (e.g., recombinant production in a host cell; one or multiple copies of a gene encoding the substance; and use of an alternative promoter to the promoter naturally associated with the gene encoding the substance). In an embodiment a polypeptide, enzyme, polynucleotide, host cell or composition of the present disclosure is isolated.

As used herein, the term "comprising" includes the broader meanings of "including", "containing", and "comprehending", as well as the narrower expressions "including" and "consisting only of".

As used herein, "fragment" means a protein or a polynucleotide having one or more amino acids or nucleotides deleted. In the context of DNA, a fragment includes both single stranded and double stranded DNA of any length. A fragment may be an active fragment which has the biological function, such as enzyme activity or regulatory activity, of the protein or the polynucleotide. A fragment may also be an inactive fragment, i.e. it does not have one or more biological effects of the native protein or polynucleotide.

As used herein, "variant" means a fragment of sequence (nucleotide or amino acid) inserted or deleted by one or more nucleotides/amino acids or which is chemically modified.

As used herein, a "peptide" and a "polypeptide" are amino acid sequences including a plurality of consecutive polymerized amino acid residues. For purpose of this present disclosure, peptides are molecules including up to about 20 amino acid residues, and polypeptides include more than about 20 amino acid residues. The peptide or polypeptide may include modified amino acid residues, naturally occurring amino acid residues not encoded by a codon, and non-naturally occurring amino acid residues. As used herein, a "protein" may refer to a peptide or a polypeptide of any size. A protein may be an enzyme, a protein, an antibody, a membrane protein, a peptide hormone, regulator, or any other protein.

The term "polynucleotide" denotes a single- or double-stranded polymer of deoxyribonucleotide or ribonucleotide bases read from the 5' to the 3' end. Polynucleotides include RNA and DNA, and may be isolated from natural sources, synthesized in vitro, or prepared from a combination of natural and synthetic molecules.

As used herein, "modification", "modified", and similar terms in the context of polynucleotides refer to modification in a coding or a non-coding region of the polynucleotide, such as a regulatory sequence, 5' untranslated region, 3' untranslated region, up-regulating genetic element, down-regulating genetic element, enhancer, suppressor, promoter, exon, or intron region. The modification may in some embodiments be only structural, having no effect on the biological effect, action or function of the polynucleotide. In other embodiments the modification is a structural modification which provides a change in the biological effect, action or function of the polynucleotide. Such a modification may enhance, suppress or change the biological function of the polynucleotide.

As used herein, "identity" means the percentage of exact matches of amino acid residues between two aligned sequences over the number of positions where there are residues present in both sequences. When one sequence has a residue with no corresponding residue in the other sequence, the alignment program allows a gap in the alignment, and that position is not counted in the denominator of the identity calculation. Identity is a value determined with the Pairwise Sequence Alignment tool EMBOSS Needle at the EMBL-EBI web site (www.ebi.ac.uk/Tools/psa/emboss_needle/).

As used herein, "host cell" means any cell type that is susceptible to transformation, transfection, transduction, mating, crossing or the like with a nucleic acid construct or expression vector comprising a polynucleotide. The term "host cell" encompasses any progeny that is not identical due to mutations that occur during replication. Non-limiting examples of a host cell are fungal cells, filamentous fungal cells from Division Ascomycota, Subdivision Pezizomycotina; preferably from the group including members of the Class Sordariomycetes, Subclass Hypocreomycetidae, Orders Hypocreales and Microascales and *Aspergillus, Chrysosporium, Myceliophthora* and *Humicola*; more preferably from the group including Families Hypocreacea, Nectriaceae, Clavicipitaceae, Microascaceae, and Genera *Trichoderma* (anamorph of *Hypocrea*), *Fusarium, Gibberella, Nectria, Stachybotrys, Claviceps, Metarhizium, Villosiclava, Ophiocordyceps, Cephalosporium*, and *Scedosporium*; more preferably from the group including *Trichoderma reesei* (*Hypocrea jecorina*), *T. citrinoviridae, T. longibrachiatum, T. virens, T. harzianum, T. asperellum, T. atroviridae, T. parareesei, Fusarium oxysporum, F. gramineanum, F. pseudograminearum, F. venenatum, Gibberella fujikuroi, G. moniliformis, G. zeaea, Nectria* (Haematonectria) *haematococca, Stachybotrys chartarum, S. chlorohalonata, Claviceps purpurea, Metarhizium acridum, M. anisopliae, Villosiclava virens, Ophiocordyceps sinensis, Acremonium* (*Cephalosporium*) *chrysogenum*, and *Scedosporium apiospermum*, and *Aspergillus niger, Aspergillus awamori, Aspergillus oryzae, Chrysosporium lucknowense, Myceliophthora thermophila, Humicola insolens*, and *Humicola grisea*, most preferably *Trichoderma reesei*. Non-limiting examples of a host cell are bacterial cells, preferably gram positive Bacilli (e.g. *B. subtilis, B. licheniformis, B. megaterium, B. amyloliquefaciens, B. pumilus*), actinomycetales (e.g. *Streptomyces* sp.) and yeasts (e.g. *Saccharomyces cerevisiae, Pichia pastoris, Yarrowia lipolytica*).

In an example embodiment of the host cell is a fungal cell, preferably a filamentous fungal cell, such as *Trichoderma* or *Trichoderma reesei*. In an example embodiment of the host cell is a bacterial cell, preferably a gram positive *Bacillus* cell, such as *B. subtilis, B. licheniformis, B. megaterium, B. amyloliquefaciens, B. pumilus.*

A "recombinant cell" or "recombinant host cell" refers to a cell or host cell that has been genetically modified or altered to comprise a nucleic acid sequence which is not native to said cell or host cell. In an embodiment the genetical modification comprises integrating the polynucleotide in the genome of the host cell. In another embodiment the polynucleotide is exogenous compared to the host cell.

As used herein, "expression" includes any step involved in the production of a polypeptide in a host cell including, but not limited to, transcription, translation, post-translational modification, and secretion. Expression may be followed by the harvesting, i.e. recovering, the host cells or the expressed product.

The term "expression vector" denotes a DNA molecule, linear or circular, that comprises a segment encoding a polypeptide of interest operably linked to additional segments that provide for its transcription. Such additional segments may include promoter and terminator sequences, and may optionally include one or more origins of replication, one or more selectable markers, an enhancer, a polyadenylation signal, carrier and the like. Expression vectors are generally derived from plasmid or viral DNA, or may contain elements of both. The expression vector may be any expression vector that is conveniently subjected to recombinant DNA procedures, and the choice of vector will often depend on the host cell into which the vector is to be introduced. Thus, the vector may be an autonomously replicating vector, i.e. a vector, which exists as an extrachromosomal entity, the replication of which is independent of chromosomal replication, e.g. a plasmid. Alternatively, the vector may be one which, when introduced into a host cell, is integrated into the host cell genome and replicated together with the chromosome(s) into which it has been integrated.

The term "recombinant expressed" or "recombinantly expressed" used herein in connection with expression of a polypeptide or protein is defined according to the standard definition in the art.

The term "obtained from" and "obtainable" as used herein in connection with a specific microbial source, means that the polynucleotide and/or polypeptide is produced by the specific source (homologous expression), or by a cell in which a gene from the source has been inserted (heterologous expression).

The term "enzyme composition" means either a conventional enzymatic fermentation product, possibly isolated and purified, from a single species of a microorganism, such preparation usually comprising a number of different enzymatic activities; or a mixture of monocomponent enzymes, preferably enzymes derived from bacterial or fungal species by using conventional recombinant techniques, which enzymes have been fermented and possibly isolated and purified separately and which may originate from different species, preferably fungal or bacterial species or the fermentation product of a microorganism which acts as a host cell for expression of a recombinant mannanase, but which microorganism simultaneously produces other enzymes.

The term "operably linked", when referring to DNA segments, denotes that the segments are arranged so that they function in concert for their intended purposes, e.g. transcription initiates in the promoter and proceeds through the coding segment to the terminator.

The term "promoter" denotes a portion of a gene containing DNA sequences that provide for the binding of RNA polymerase and initiation of transcription. Promoter sequences are commonly, but not always, found in the 5' non-coding regions of genes.

The term "secretory signal sequence" denotes a DNA sequence that encodes a polypeptide (a "secretory peptide") that, as a component of a larger polypeptide, directs the larger polypeptide through a secretory pathway of a host cell in which it is synthesized. The secretory signal sequence can be native or it can be replaced with secretory signal sequence or carrier sequence from another source. Depending on the host cell, the larger peptide may be cleaved to remove the secretory peptide during transit through the secretory pathway.

The term "core region" denotes a domain of an enzyme which may or may not have been modified or altered, but which has retained its original activity; the catalytic domain as known in the art has remained functional.

By the term "linker" or "spacer" is meant a polypeptide comprising at least two amino acids which may be present between the domains of a multidomain protein, for example an enzyme comprising an enzyme core and a binding domain such as a carbohydrate binding module (CBM) or any other enzyme hybrid, or between two proteins or polypeptides expressed as a fusion polypeptide, for example a fusion protein comprising two core enzymes. For example, the fusion protein of an enzyme core with a CBM is provided by fusing a DNA sequence encoding the enzyme core, a DNA sequence encoding the linker and a DNA sequence encoding the CBM sequentially into one open reading frame and expressing this construct.

The term "detergent composition", includes unless otherwise indicated, granular or powder-form all-purpose or heavy-duty washing agents, especially cleaning detergents; liquid, gel or paste-form all-purpose washing agents, especially the so-called heavy-duty liquid (HDL) types; liquid fine-fabric detergents; hand dishwashing agents or light duty dishwashing agents, especially those of the high-foaming type; machine dishwashing agents, including the various tablet, granular, liquid and rinse-aid types for household and institutional use; liquid cleaning and disinfecting agents, car or carpet shampoos, bathroom cleaners; metal cleaners; as well as cleaning auxiliaries such as bleach additives and "stain-stick" or pre-treat types. The terms "detergent composition" and "detergent formulation" are used in reference to mixtures which are intended for use in a wash medium for the cleaning of soiled objects. In some embodiments, the term is used in reference to laundering fabrics and/or garments (e.g., "laundry detergents"). In alternative embodiments, the term refers to other detergents, such as those used to clean dishes, cutlery, etc. (e.g., "dishwashing detergents"). It is not intended that the present disclosure be limited to any particular detergent formulation or composition. It is intended that in addition to the variants as contemplated herein, the term encompasses detergents that may contain, e.g., surfactants, builders, chelators or chelating agents, bleach system or bleach components, polymers, fabric conditioners, foam boosters, suds suppressors, dyes, perfume, tannish inhibitors, optical brighteners, bactericides, fungicides, soil suspending agents, anticorrosion agents, enzyme inhibitors or stabilizers, enzyme activators, transferase(s), hydrolytic enzymes, oxido reductases, bluing agents and fluorescent dyes, antioxidants, and solubilizers.

The term "textile" means any textile material including yarns, yarn intermediates, fibers, non-woven materials, natural materials, synthetic materials, and any other textile material, fabrics made of these materials and products made from fabrics (e.g., garments and other articles). The textile or fabric may be in the form of knits, wovens, denims, non-wovens, felts, yarns, and towelling. The textile may be cellulose based such as natural cellulosics, including cotton, flax/linen, jute, ramie, sisal or coir or manmade cellulosics (e.g. originating from wood pulp) including viscose/rayon, ramie, cellulose acetate fibers (tricell), lyocell or blends thereof. The textile or fabric may also be non-cellulose based such as natural polyamides including wool, camel, cashmere, mohair, rabit and silk or synthetic polymer such as nylon, aramid, polyester, acrylic, polypropylen and spandex/elastane, or blends thereof as well as blend of cellulose based and non-cellulose based fibers. Examples of blends are blends of cotton and/or rayon/viscose with one or more companion material such as wool, synthetic fibers (e.g. polyamide fibers, acrylic fibers, polyester fibers, polyvinyl alcohol fibers, polyvinyl chloride fibers, polyurethane fibers, polyurea fibers, aramid fibers), and cellulose-containing fibers (e.g. rayon/viscose, ramie, flax/linen, jute, cellulose acetate fibers, lyocell). Fabric may be conventional washable laundry, for example stained household laundry. When the term fabric or garment is used it is intended to include the broader term textiles as well.

The term "stability" includes storage stability and stability during use, e.g. during a wash process (in wash stability) and reflects the stability of the protease variant as contemplated herein as a function of time e.g. how much activity is retained when the protease is kept in solution, in particular in a detergent solution. The stability is influenced by many factors e.g. pH, temperature, detergent composition e.g. amount of builder, surfactants etc. The protease stability may be measured using the 'stability assay' as described in the Materials and Methods section herein. The term "improved stability" or "increased stability" is defined herein as a variant protease displaying an increased stability in solutions, relative to the stability of the parent protease. The terms "improved stability" and "increased stability" includes "improved chemical stability", "detergent stability" or "improved detergent stability.

Detergent Composition

The present disclosure relates to novel detergent compositions comprising bacterial mannanase enzymes. The detergent compositions comprising bacterial mannanases are useful in laundry and cleaning applications wherein degradation or modification of mannan is desired. The present disclosure also relates to the use of said detergent compositions in laundry and cleaning applications as well as a method for degrading mannan.

As used herein, the term "mannan" refers to polysaccharides including a mannose backbone linked together by β-1,4-linkages with side-chains of galactose attached to the backbone by α-1,6-linkages. Mannans comprise plant based material such as guar gum and locust bean gum. Glucomannans are polysaccharides having a backbone of more or less regularly alternating β-1,4 linked mannose and glucose, galactomannans and galactoglucomannans are mannans and glucomannans with alpha-1,6 linked galactose sidebranches.

As used herein, the term "mannanase" or "galactomannanase" denotes a mannanase enzyme defined according to the art as mannan endo-1,4-beta-mannosidase and having the alternative names beta-mannanase and endo-1,4-mannanase and catalysing hydrolysis of 1,4-beta-D-mannosidic linkages in mannans, galactomannans, glucomannans, and galactoglucomannans. Mannanases are classified according to the Enzyme Nomenclature as EC 3.2.1.78.

"Mannanase activity" as used herein refers to the mannan degrading activity of a polypeptide. Degrading or modifying as used herein means that mannose units are hydrolyzed from the mannan polysaccharide by the mannanase. The mannan degrading activity of the polypeptides according to present disclosure can be tested according to standard test procedures known in the art. Example 7 provides an example of a standard method for determining mannanase activity.

According to the first aspect the detergent composition of the present disclosure comprises at least one enzyme having an amino acid sequence having at least about 74% sequence identity to the amino acid sequence of SEQ ID NO: 16 (Manz), and/or about 93% sequence identity to the amino acid sequence of SEQ ID NO: 12 (Man6), and/or about 79% sequence identity to the amino acid sequence of SEQ ID NO: 20 (Man14).

In one embodiment as contemplated herein the at least one enzyme has an amino acid sequence having at least about 75%, at least about 76%, at least about 77%, at least about 78%, at least about 79%, at least about 80%, at least about 81%, at least about 82%, at least about 83%, at least about 84%, at least about 85%, at least about 86%, at least about 87%, at least about 88%, at least about 89%, at least about 90%, at least about 91%, at least about 92%, at least about 93%, at least about 94%, at least about 95%, at least about 96%, at least about 97%, at least about 98%, or at least about 99% sequence identity to the amino acid sequence of SEQ ID NO: 16.

In one embodiment as contemplated herein the at least one enzyme has an amino acid sequence having at least about 94%, at least about 95%, at least about 96%, at least about 97%, at least about 98%, or at least about 99% sequence identity to the amino acid sequence of SEQ ID NO: 12.

In a further embodiment of the present disclosure the at least one enzyme has mannan degrading activity. The mannanases comprised in the detergent composition of the present disclosure are suitable for degrading and modifying mannan containing material in various chemical environments, preferably in detergent compositions.

In one embodiment of the present disclosure the detergent composition further comprises one or more additional enzymes selected from the group including protease, lipase, cutinase, amylase, carbohydrase, cellulase, pectinase, pectatlyase, mannanase, arabinase, galactanase, xylanase, oxidase, xanthanase, laccase, and/or peroxidase, preferably selected from the group including proteases, amylases, cellulases and lipases.

In general the properties of the selected enzyme(s) should be compatible with the selected detergent, (i.e., pH-optimum, compatibility with other enzymatic and non-enzymatic ingredients, etc.), and the enzyme(s) should be present in effective amounts.

Cellulases

Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259. Especially suitable cellulases are the alkaline or neutral cellulases having color care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299._Example of cellulases exhibiting endo-beta-1,4-glucanase activity (EC 3.2.1.4) are those having described in WO02/099091. Other examples of cellulases include the family 45 cellulases described in WO96/29397, and especially variants thereof having substitution, insertion and/or deletion at one or more of the positions corresponding to the following positions in SEQ ID NO: 8 of WO 02/099091: 2, 4, 7, 8, 10, 13, 15, 19, 20, 21, 25, 26, 29, 32, 33, 34, 35, 37, 40, 42, 42a, 43, 44, 48, 53, 54, 55, 58, 59, 63, 64, 65, 66, 67, 70, 72, 76, 79, 80, 82, 84, 86, 88, 90, 91, 93, 95, 95d, 95h, 95j, 97, 100, 101, 102, 103, 113, 114, 117, 119, 121, 133, 136, 137, 138, 139, 140a, 141, 143a, 145, 146, 147, 150e, 150j, 151, 152, 153, 154, 155, 156, 157, 158, 159, 160c, 160e, 160k, 161, 162, 164, 165, 168, 170, 171, 172, 173, 175, 176, 178, 181, 183, 184, 185, 186, 188, 191, 192, 195, 196, 200, and/or 20, preferably selected among P19A, G20K, Q44K, N48E, Q119H or Q146R. Commercially available cellulases include Celluclean™ Celluzyme™, and Carezyme™ (Novozymes A/S), Clazinase™, and Puradax HA™ (Genencor International Inc.), and KAC-500(B)™ (Kao Corporation).

Proteases

Suitable proteases include those of bacterial, fungal, plant, viral or animal origin e.g. vegetable or microbial origin. Microbial origin is preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from e.g. family M4 or other metalloprotease such as those from M5, M7 or M8 families.

The term "subtilases" refers to a sub-group of serine protease according to Siezen et al., Protein Engng. 4 (1991) 719-737 and Siezen et al. Protein Science 6 (1997) 501-523. Serine proteases are a subgroup of proteases exemplified by having a serine in the active site, which forms a covalent adduct with the substrate. The subtilases may be divided into 6 sub-divisions, i.e. the Subtilisin family, the Thermitase family, the Proteinase K family, the Lantibiotic peptidase family, the Kexin family and the Pyrolysin family. Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO09/021867, and subtilisin *lentus*, subtilisin Novo, subtilisin Carlsberg, *Bacillus licheniformis*, subtilisin BPN', subtilisin 309, subtilisin 147 and subtilisin 168 described in WO89/06279 and protease PD138 described in (WO93/18140). Other useful proteases may be those described in WO92/175177, WO01/016285, WO02/026024 and WO02/016547. Examples of trypsin-like proteases are trypsin (e.g. of porcine or bovine origin) and the *Fusarium* protease described in WO89/06270, WO94/25583 and WO05/040372, and the chymotrypsin proteases derived from Cellumonas described in WO05/052161 and WO05/052146. A further preferred protease is the alkaline protease from *Bacillus lentus* DSM 5483, as described for example in WO95/23221, and variants thereof, which are described in WO92/21760, WO95/23221, EP1921147 and EP1921148. Examples of metalloproteases are the neutral metalloprotease as described in WO07/044993 (Genencor Int.) such as those derived from *Bacillus amyloliquefaciens*.

Examples of useful proteases are the variants described in: WO92/19729, WO96/034946, WO98/20115, WO98/20116, WO99/011768, WO01/44452, WO03/006602, WO04/03186, WO04/041979, WO07/006305, WO11/036263, WO11/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the subtilase variants may comprise the mutations: S3T, V41, S9R, A15T, K27R, *36D, V68A, N76D, N87S,R, *97E, A98S, S99G,D,A, S99AD, S101G,M,R S103A, V1041,Y,N, S106A, G118V,R, H120D,N, N123S, S128L, P129Q, S130A, G160D, Y167A, R170S, A194P, G195E, V199M, V2051, L217D, N218D, M222S, A232V, K235L, Q236H, Q245R, N252K, T274A (using BPN' numbering). Suitable commercially available protease enzymes include those sold under the trade names Alcalase®, Duralase$^{T}$m, Durazym$^T$m, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® (Novozymes A/S), those sold under the tradename Maxatase®, Maxacal®, Maxapem®, Purafect®, Purafect Prime®, Preferenz™, Purafect MA®, Purafect Ox®, Purafect OxP®, Puramax®, Properase®, Effectenz$^T$m, FN2®, FN3®, FN4®, Excellase®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Lipases and Cutinases

Suitable lipases and cutinases include those of bacterial or fungal origin. Chemically modified or protein engineered mutant enzymes are included. Examples include lipase from *Thermomyces*, e.g. from *T. lanuginosus* (previously named *Humicola lanuginosa*) as described in EP258068 and EP305216, cutinase from *Humicola*, e.g. *H. insolens* (WO96/13580), lipase from strains of *Pseudomonas* (some of these now renamed to *Burkholderia*), e.g. *P. alcaligenes* or *P. pseudoalcaligenes* (EP218272), *P. cepacia* (EP331376), P. sp. strain SD705 (WO95/06720 & WO96/27002), *P. wisconsinensis* (WO96/12012), GDSL-type *Streptomyces* lipases (WO10/065455), cutinase from *Magnaporthe grisea* (WO10/107560), cutinase from *Pseudomonas mendocina* (U.S. Pat. No. 5,389,536), lipase from *Thermobifida fusca* (WO11/084412), *Geobacillus stearothermophilus* lipase (WO11/084417), lipase from *Bacillus subtilis* (WO11/084599), and lipase from *Streptomyces griseus* (WO11/150157) and S. pristinaespiralis (WO12/137147).

Other examples are lipase variants such as those described in EP407225, WO92/05249, WO94/01541, WO94/25578, WO95/14783, WO95/30744, WO95/35381, WO95/22615, WO96/00292, WO97/04079, WO97/07202, WO00/34450, WO00/60063, WO01/92502, WO07/87508 and WO09/109500.

Preferred commercial lipase products include Lipolase™, Lipex™; Lipolex™ and Lipoclean™ (Novozymes A/S), Lumafast (originally from Genencor) and Lipomax (originally from Gist-Brocades).

Still other examples are lipases sometimes referred to as acyltransferases or perhydrolases, e.g. acyltransferases with homology to *Candida antarctica* lipase A (WO10/111143), acyltransferase from *Mycobacterium smegmatis* (WO05/56782), perhydrolases from the CE 7 family (WO09/67279), and variants of the *M. smegmatis* perhydrolase in particular the S54V variant used in the commercial product Gentle Power Bleach from Huntsman Textile Effects Pte Ltd (WO10/100028).

Amylases

Suitable amylases which can be used together with subtilase variants of the present disclosure may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1,296,839.

Suitable amylases include amylases having SEQ ID NO: 3 in WO 95/10603 or variants having about 90% sequence identity to SEQ ID NO: 3 thereof. Preferred variants are described in WO 94/02597, WO 94/18314, WO 97/43424 and SEQ ID NO: 4 of WO 99/019467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having about 90% sequence identity thereto. Preferred variants are those having a deletion in positions 181 and 182 and a substitution in position 193.

Other amylases, which are suitable are hybrid alpha-amylase comprising residues from about 1-33 of the alpha-amylase derived from *B. amyloliquefaciens* shown in SEQ ID NO: 6 of WO 2006/066594 and residues from about 36-483 of the *B. licheniformis* alpha-amylase shown in SEQ ID NO: 4 of WO 2006/066594 or variants having about 90% sequence identity thereof. Preferred variants of this hybrid alpha-amylase are those having a substitution, a deletion or an insertion in one of more of the following positions: G48, T49, G107, H156, A181, N190, M197, 1201, A209 and Q264. Most preferred variants of the hybrid alpha-amylase comprising residues from about 1-33 of the alpha-amylase derived from *B. amyloliquefaciens* shown in SEQ ID NO: 6 of WO 2006/066594 and residues from about 36-483 of SEQ ID NO: 4 of WO2006/066594 are those having the substitutions:

M197T;

H156Y+A 181T+N190F+A209V+Q264S; or

G48A+T491+G107A+H156Y+A181T+N190F+1201F+A209V+Q264S.

Further amylases which are suitable are amylases having SEQ ID NO: 6 in WO 99/019467 or variants thereof having about 90% sequence identity to SEQ ID NO: 6. Preferred variants of SEQ ID NO: 6 are those having a substitution, a deletion or an insertion in one or more of the following positions: R181, G182, H183, G184, N195, 1206, E212, E216 and K269. Particularly preferred amylases are those having deletion in positions R181 and G182, or positions H183 and G184.

Additional amylases which can be used are those having SEQ ID NO: 1, SEQ ID NO: 3, SEQ ID NO: 2 or SEQ ID NO: 7 of WO 96/023873 or variants thereof having about 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476. More preferred variants are those having a deletion in positions 181 and 182 or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 08/153815, SEQ ID NO: 10 in WO 01/66712 or variants thereof having about 90% sequence identity to SEQ ID NO: 2 of WO 08/153815 or about 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 09/061380 or variants having about 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T131I, T165I, K178L, T182G, M201L, F202Y, N225E,R, N272E,R, S243Q,A,E,D, Y305R, R309A, Q320R, Q359E, K444E and G475K and/or deletion in position R180 and/or S181 or of T182 and/or G183. Most preferred amylase variants of SEQ ID NO: 2 are those having the substitutions:

N128C+K178L+T182G+Y305R+G475K;

N128C+K178L+T182G+F202Y+Y305R+D319T+G475K;

S125A+N128C+K178L+T182G+Y305R+G475K; or

S125A+N128C+T131I+T165I+K178L+T182G+Y305R+G475K wherein the variants are C-terminally truncated and optionally further comprises a substitution at position 243 and/or a deletion at position 180 and/or position 181.

Other suitable amylases are the alpha-amylase having SEQ ID NO: 12 in WO01/66712 or a variant having at least about 90% sequence identity to SEQ ID NO: 12. Preferred amylase variants are those having a substitution, a deletion or an insertion in one of more of the following positions of SEQ ID NO: 12 in WO01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions.

Other examples are amylase variants such as those described in WO2011/098531, WO2013/001078 and WO2013/001087.

Commercially available amylases are Duramyl™, Termamyl™, Fungamyl™ Stainzyme™, Stainzyme Plus™, Natalase™, Liquozyme X and BAN™ (from Novozymes A/S), and Rapidase™, Purastar™/Effectenz™, Powerase and Preferenz S100 (from Genencor International Inc./DuPont).

Peroxidases/Oxidases

Suitable peroxidases/oxidases include those of plant, bacterial or fungal origin. Chemically modified or protein engineered mutants are included. Examples of useful peroxidases include peroxidases from *Coprinus*, e.g., from *C. cinereus*, and variants thereof as those described in WO 93/24618, WO 95/10602, and WO 98/15257.

Commercially available peroxidases include Guardzyme™ (Novozymes A/S).

The detergent enzyme(s) may be included in a detergent composition by adding separate additives containing one or more enzymes, or by adding a combined additive comprising all of these enzymes. A detergent additive of the present disclosure, i.e., a separate additive or a combined additive, can be formulated, for example, as a granulate, liquid, slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of from about 1000 to about 20000; ethoxylated nonylphenols having from about 16 to about 50 ethylene oxide units; ethoxylated fatty alcohols in which the alcohol contains from about 12 to about 20 carbon atoms and in which there are about 15 to about 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

A composition for use in solid laundry detergent, for example, may include from about 0.000001%-5%, such as from about 0.000005%-2%, such as from about 0.00001%-1%, such as from about 0.00001%-0.1% of enzyme protein by weight of the composition.

A composition for use in laundry liquid, for example, may include from about 0.000001%-3%, such as from about 0.000005-1%, such as from about 0.00001%-0.01% of enzyme protein by weight of the composition.

A composition for use in automatic dishwash, for example, may include from about 0.000001%-5%, such as from about 0.000005%-2%, such as from about 0.00001%-1%, such as from about 0.00001%-0.1% of enzyme protein by weight of the composition.

The enzyme(s) of the detergent composition of the present disclosure may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in, for example, WO92/19709 and WO92/19708.

In one embodiment, the present disclosure is directed to detergent compositions comprising an enzyme of the present disclosure in combination with one or more additional cleaning composition components. The choice of additional components is within the skill of the artisan and includes conventional ingredients, including the exemplary non-limiting components set forth below.

The choice of components may include, for textile care, the consideration of the type of textile to be cleaned, the type and/or degree of soiling, the temperature at which cleaning is to take place, and the formulation of the detergent product. Although components mentioned below are categorized by general header according to a particular functionality, this is not to be construed as a limitation, as a component may comprise additional functionalities as will be appreciated by the skilled artisan.

Surfactants

The detergent composition may comprise one or more surfactants, which may be anionic and/or cationic and/or non-ionic and/or semi-polar and/or zwitterionic, or a mixture thereof. In a particular embodiment, the detergent composition includes a mixture of one or more nonionic surfactants and one or more anionic surfactants. The surfactant(s) is typically present at a level of from about 0.1% to about 60% by weight, such as from about 1% to about 40%, or from about 3% to about 20%, or from about 3% to about 10%. The surfactant(s) is chosen based on the desired cleaning application, and includes any conventional surfactant(s) known in the art. Any surfactant known in the art for use in detergents may be utilized.

When included therein the detergent will usually contain from about 1% to about 40% by weight, such as from about 5% to about 30%, including from about 5% to about 15%, or from about 20% to about 25% of an anionic surfactant. Non-limiting examples of anionic surfactants include sulfates and sulfonates, in particular, linear alkylbenzenesulfonates (LAS), isomers of LAS, branched alkylbenzenesulfonates (BAB 5), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (IVIES), alkyl- or alkenylsuccinic acid, dodecenyl/tetradecenyl succinic acid (DTSA), fatty acid derivatives of amino acids, diesters and monoesters of sulfo-succinic acid or soap, and combinations thereof.

When included therein the detergent will usually contain from about 0% to about 10% by weight of a cationic surfactant. Non-limiting examples of cationic surfactants include alklydimethylethanolamine quat (ADMEAQ), cetyltrimethylammonium bromide (CTAB), dimethyldistearylammonium chloride (D SDMAC), and alkylbenzyldimethylammonium, alkyl quaternary ammonium compounds, alkoxylated quaternary ammonium (AQA) compounds, and combinations thereof.

When included therein the detergent will usually contain from about 0.2% to about 40% by weight of a non-ionic surfactant, for example from about 0.5% to about 30%, in particular from about 1% to about 20%, from about 3% to about 10%, such as from about 3% to about 5%, or from about 8% to about 12%. Non-limiting examples of non-ionic surfactants include alcohol ethoxylates (AE or AEO), alcohol propoxylates, propoxylated fatty alcohols (PFA), alkoxylated fatty acid alkyl esters, such as ethoxylated and/or propoxylated fatty acid alkyl esters, alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamides (PFAM), polyhydroxy alkyl fatty acid amides, or N-acyl N-alkyl derivatives of glucosamine (glucamides, GA, or fatty acid glucamide, FAGA), as well as products available under the trade names SPAN and TWEEN, and combinations thereof.

When included therein the detergent will usually contain from about 0% to about 10% by weight of a semipolar surfactant. Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl)amine oxide, fatty acid alkanolamides and ethoxylated fatty acid alkanolamides, and combinations thereof.

When included therein the detergent will usually contain from about 0% to about 10% by weight of a zwitterionic surfactant. Non-limiting examples of zwitterionic surfactants include betaine, alkyldimethylbetaine, sulfobetaine, and combinations thereof.

Hydrotropes

A hydrotrope is a compound that solubilises hydrophobic compounds in aqueous solutions (or oppositely, polar substances in a non-polar environment). Typically, hydrotropes have both hydrophilic and a hydrophobic character (so-called amphiphilic properties as known from surfactants); however the molecular structure of hydrotropes generally do not favor spontaneous self-aggregation. Hydrotropes do not display a critical concentration above which self-aggregation occurs as found for surfactants and lipids forming miceller, lamellar or other well defined meso-phases. Instead, many hydrotropes show a continuous-type aggregation process where the sizes of aggregates grow as concentration increases. However, many hydrotropes alter the phase behavior, stability, and colloidal properties of systems containing substances of polar and non-polar character, including mixtures of water, oil, surfactants, and polymers. Hydrotropes are classically used across industries from pharma, personal care, food, to technical applications. Use of hydrotropes in detergent compositions allow for example more concentrated formulations of surfactants (as in the process of compacting liquid detergents by removing water) without inducing undesired phenomena such as phase separation or high viscosity.

The detergent may contain from about 0-5% by weight, such as from about 0.5 to about 5%, or from about 3% to about 5%, of a hydrotrope. Any hydrotrope known in the art for use in detergents may be utilized. Non-limiting examples of hydrotropes include sodium benzene sulfonate, sodium p-toluene sulfonate (STS), sodium xylene sulfonate (SXS), sodium cumene sulfonate (SCS), sodium cymene sulfonate, amine oxides, alcohols and polyglycolethers, sodium hydroxynaphthoate, sodium hydroxynaphthalene sulfonate, sodium ethylhexyl sulfate, and combinations thereof Builders and Co-Builders The detergent composition may contain from about 0-65% by weight, such as from about 5% to about 45% of a detergent builder or co-builder, or a mixture thereof. In a dish wash detergent, the level of builder is typically from about 40-65%, particularly from about 50-65%. The builder and/or co-builder may particularly be a chelating agent that forms water-soluble complexes with Ca and Mg. Any builder and/or co-builder known in the art for use in laundry detergents may be utilized. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), diethanolamine (DEA, also known as iminodiethanol), triethanolamine (TEA, also known as 2,2',2"-nitrilotriethanol), and carboxymethyl inulin (CMI), and combinations thereof.

The detergent composition may also contain from about 0-20% by weight, such as from about 5% to about 10%, of a detergent co-builder, or a mixture thereof. The detergent composition may include include a co-builder alone, or in combination with a builder, for example a zeolite builder. Non-limiting examples of co-builders include homopolymers of polyacrylates or copolymers thereof, such as poly (acrylic acid) (PAA) or copoly(acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), ethylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N,N-diacetic acid (GLDA), 1-hydroxyethane-1,1-diphosphonic acid (HEDP), ethylene diaminetetra-(methylenephosphonic acid) (EDTMPA), diethylenetriaminepentakis(methylenephosphonic acid) (DTPMPA or DTMPA), N-(2-hydroxyethyl)

iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl)-aspartic acid (SMAS), N-(2-sulfoethyl)-aspartic acid (SEAS), N-(2-sulfomethyl)-glutamic acid (SMGL), N-(2-sulfoethyl)-glutamic acid (SEGL), N-methyliminodiacetic acid (MIDA), α-alanine-N, N-diacetic acid (α-ALDA), serine-N, N-diacetic acid (SEDA), isoserine-N, N-diacetic acid (ISDA), phenylalanine-N, N-diacetic acid (PHDA), anthranilic acid-N, N-diacetic acid (ANDA), sulfanilic acid-N, N-diacetic acid (SLDA), taurine-N, N-diacetic acid (TUDA) and sulfomethyl-N, N-diacetic acid (SMDA), N-(2-hydroxyethyl)-ethylidenediamine-N, N',N'-triacetate (HEDTA), diethanolglycine (DEG), diethylenetriamine penta(methylenephosphonic acid) (DTPMP), aminotris(methylenephosphonic acid) (ATMP), and combinations and salts thereof. Further exemplary builders and/or co-builders are described in, e.g., WO 09/102854, U.S. Pat. No. 5,977,053

Bleaching Systems

The detergent may contain from about 0-50% by weight, such as from about 0.1% to about 25%, of a bleaching system. Any bleaching system known in the art for use in laundry detergents may be utilized. Suitable bleaching system components include bleaching catalysts, photobleaches, bleach activators, sources of hydrogen peroxide such as sodium percarbonate and sodium perborates, preformed peracids and mixtures thereof. Suitable preformed peracids include, but are not limited to, peroxycarboxylic acids and salts, percarbonic acids and salts, perimidic acids and salts, peroxymonosulfuric acids and salts, for example, Oxone (R), and mixtures thereof. Non-limiting examples of bleaching systems include peroxide-based bleaching systems, which may comprise, for example, an inorganic salt, including alkali metal salts such as sodium salts of perborate (usually mono- or tetra-hydrate), percarbonate, persulfate, perphosphate, persilicate salts, in combination with a peracid-forming bleach activator. The term bleach activator is meant herein as a compound which reacts with peroxygen bleach like hydrogen peroxide to form a peracid. The peracid thus formed constitutes the activated bleach. Suitable bleach activators to be used herein include those belonging to the class of esters amides, imides or anhydrides. Suitable examples are tetracetylethylene diamine (TAED), sodium 4-[(3,5,5-trimethylhexanoyl)oxy]benzene sulfonate (ISONOBS), diperoxy dodecanoic acid, 4-(dodecanoyloxy)benzenesulfonate (LOBS), 4-(decanoyloxy)benzenesulfonate, 4-(decanoyloxy)benzoate (DOB S), 4-(nonanoyloxy)-benzenesulfonate (NOBS), and/or those disclosed in WO98/17767. A particular family of bleach activators of interest was disclosed in EP624154 and particulary preferred in that family is acetyl triethyl citrate (ATC). ATC or a short chain triglyceride like triacetin has the advantage that it is environmental friendly as it eventually degrades into citric acid and alcohol. Furthermore acetyl triethyl citrate and triacetin has a good hydrolytical stability in the product upon storage and it is an efficient bleach activator. Finally ATC provides a good building capacity to the laundry additive. Alternatively, the bleaching system may comprise peroxyacids of, for example, the amide, imide, or sulfone type. The bleaching system may also comprise peracids such as 6-(phthalimido)peroxyhexanoic acid (PAP). The bleaching system may also include a bleach catalyst. In some embodiments the bleach component may be an organic catalyst selected from the group including organic catalysts having the following formulae:

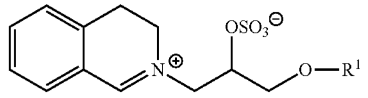
(i)

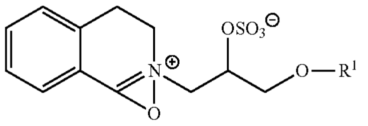
(II)

(iii) and mixtures thereof; wherein each $R^1$ is independently a branched alkyl group containing from about 9 to about 24 carbons or linear alkyl group containing from about 11 to about 24 carbons, preferably each $R^1$ is independently a branched alkyl group containing from about 9 to about 18 carbons or linear alkyl group containing from about 11 to about 18 carbons, more preferably each $R^1$ is independently selected from the group including 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl. Other exemplary bleaching systems are described, e.g. in WO2007/087258, WO2007/087244, WO2007/087259 and WO2007/087242. Suitable photobleaches may for example be sulfonated zinc phthalocyanine Polymers The detergent may contain from about 0-10% by weight, such as from about 0.5-5%, from about 2-5%, from about 0.5-2% or from about 0.2-1% of a polymer. Any polymer known in the art for use in detergents may be utilized. The polymer may function as a co-builder as mentioned above, or may provide antiredeposition, fiber protection, soil release, dye transfer inhibition, grease cleaning and/or antifoaming properties. Some polymers may have more than one of the above-mentioned properties and/or more than one of the below-mentioned motifs. Exemplary polymers include (carboxymethyl)cellulose (CMC), poly(vinyl alcohol) (PVA), poly(vinylpyrrolidone) (PVP), poly(ethyleneglycol) or poly(ethylene oxide) (PEG), ethoxylated poly (ethyleneimine), carboxymethyl inulin (CMI), and polycarboxylates such as PAA, PAA/PMA, poly-aspartic acid, and lauryl methacrylate/acrylic acid copolymers, hydrophobically modified CMC (HM-CMC) and silicones, copolymers of terephthalic acid and oligomeric glycols, copolymers of poly(ethylene terephthalate) and poly (oxyethene terephthalate) (PET-POET), PVP, poly(vinylimidazole) (PVI), poly(vinylpyridine-N-oxide) (PVPO or PVPNO) and polyvinylpyrrolidone-vinylimidazole (PVPVI). Further exemplary polymers include sulfonated polycarboxylates, polyethylene oxide and polypropylene oxide (PEO-PPO) and diquaternium ethoxy sulfate. Other exemplary polymers are disclosed in, e.g., WO 2006/130575. Salts of the above-mentioned polymers are also contemplated.

Fabric Hueing Agents

The detergent compositions of the present disclosure may also include fabric hueing agents such as dyes or pigments, which when formulated in detergent compositions can deposit onto a fabric when said fabric is contacted with a wash liquor comprising said detergent compositions and thus altering the tint of said fabric through absorption/reflection of visible light. Fluorescent whitening agents emit at least some visible light. In contrast, fabric hueing agents alter the tint of a surface as they absorb at least a portion of the visible light spectrum. Suitable fabric hueing agents include dyes and dye-clay conjugates, and may also include pigments. Suitable dyes include small molecule dyes and polymeric dyes. Suitable small molecule dyes include small molecule dyes selected from the group including dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof, for example as described in WO2005/03274, WO2005/03275, WO2005/03276 and EP1876226 (hereby incorporated by reference). The detergent composition preferably comprises from about 0.00003 wt % to about 0.2 wt %, from about 0.00008 wt % to about 0.05 wt %, or even from about 0.0001 wt % to about 0.04 wt % fabric hueing agent. The composition may comprise from about 0.0001 wt % to about 0.2 wt % fabric hueing agent, this may be especially preferred when the composition is in the form of a unit dose pouch. Suitable hueing agents are also disclosed in, e.g. WO 2007/087257 and WO2007/087243.

Adjunct Materials

Any detergent components known in the art for use in laundry detergents may also be utilized. Other optional detergent components include anti-corrosion agents, anti-shrink agents, anti-soil redeposition agents, anti-wrinkling agents, bactericides, binders, corrosion inhibitors, disintegrants/disintegration agents, dyes, enzyme stabilizers (including boric acid, borates, CMC, and/or polyols such as propylene glycol), fabric conditioners including clays, fillers/processing aids, fluorescent whitening agents/optical brighteners, foam boosters, foam (suds) regulators, perfumes, soil-suspending agents, softeners, suds suppressors, tarnish inhibitors, and wicking agents, either alone or in combination. Any ingredient known in the art for use in laundry detergents may be utilized. The choice of such ingredients is well within the skill of the artisan.

Dispersants: The detergent compositions of the present disclosure can also contain dispersants. In particular powdered detergents may comprise dispersants. Suitable water-soluble organic materials include the homo- or co-polymeric acids or their salts, in which the polycarboxylic acid comprises at least two carboxyl radicals separated from each other by not more than two carbon atoms. Suitable dispersants are for example described in Powdered Detergents, Surfactant science series volume 71, Marcel Dekker, Inc.

Dye Transfer Inhibiting Agents: The detergent compositions of the present disclosure may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a subject composition, the dye transfer inhibiting agents may be present at levels from about 0.0001% to about 10%, from about 0.01% to about 5% or even from about 0.1% to about 3% by weight of the composition.

Fluorescent whitening agent: The detergent compositions of the present disclosure will preferably also contain additional components that may tint articles being cleaned, such as fluorescent whitening agent or optical brighteners. Where present the brightener is preferably at a level of from about 0.01% to about 0.5%. Any fluorescent whitening agent suitable for use in a laundry detergent composition may be used in the composition of the present disclosure. The most commonly used fluorescent whitening agents are those belonging to the classes of diaminostilbene-sulphonic acid derivatives, diarylpyrazoline derivatives and bisphenyl-distyryl derivatives. Examples of the diaminostilbene-sulphonic acid derivative type of fluorescent whitening agents include the sodium salts of: 4,4'-bis-(2-diethanolamino-4-anilino-s-triazin-6-ylamino) stilbene-2,2'-disulphonate; 4,4'-bis-(2,4-dianilino-s-triazin-6-ylamino) stilbene-2.2'-disulphonate; 4,4'-bis-(2-anilino-4(N-methyl-N-2-hydroxy-ethylamino)-s-triazin-6-ylamino) stilbene-2,2'-disulphonate, 4,4'-bis-(4-phenyl-2,1,3-triazol-2-yl)stilbene-2,2'-disulphonate; 4,4'-bis-(2-anilino-4(1-methyl-2-hydroxy-ethylamino)-s-triazin-6-ylamino) stilbene-2,2'-disulphonate and 2-(stilbyl-4"-naptho-1,2':4,5)-1,2,3-trizole-2"-sulphonate. Preferred fluorescent whitening agents are Tinopal DMS and Tinopal CBS available from Ciba-Geigy AG, Basel, Switzerland. Tinopal DMS is the disodium salt of 4,4'-bis-(2-morpholino-4 anilino-s-triazin-6-ylamino) stilbene disulphonate. Tinopal CBS is the disodium salt of 2,2'-bis-(phenyl-styryl) disulphonate. Also preferred are fluorescent whitening agents is the commercially available Parawhite KX, supplied by Paramount Minerals and Chemicals, Mumbai, India. Other fluorescers suitable for use in the present disclosure include the 1-3-diaryl pyrazolines and the 7-alkylaminocoumarins. Suitable fluorescent brightener levels include lower levels of from about 0.01, from about 0.05, from about 0.1 or even from about 0.2 wt % to upper levels of about 0.5 or even about 0.75 wt %.

Soil release polymers: The detergent compositions of the present disclosure may also include one or more soil release polymers which aid the removal of soils from fabrics such as cotton and polyester based fabrics, in particular the removal of hydrophobic soils from polyester based fabrics. The soil release polymers may for example be nonionic or anionic terephthalte based polymers, polyvinyl caprolactam and related copolymers, vinyl graft copolymers, polyester polyamides see for example Chapter 7 in Powdered Detergents, Surfactant science series volume 71, Marcel Dekker, Inc. Another type of soil release polymers are amphiphilic alkoxylated grease cleaning polymers comprising a core structure and a plurality of alkoxylate groups attached to that core structure. The core structure may comprise a polyalkylenimine structure or a polyalkanolamine structure as described in detail in WO 2009/087523 (hereby incorporated by reference). Furthermore random graft co-polymers are suitable soil release polymers Suitable graft co-polymers are described in more detail in WO 2007/138054, WO 2006/108856 and WO 2006/113314 (hereby incorporated by reference). Other soil release polymers are substituted polysaccharide structures especially substituted cellulosic structures such as modified cellulose deriviatives such as those described in EP 1867808 or WO 2003/040279 (both are hereby incorporated by reference). Suitable cellulosic polymers include cellulose, cellulose ethers, cellulose esters, cellulose amides and mixtures thereof. Suitable cellulosic polymers include anionically modified cellulose, nonionically modified cellulose, cationically modified cellulose, zwitterionically modified cellulose, and mixtures thereof. Suitable cellulosic polymers include methyl cellulose, carboxy methyl cellulose, ethyl cellulose, hydroxyl ethyl cellulose, hydroxyl propyl methyl cellulose, ester carboxy methyl cellulose, and mixtures thereof.

Anti-redeposition agents: The detergent compositions of the present disclosure may also include one or more anti-redeposition agents such as carboxymethylcellulose (CMC), polyvinyl alcohol (PVA), polyvinylpyrrolidone (PVP), polyoxyethylene and/or polyethyleneglycol (PEG), homopolymers of acrylic acid, copolymers of acrylic acid and maleic acid, and ethoxylated polyethyleneimines. The cellulose based polymers described under soil release polymers above may also function as anti-redeposition agents.

Other suitable adjunct materials include, but are not limited to, anti-shrink agents, anti-wrinkling agents, bactericides, binders, carriers, dyes, enzyme stabilizers, fabric softeners, fillers, foam regulators, hydrotropes, perfumes, pigments, sod suppressors, solvents, and structurants for liquid detergents and/or structure elasticizing agents.

In a further embodiment of the present disclosure the detergent composition is in form of a bar, a homogenous tablet, a tablet having two or more layers, a pouch having one or more compartments, a regular or compact powder, a granule, a paste, a gel, or a regular, compact or concentrated liquid. In one embodiment the detergent composition can be a laundry detergent composition, preferably a liquid or solid laundry detergent composition. There are a number of detergent formulation forms such as layers (same or different phases), pouches, as well as forms for machine dosing unit.

Pouches can be configured as single or multicompartments. It can be of any form, shape and material which is suitable for hold the composition, e.g. without allowing the release of the composition from the pouch prior to water contact. The pouch is made from water soluble film which encloses an inner volume. Said inner volume can be devided into compartments of the pouch. Preferred films are polymeric materials preferably polymers which are formed into a film or sheet. Preferred polymers, copolymers or derivates thereof are selected polyacrylates, and water soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxyprpyl methyl cellulose (HPMC). Preferably the level of polymer in the film for example PVA is at least about 60%. Preferred average molecular weight will typically be from about 20,000 to about 150,000. Films can also be of blend compositions comprising hydrolytically degradable and water soluble polymer blends such as polyactide and polyvinyl alcohol (known under the Trade reference M8630 as sold by Chris Craft In. Prod. Of Gary, Ind., US) plus plasticisers like glycerol, ethylene glycerol, Propylene glycol, sorbitol and mixtures thereof. The pouches can comprise a solid laundry detergent composition or part components and/or a liquid cleaning composition or part components separated by the water soluble film. The compartment for liquid components can be different in composition than compartments containing solids. Ref: (US2009/0011970 A1).

Detergent ingredients can be separated physically from each other by compartments in water dissolvable pouches or in different layers of tablets. Thereby negative storage interaction between components can be avoided. Different dissolution profiles of each of the compartments can also give rise to delayed dissolution of selected components in the wash solution.

A liquid or gel detergent, which is not unit dosed, may be aqueous, typically containing at least about 20% by weight and up to about 95% water, such as up to about 70% water, up to about 65% water, up to about 55% water, up to about 45% water, up to about 35% water. Other types of liquids, including without limitation, alkanols, amines, diols, ethers and polyols may be included in an aqueous liquid or gel. An aqueous liquid or gel detergent may contain from about 0-30% organic solvent. A liquid or gel detergent may be non-aqueous.

The detergent compositions of present disclosure may be provided in the form of laundry soap bars and used for hand washing laundry, fabrics and/or textiles. The term laundry soap bar includes laundry bars, soap bars, combo bars, syndet bars and detergent bars. The types of bar usually differ in the type of surfactant they contain, and the term laundry soap bar includes those containing soaps from fatty acids and/or synthetic soaps. The laundry soap bar has a physical form which is solid and not a liquid, gel or a powder at room temperature. The term solid is defined as a physical form which does not significantly change over time, i.e. if a solid object (e.g. laundry soap bar) is placed inside a container, the solid object does not change to fill the container it is placed in. The bar is a solid typically in bar form but can be in other solid shapes such as round or oval.

The laundry soap bar may contain one or more additional enzymes, protease inhibitors such as peptide aldehydes (or hydrosulfite adduct or hemiacetal adduct), boric acid, borate, borax and/or phenylboronic acid derivatives such as 4-formylphenylboronic acid, one or more soaps or synthetic surfactants, polyols such as glycerine, pH controlling compounds such as fatty acids, citric acid, acetic acid and/or formic acid, and/or a salt of a monovalent cation and an organic anion wherein the monovalent cation may be for example $Na^+$, $K^+$ or $NH_4^+$ and the organic anion may be for example formate, acetate, citrate or lactate such that the salt of a monovalent cation and an organic anion may be, for example, sodium formate.

The laundry soap bar may also contain complexing agents like EDTA and HEDP, perfumes and/or different type of fillers, surfactants e.g. anionic synthetic surfactants, builders, polymeric soil release agents, detergent chelators, stabilizing agents, fillers, dyes, colorants, dye transfer inhibitors, alkoxylated polycarbonates, suds suppressers, structurants, binders, leaching agents, bleaching activators, clay soil removal agents, anti-redeposition agents, polymeric dispersing agents, brighteners, fabric softeners, perfumes and/or other compounds known in the art.

The laundry soap bar may be processed in conventional laundry soap bar making equipment such as but not limited to: mixers, plodders, e.g. a two stage vacuum plodder, extruders, cutters, logo-stampers, cooling tunnels and wrappers. The present disclosure is not limited to preparing the laundry soap bars by any single method. The premix of the present disclosure may be added to the soap at different stages of the process. For example, the premix containing a soap, an enzyme, optionally one or more additional enzymes, a protease inhibitor, and a salt of a monovalent cation and an organic anion may be prepared and the mixture is then plodded. The enzyme and optional additional enzymes may be added at the same time as the protease inhibitor for example in liquid form. Besides the mixing step and the plodding step, the process may further comprise the steps of milling, extruding, cutting, stamping, cooling and/or wrapping.

The present disclosure furthermore relates to different uses of the detergent composition as herein disclosed, such as for degrading mannan and for use in a laundry process.

The present disclosure furthermore relates to a method for removing a stain from a surface, comprising contacting the surface with a detergent composition as herein disclosed.

The present disclosure also relates to a method for degrading mannan comprising applying a detergent composition as herein disclosed to mannan, preferably wherein the mannan is on the surface of a textile. By degrading mannan attached to the textile or fabric, dirt or soil bound to mannan is released and not capable of binding again to the mannan or mannan stains.

In an embodiment of the present disclosure the mannanase comprised in the detergent composition of present disclosure has a relative activity of at least about 30% in the temperature range from about 45° to about 65° C. Providing mannanases that retain activity in temperatures above ambient temperature and in acidic pH is advantageous for applications wherein mannan degradation is required in such conditions.

In an embodiment the mannanase comprised in the detergent compositions of present disclosure hydrolyses endo-beta-1,4-mannosidic linkages randomly.

In an embodiment the mannanase comprised in the detergent compositions of present disclosure is obtainable or derivable from a bacterial source.

In an embodiment the mannanase comprised in the detergent compositions of present disclosure is fused with at least one further polypeptide, thus forming a fusion polypeptide. The fusion polypeptide or the further polypeptide may have other catalytic or binding activities in addition to those of mannanase. In an embodiment the further polypeptide comprises or includes carbohydrate binding module, which is optionally a fragment of another protein or enzyme derived from the same or different organism as the mannanase. The mannanase can be connected to the further polypeptide with a linker.

EXAMPLES

The following examples are provided to illustrate various aspects of the present disclosure. They are not intended to limit the present disclosure, which is defined by the accompanying claims.

Example 1: Screening

For identification of new beta-1,4-mannanases public databases (NCBI, EBI) and selected proprietary and public genomes were screened. All proprietary and public genomes used in this work are shown in Tab. 1. All hits were grouped and finally 15 genes of bacterial origin were selected for cloning in *Bacillus* based on the phylogenetic distance between each other (Table 2)

TABLE 1

List of proprietary and public genomes used for screening of beta-1,4-mannanases

| Species | Strain | Source |
|---|---|---|
| *Bacillus pumilus* | M58 | ABE |
| *Amphibacillus xylanus* | NBRC 15112 | NCBI |
| *Bacillus hemicellulosilyticus* | JCM 9152 | NCBI |
| *Bacillus clausii* | KSM-K16 | NCBI |
| *Bacillus amyloliquefaciens* | RH1330 | ABE |
| *Virigibacillus soli* | PL205 | NCBI |

TABLE 2

List of genes selected for cloning in *Bacillus*

| Sequence ID | Species | GH family | Length |
|---|---|---|---|
| orf2511 | *Bacillus amyloliquefaciens* | 26 | 360 aa |
| AXY_08250 | *Amphibacillus xylanus* | 5 | 497 aa |
| Man7 | *Bacillus hemicellulosilyticus* | 5 | 490 aa |
| T1Z249.2 | *Bacillus nealsonii* | 5 | 369 aa |
| Man6 | *Bacillus clausii* | 5 | 324 aa |
| Q9EYQ3 | *Clostridium cellulolyticum* | 5 | 424 aa |
| YdhT | *Bacillus cellulosilyticus* | 26 | 1183 aa |
| V5X1N9 | *Paenibacillus polymyxa* | 5 | 588 aa |
| Q9ZI87 | *Geobacillus stearothermophilus* | 5 | 694 aa |
| Q49HI4 | *Bacillus circulans* | 5 | 327 aa |
| orf0659 | *Bacillus pumilus* | 5 | 376 aa |
| JCM9152_1090 | *Bacillus hemicellulosilyticus* | 26 | 489 aa |
| D3HC62 | *Streptococcus gallolyticus* | 5 | 487 aa |
| A0LSH9 | *Acidothermus cellulolyticus* | 5 | 763 aa |
| Man14 | *Virgibacillus soli* | 5 | 482 aa |

Example 2: Cloning of Bacterial Mannanases in *Bacillus*

Unless otherwise stated, the molecular biological methods including DNA manipulations and transformations were performed as described in Sambrook and Russell (2001) and Harwood and Cutting (1990). The genes man6, man7 and man14 were amplified by PCR using Pfx Accu Prime Polymerase (Invitrogen). PCRs were performed according to manufacturer's instructions. Following PCR conditions were used for construction of the expression plasmids: 120 sec initial denaturation at 94° C., followed by 35 cycles of 15 sec at 94° C., 30 sec annealing at one of the following 50/55° C., 110/290 sec extension at 68° C. and the final extension at 68° C. for 10 min. For amplification of man7 genomic DNA of *Bacillus hemicellulosilyticus* JCM 9152 was used. man6 and man14 were ordered as synthetic genes without codon optimization (Eurofins MWG, Germany). Sequences of primers used for cloning are shown in Table 3. Overhangs for hybridization are underlined.

TABLE 3

List of primers used for amplification of man6, man7 and man14

| Template | Primer | bp | Sequence | Seq ID No |
|---|---|---|---|---|
| syn. gene man6 | Man6_1 | 39 | CAACCGCCTCTGCAGCTTATGCACAAAACGGATTTCACG | 1 |
| syn. gene man6 | Man6_2 | 39 | CGGTATATCTCTGTCTTAATCACTCTTAAGCCCATTTTC | 2 |
| gDNA *B. hemicellulosilyticus* | Man7_1 | 37 | CAACCGCCTCTGCAGCTTCTGATGGTCATAGCCAAAC | 3 |
| gDNA *B. hemicellulosilyticus* | Man7_2 | 36 | CGGTATATCTCTGTCTTATTGGATTGTTACATGATC | 4 |

TABLE 3-continued

List of primers used for amplification of man6, man7 and man14

| Template | Primer | bp | Sequence | Seq ID No |
|---|---|---|---|---|
| syn. Gene man14 | Man14_1 | 40 | CAACCGCCTCTGCAGCTGCAAGCGGGTTTTATGTAAACGG | 5 |
| syn. Gene man14 | Man14_2 | 39 | CGGTATATCTCTGTCTTATTTAATGGTAACGTTATCAAC | 6 |
| pUB110 derivative | Vec_1 | 17 | AGCTGCAGAGGCGGTTG | 7 |
| pBU110 derivative | Vec_2 | 21 | GACAGAGATATACCGACAGTG | 8 |

Genes were cloned in a standard vector pEV1 pEV1 (FIG. 1), a pUB110 derivate including promoter PaprE from *Bacillus licheniformis* and xylanase signal peptide from *Bacillus amyloliquefaciens*, by using NEBuilder®Hifi DNA Assembly Master Mix (NEB, Frankfurt). A vector:insert ration of 1:3 was applied for cloning. The total amount of fragments was at 0.2 pmol in a total volume of 20 µl. Samples were incubated for 40 min at 50° C. For construction purposes, expression plasmids were transformed by induced competence in *Bacillus subtilis* SCK6 as described in Zhang & Zhang 2011. The transformed cells were plated onto LB (Luria-Bertani) plates supplemented with 10 mg/l Kanamycin. Plates were incubated for 20h at 37° C. Arising colonies were picked and plasmid was isolated using QiaPrep MiniPrep Kit (Qiagen, Hilden). Isolation procedure was carried out according to the manufacturers recommendations for Gram positives plasmid preparations. Inserts were sequenced via Sanger sequencing (GATC, Germany) and revealed the DNA sequences corresponding to the mature parts of the mannanases Man6, Man7 and Man14. Sequence comparisons were done using ClustalW sequence alignment (Thompson et al 1994). Finally, expression plasmids were transformed in an appropriate *Bacillus* production strain via electroporation. *Bacillus* production strain was grown in electroporation medium containing 20 g/l Trypton, 10 g/l yeast extract, 10 g NaCl and 2M saccharose and 10 ml were harvested at an OD (600 nm) of 0.4. Cells were washed with electroporation buffer containing 0.272M saccharose, 1 mM $MgCl_2$ and 7 mM $KH_2PO4$ and finally resuspended in 250 µl electroporation buffer. Electroporation was performed using following conditions: 1.2 kV, 150 Ω, 50 µF. 1 ml electroporation medium was added afterwards and cells were incubated for 3h at 37° C. Cells were plated on LB plates supplemented with 20 mg/l Kanamycin and incubated for 18h at 37° C. Clones were verified as described above and used for generation of material for analytic tests. Therefore, strains were inoculated in a standard expression under protein inducing conditions and incubated for 30h at 37° C. Supernatants were harvested and used for analytical and application tests. Genes and enzyme characteristics are shown in Table 4 and 5.

TABLE 4

The summary on the GH5 family mannanase encoding genes from *Bacillus clausii* KSM-K16, *Bacillus hemicellulosilyticus* JCM 9152 and *Virgibacillus soli* PL205.

| Gene | Length including SP (bp) | SEQ ID NO |
|---|---|---|
| man6 | 975 | 9 |
| man7 | 1473 | 13 |
| man14 | 1449 | 17 |

TABLE 5

The summary of the amino acid sequences deduced from the GH5 mannanase encoding gene sequences from *Bacillus clausii* KSM-K16, *Bacillus hemicellulosilyticus* JCM 9152 and *Virgibacillus soli* PL205.

| Man protein | No of AAs | Length of SS | CBM | Predicted MW (Da), ss not included | Predicted pI, ss not included | SEQ ID NO |
|---|---|---|---|---|---|---|
| Man6 | 324 | 35 | | 31.84 | 4.56 | 11 |
| Man7 | 490 | 21 | Yes | 51.36 | 4.81 | 15 |
| Man14 | 482 | 16 | Yes | 50.68 | 4.35 | 19 |

Example 3: PCR-Cloning of Bacterial Mannanases Man6 and Man7 in *Trichoderma reesei*

Standard molecular biology methods were used in the isolation and enzyme treatments of DNA (e.g. isolation of plasmid DNA, digestion of DNA to produce DNA fragments), in *E. coli* transformations, sequencing etc. The basic methods used were either as described by the enzyme, reagent or kit manufacturer or as described in the standard molecular biology handbook, e.g. Sambrook and Russell (2001). Isolation of genomic DNA was performed as described in detail by Raeder and Broda (1985).

Man6 and man7 from *Bacillus clausii* and *Bacillus hemicellulosilyticus*, respectively, were also cloned for expression in *Trichoderma reesei* The genes were PCR-cloned using synthetic genes with codon optimization for *Trichoderma reesei*. DNA sequences encoding the signal peptides of man6 and man7 were removed using PCR and new cloning sites created. The sequences of the primers are shown in Table 6 (SEQ ID NOs: 21-24).

TABLE 6

The oligonucleotides used as PCR primers to amplify *Bacillus hemicellulosilyticus* and *Bacillus clausii* mannanase genes.

| Template, (synthetic) DNA from | Oligo-nucleotides | Length (bp) | Sequence[a] | SEQ ID NO: |
|---|---|---|---|---|
| *Bacillus hemicellulosilyticus* | BMAN1 | 60 | 5'-AGTCAATCGCGACAAGCGCCAGA CCCACTCGGGCTTCTACATCGAGGGC TCGACGCTCTA-3' (s) | 21 |
| *Bacillus hemicellulosilyticus* | BMAN2 | 46 | 5'-CGCGCCGGATCCTTACTGGATCG TGACGTGGTCCAGGTAGATGGCG-3' (as) | 22 |
| *Bacillus clausii* | BMAN3 | 60 | 5'-AGTCAATCGCGACAAGCGCCAGA ACGGCTTCCACGTCTCCGGCACGGAG CTCCTGGACAA-3' (s) | 23 |
| *Bacillus clausii* | BMAN4 | 50 | 5'-CGCGCCGGATCCTTAGTCGCTCT TCAGGCCGTTCTCGCCGTAGACGATG CG-3' (as) | 24 |

[a]"s" in parenthesis = sense strand, "as" = antisense strand.

The genes were amplified by PCR with primers described in Table 6 and using synthetic DNAs as templates in the reactions. The PCR mixtures of *Bacillus clausii* man6 and *Bacillus hemicellulosilyticus* man7 contained each 1×HF buffer for Phusion HF Polymerase (NEB/BioNordika, Finland), 0.2 mMdNTP mix (Thermo Fisher Scientific, Finland), 1 μM each primer, 3% DMSO (Thermo Fisher Scientific), 1 unit of Phusion High-Fidelity Polymerase (NEB/BioNordika, Finland) and 50 ng of the corresponding plasmid DNA. The conditions for the PCR reactions were the following: 30 sec initial denaturation at 98° C., followed by 28 cycles of 10 sec at 98° C., 30 sec annealing at one of the following 45/50/55/60° C., 45 sec extension at 72° C. and the final extension at 72° C. for 7 min.

Primer combination described in Table 6 produced specific DNA products having the expected sizes. The PCR products were isolated from agarose gel with GenJet Gel Extraction Kit (Thermo Fisher Scientific) according to manufacturer's instructions, digested with NruI and BamHI restriction enzymes (Thermo Fisher Scientific) and cloned into an expression vector cleaved with NruI and BamHI. Ligation mixtures were transformed into *Escherichia coli* XL1-Blue (AH Diagnostics) and plated on LB (Luria-Bertani) plates containing 50-100 μg/ml ampicillin. Several *E. coli* colonies were collected from the plates and DNA was isolated with GenJet Plasmid Miniprep Kit (Thermo Fisher Scientific). Positive clones were screened using restriction digestions. The genes encoding the *Bacillus clausii* man6 and *Bacillus hemicellulosilyticus* man7 GH5 mannanases without their own signal peptide encoding sequences were sequenced and the plasmids were named pALK4274 and pALK4273, respectively (For details see Example 6).

Example 4: Cloning of Synthetic Bacterial Mannanase Man14

Standard molecular biology methods were used in the isolation and enzyme treatments of DNA (e.g. isolation of plasmid DNA, digestion of DNA to produce DNA fragments), in *E. coli* transformations, sequencing etc. The basic methods used were either as described by the enzyme, reagent or kit manufacturer or as described in the standard molecular biology handbook, e.g. Sambrook and Russell (2001). Isolation of genomic DNA was performed as described in detail by Raeder and Broda (1985).

Mannanase gene man14 from *Virgibacillus soli* was also cloned for *Trichoderma* expression as well. The gene encoding GH5 family mannanase Man14 from *Virgibacillus soli* was ordered from GenScript as a synthetic construct with codon optimization for *Trichoderma reesei*.

Plasmid DNA obtained from GenScript including the man14 gene was re-suspended in sterile water, digested with NruI and BamHI restriction enzymes (Thermo Fisher Scientific) according to manufacturer's instructions and cloned into an expression vector cleaved with NruI and BamHI. Ligation mixture was transformed into *Escherichia coli* XL1-Blue (AH Diagnostics) and plated on LB (Luria-Bertani) plates containing 50-100 μg/ml ampicillin. Several *E. coli* colonies were collected from the plates and DNA was isolated with GenJet Plasmid Miniprep Kit (Thermo Fisher Scientific). Positive clones were screened using restriction digestions and they were shown to contain inserts of expected sizes. Fusion sites of *Virgibacillus soli* man14 to the expression plasmid were sequenced and the plasmid was named pALK4414 (For details see Example 6).

Example 5: Production of Recombinant Bacterial GH5 Mannanase Proteins in *Bacillus*

Expression plasmids were constructed for production of recombinant GH5 mannanase (Man6, Man7 and Man14) proteins from *Bacillus clausii, Bacillus hemicellulosilyticus* and *Virgibacillus soli*. The expression plasmids constructed are listed in Table 7. The recombinant GH5 genes (man6, man7 and man14), without their own signal sequences, were fused to the *Bacillus licheniformis* PaprE promoter and *B. amyloliquefaciens* xylanase signal peptide. The transcription termination was ensured by a strong terminator and a kanamycin resistance marker was used for selection of the transformants. The transformations were performed as described in Example 2.

TABLE 7

The expression plasmids constructed to produce Man6, Man7 and Man14 recombinant proteins from *Bacillus clausii*, *Bacillus hemicellulosilyticus* and *Virgibacillus soli* in an appropriate *Bacillus* expression strain.

| Mannanase (GH5) protein | Expression plasmid |
|---|---|
| Man6 | pEV1 Man6 |
| Man7 | pEV1 Man7 |
| Man14 | pEV1 Man14 |

The GH5 production of the transformants was analyzed from the culture supernatants of the shake flask cultivations. The transformants were inoculated from the LB plates to shake flasks containing 2% glucose, 6% corn steep powder, 1.3% (NH4)2HPO4, 0.05% MgSO4×7H2O and 0.5% CaCl2. pH was adjusted to pH 7.5. The GH5 protein production of the transformants was analyzed from culture supernatants after growing them for 30 hours at 37° C., 180 rpm. Heterologous production of recombinant proteins was analyzed by SDS-PAGE with subsequent Coomassie staining. The best producing transformants were chosen to be cultivated in laboratory scale bioreactors. The transformants were cultivated in bioreactors at 37° C. under protein inducing conditions and additional feeding until a suitable yield was reached. The supernatants were recovered for application tests by centrifugation or filtration.

Example 6: Production of Recombinant Bacterial GH5 Mannanase Proteins in *Trichoderma reesei*

Figure 2:
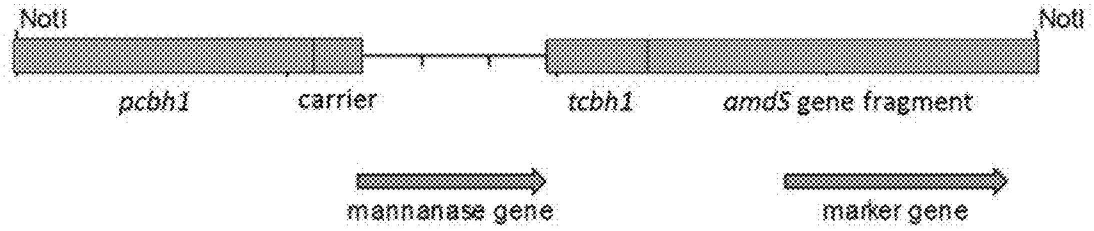
FIG. 2 schematically shows the expression cassettes used in the transformation of *Trichoderma reesei* protoplasts for overproducing the recombinant mannanase proteins (Man6, Man7 and Man14). The mannanase genes were under the control of *T. reesei* cel7A/cbh1 promoter (pcbh1) and the termination of the transcription was ensured by using *T. reesei* cel7A/cbh1 terminator sequence (tcbh1). The amdS gene was included as a transformation marker.

Expression plasmids were constructed for production of recombinant GH5 mannanase (Man6, Man7 and Man14) proteins from *Bacillus clausii, Bacillus hemicellulosilyticus* and *Virgibacillus soli* (See Examples 3 and 4) in *Trichoderma reesei*. The expression plasmids constructed are listed in Table 8. The recombinant GH5 genes (man6, man7 and man14), without their own signal sequences, were fused to the *T. reesei* cel7A/cbh1 promoter with *T. reesei* cel6A/cbh2 CBM carrier and linker followed by Kex2 protease recognition site. The transcription termination was ensured by the *T. reesei* cel7A/cbh1 terminator and the *A. nidulans* amdS marker gene was used for selection of the transformants as described in Paloheimo et al. (2003). The linear expression cassettes (FIG. 2) were isolated from the vector backbones after NotI digestions and were transformed into *T. reesei* protoplasts. The host strains used does not produce any of the four major *T. reesei* cellulases (CBHI, CBHII, EGI, EGII). The transformations were performed as in Penttilä et al. (1987) with the modifications described in Karhunen et al. (1993), selecting acetamidase as a sole nitrogen source (amdS marker gene). The transformants were purified on selection plates through single conidia prior to sporulating them on PD.

TABLE 8

The expression cassettes constructed to produce Man6, Man7 and Man14 recombinant proteins from *Bacillus clausii*, *Bacillus hemicellulosilyticus* and *Virgibacillus soli* in *Trichoderma reesei*. The overall structure of the expression cassettes was as described in FIG. 2.

| Mannanase (GH5) protein | Expression plasmid | Expression cassette[(a] |
|---|---|---|
| Man6 | pALK4274 | 7.0 kb NotI |
| Man7 | pALK4273 | 7.5 kb NotI |
| Man14 | pALK4414 | 7.6 kb NotI |

[(a]The using expression cassette for *T. reesei* transformation was isolated from vector backbone by using NotI digestion.

The mannanase production of the transformants was analyzed from the culture supernatants of the shake flask cultivations. The transformants were inoculated from the PD slants to shake flasks containing 50 ml of complex lactose-based cellulase inducing medium (Joutsjoki at al. 1993) buffered with 5% $KH_2PO_4$. The GH5 protein production of the transformants was analyzed from culture supernatants after growing them for 7 days at 30° C., 250 rpm. Heterologous production of recombinant proteins was analyzed by SDS-PAGE with subsequent Coomassie staining. The best producing transformants were chosen to be cultivated in laboratory scale bioreactors. The transformants were cultivated in bioreactors either on batch or by additional feeding type of process under protein inducing conditions at a typical mesophilic fungal cultivation temperature and slightly acidic conditions. The cultivation was continued until depletion of the medium sugars or until suitable yield was reached. The supernatants were recovered for application tests by centrifugation or by filtration.

Example 7: Assay of Galactomannanase Activity by DNS-Method

Mannanase activity (MNU) was measured as the release of reducing sugars from galactomannan (0.3 w/w-%) at 50° C. and pH 7.0 in 5 min. The amount of released reducing carbohydrates was determined spectrophotometrically using dinitrosalicylic acid. Substrate (0.3 w/w-%) used in the assay was prepared as follows: 0.6 g of locust bean gum (Sigma G-0753) was in 50 mM sodium citrate buffer pH 7 (or citrate phosphate buffer pH 7) at about 80° C. using a heating magnetic stirrer and heated up to boiling point. The solution was cooled and let to dissolve overnight in a cold room (2-8° C.) with continuous stirring and insoluble residues were removed by centrifugation. After that solution was filled up to 200 ml by buffer. Substrate was stored as frozen and melted by heating in a boiling water bath to about 80° C., cooled to room temperature and mixed carefully before use. DNS reagent used in the assay was prepared by dissolving 50 g of 3.5-dinitrosalisylic acid (Sigma D-550) in about 4 liter of water. With continuous magnetic stirring 80.0 g of NaOH was gradually added and let to dissolve. An amount of 1500 g of Rochelle Salt (K—Na-tartrate, Merck 8087) was added in small portions with continuous stirring. The solution that might have been cautiously warmed to a maximum temperature of 45° C., was cooled to room temperature and filled up to 5000 ml. After that it was filtered through Whatman 1 filter paper and stored in a dark bottle at room temperature. The reaction was first started by adding 1.8 ml of substrate solution to each of the two test tubes and let to equilibrate at 50° C. for 5 minutes, after which 200 μl of suitably diluted enzyme solution was added to one of the tubes, mixed well with vortex mixer and incubated exactly for 5 min at 50° C. Enzyme blanks didn't need to be equilibrated or incubated. The reaction was stopped by adding 3.0 ml of DNS reagent into both tubes and mixed. 200 μl of sample solution was added to the enzyme blank tubes. Both tubes were placed in a boiling water bath. After boiling for exactly 5 minutes, the tubes were placed in a cooling water bath and allow them to cool to room temperature. The absorbance of sample was measured against the enzyme blank at 540 nm and activity was read from the calibration curve and multiplied by the dilution factor. A suitable diluted sample yielded an absorbance difference of 0.15-0.4. Standard curve was prepared 20 mM from mannose stock solution by dissolving 360 mg of mannose (SigmaM-6020, stored in a desiccator) in assay buffer and diluted to solutions containing 3, 6, 10 and 14 μmol/ml of mannose. Standards were handled like the samples except for incubating at 50° C. The absorbances were measured against the reagent blank (containing buffer instead of standard dilution of mannose) at 540 nm. Calibration curve was constructed for every series of assays. One mannanase unit (MNU) was defined as the amount of enzyme that produces reductive carbohydrates having a reductive power corresponding to one nmol of mannose from galactomannan in one second under the assay conditions (1 MNU=1nkat).

Example 8: Purification of Man6 Mannanase

Cells and solids were removed from the fermentation culture medium by centrifugation for 10 min, 4000 g at 4° C. The supernatant of 10 ml was used for protein purification. The sample was filtered through 0.44 μm PVDF membrane (Millex-HV, Merck Millipore Ltd, Carrigtwohill, IRL). The filtrate was loaded onto a HiPrep 26/10 Desalting column (GE Healthcare, Uppsala, Sweden) equilibrated in 20 mM HEPES pH 7. The desalted sample was then loaded onto a 5 ml HiTrap Q HP column (GE Healthcare, Uppsala, Sweden) pre-equilibrated with 20 mM HEPES pH 7. After sample loading, the column was washed with the same buffer for 20 ml. Proteins were eluted with linear salt gradient 20 mM HEPES, 500 mM NaCl pH 7 in 15 CVs. Fractions of 5 ml were collected and analyzed on SDS-PAGE. The fractions containing target protein were combined and concentrated to 2 ml using Vivaspin 20, 10 kDa MWCO ultrafiltration devices (GE Healthcare). The concentrated sample was further fractionated using Superdex 75 26/60 gel-filtration column equilibrated with 20 mM IVIES, 200 mM NaCl pH 6.5. Fractions of 2 ml were collected and analyzed by SDS-PAGE. Fractions containing pure mannanase were combined. Other mannanases were purified using the same protocol but changing the buffer composition in desalting and ion exchange steps. Buffer compositions are shown in Table 9.

TABLE 9

Buffers used in ion exchange chromatography

| Mannanase | Buffers used in ion exchange chromatography |
|---|---|
| Man6 | 20 mM HEPES pH 7 |
| Man7 | 20 mM HEPES pH 7 |
| Man14 | 20 mM MES pH 6 |

Purified samples were above 95% pure.

Purified samples were above 95% pure.

Enzyme content of the purified sample was determined using UV absorbance 280 nm measurements. Excitation coefficients for each mannanases were calculated on the bases of amino acid sequence of the enzyme by using ExPASy Server http://web.expasy.org/protparam/. (Gasteiger E et al 2005). The enzyme activity (MNU) of purified samples was measured as release of reducing sugars as described in Example 7. The specific activity (MNU/mg) of mannanases was calculated by dividing MNU activity of purified sample with the amount of purified enzyme. Obtained values were used for calculating enzyme dosages used in Examples 10 and 11.

pH Profiles of Mannanases

Figure 3:
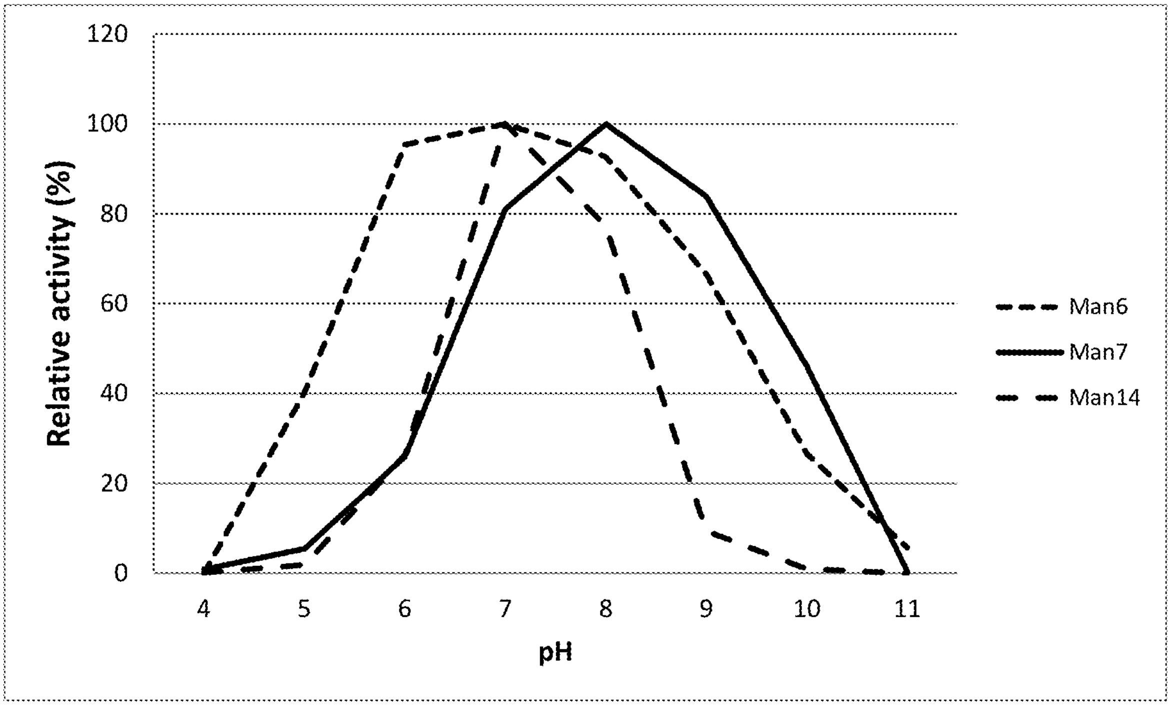
FIG. 3 shows the temperature profile of recombinant Man6, Man7 and Man14 (*Bacillus* produced) mannanase assayed in 40 mM Britton-Robinson buffer pH 7 using about 10 min reaction time, Azurine-crosslinked carob galactomannan was used as a substrate. All measurements were made at least duplicates. The data points are averages of separate measurements.

The pH profiles of purified mannanases were determined using the beta-mannazyme tablet assay Azurine-crosslinked carob galactomannan (T-MNZ 11/14) from Megazyme with minor modifications to the suggested protocol. The linearity of the assay has been checked with each purified enzymes. The assay was performed in 40 mM Britton-Robinson buffer adjusted to pH values between 4 and 11. The enzyme solution was diluted into the assay buffer and 500 μl of enzyme solution was equilibrated at 50 C water bath for 5 min before adding one substrate tablet. After 10 minutes, the reaction was stopped by adding 10 ml 2% Tris pH 12. The reaction tubes were left at room temperature for 5 min, stirred and the liquid filtered through a Whatman No. 1 paper filter. Release of blue dye from the substrate was quantified by measuring the absorbance at 595 nm. Enzyme activity at each pH was reported as relative activity where the activity at the pH optimum was set to 100%. The pH profiles were shown in FIG. 3.

Relative activity (%) of mannanase is calculated by dividing mannanase activity of a sample by the mannanase activity of a reference sample. In the case of pH profile, the reference sample is a sample at the optimal pH. In the case of temperature profile the reference sample is a sample at the optimal temperature.

Temperature Profiles of Mannanases

Figure 4:
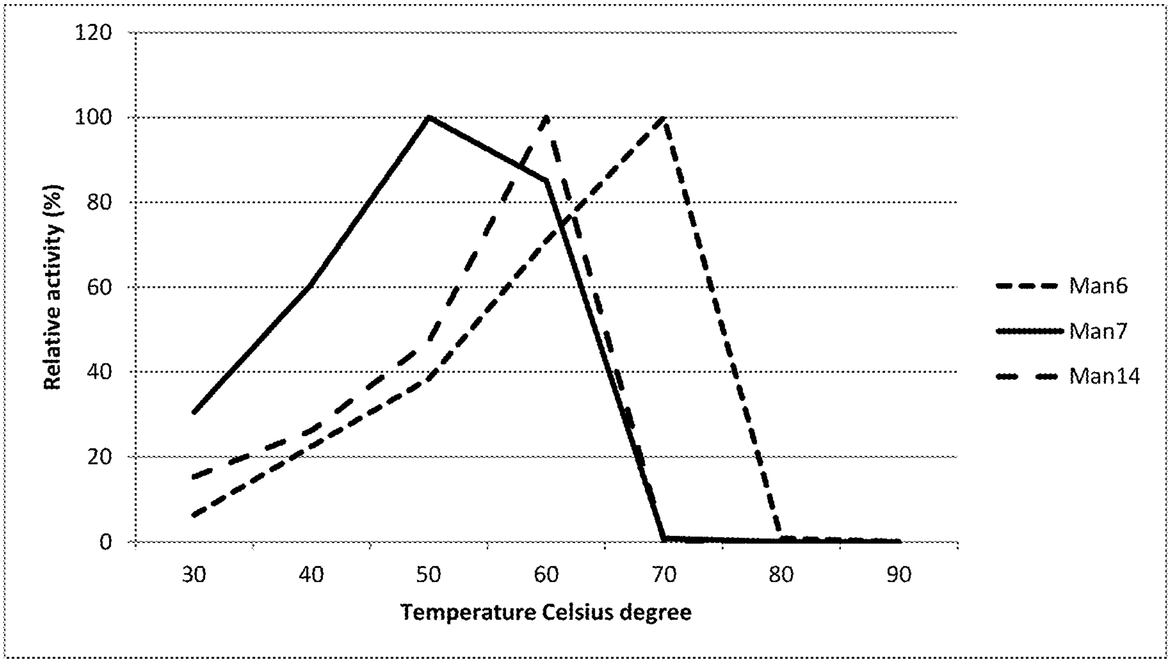
FIG. 4 describes the effect of pH on the activity of recombinant Man6, Man7 and Man14 (*Bacillus* produced) mannanase protein in 40 mM Britton-Robinson buffer at about pH 4 to about pH 11. Reaction temperature was about 50° C. and the reaction time was about 10 min. Azurine-crosslinked carob galactomannan was used as a substrate. All measurements were made at least duplicates. The data points are averages of separate measurements.
Figure 5:
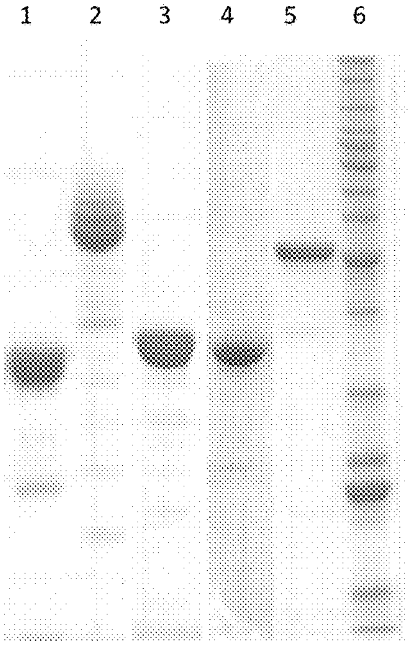
FIG. 5 shows SDS PAGE analysis of bacterial mannanases.

The temperature optimum of purified mannanases was determined using the beta-mannazyme tablet assay Azurine-crosslinked carob galactomannan (T-MNZ 11/14) from Megazyme with minor modifications to suggested protocol. The assay was performed at temperatures varying between 30-90° C. for 10 minutes in 40 mM Britton-Robinson buffer pH7. Enzyme activity was reported as relative activity where the activity at temperature optimum was set to 100%. The temperature profiles were shown in FIG. 4.

Temperature and pH Characteristics of Mannanases

Man6 has a molecular mass between 30-35 kDa. The optimal temperature of the enzyme at pH 7 is from 50° C. to 70° C. Said enzyme has pH optimum at the pH range of at least pH 6 to pH 9 at 50° C. The optimal temperature and pH optimum were determined using 10 min reaction time and Azurine-crosslinked carob galactomannan as a substrate.

Man7 has a molecular mass between 50-55 kDa. The optimal temperature of the enzyme at pH 7 is from 50° C. to 70° C. Said enzyme has pH optimum at the pH range of at least pH 7 to pH 10 at 50° C. The optimal temperature and pH optimum were determined using 10 min reaction time and Azurine-crosslinked carob galactomannan as a substrate.

Man14 has a molecular mass between 30-40 kDa. The optimal temperature of the enzyme at pH 7 is from 50° C. to 70° C. Said enzyme has pH optimum at the pH range of at least pH 7 to pH 8 at 50° C. The optimal temperature and pH optimum were determined using 10 min reaction time and Azurine-crosslinked carob galactomannan as a substrate.

Example 9: Stain Removal Performance of Man6 and Man7 Mannanases with Commercial Detergents without Bleaching Agents Man6 and Man7 mannanases produced in *Bacillus* (as described in Example 5) and in *Trichoderma* (as described in Example 6), were tested for their ability to remove mannanase sensitive standard stains at 40° C. and water hardness of 16° dH with commercial detergents without bleaching agents and compared to commercial mannanase preparation Mannaway® 4.0 L (Novozymes). The following artificially soiled test cloths from Center for testmaterial B.V. (the Netherlands) were used: Chocolate pudding mannanase sensitive on cotton (E-165), Locust bean gum, with pigment on cotton (C-S-73) and on polyester/cotton (PC-S-73) and Guar gum with carbon black on cotton (C-S-43). The fabric was cut in 6 cm×6 cm swatches and 2 pieces of each were used in test.

Commercial heavyduty liquid detergent A containing all other enzymes except mannanase was used at concentration of 4.4 g per liter of wash liquor and Commercial Color detergent powder without enzymes was used at 3.8 g/l. Detergent containing wash liquors we prepared in synthetic tap water with hardness of 16° dH. Protease Savinase® 16 L (0.5 w/w %) and amylase Stainzyme® 12 L (0.4 w/w %) was added into hard water used with commercial Color detergent powder, the liquid detergent already contained amylase and protease. pH of the wash liquor of Color detergent powder was approximately 10 and with the liquid detergent approximately 8.3.

Mannanase dosages were in range 0-0.2/0.25% of detergent weight but for the evaluation the dosages were calculated as enzyme activity units (MNU) per ml wash liquor or as mg of active enzyme protein (AEP) per 1 of wash liquor. Activity was measured as described in Example 7. AEP content of each preparation was calculated by dividing the enzyme activity with specific activity, defined in Example 8. Control sample contained the detergent solution but no mannanase.

For synthetic tap water with hardness of 16° dH the following stock solutions were prepared in deionized water (Milli-Q or equivalent):

Stock solution with 1000° d Calcium-hardness: CaCl2×2 $H_2O$ (1.02382.1000, Merck KGaA, Germany) 26.22 g/l Stock solution with 200° d Magnesium-hardness: MgSO4×7 $H_2O$ (1.05886.1000, Merck KGaA, Germany) 8.79 g/l $H_2O$ $NaHCO_3$ stock solution: $NaHCO_3$ (1.06329.1000 Merck KGaA, Germany) 29.6 g/l 13.3 ml CaCl2 solution, 13.3 ml MgSO4 solution and 10.0 ml of freshly made $NaHCO_3$ solution were added in volumetric flask in the given order, made up to 1 liter with deionized water and mixed. The hardness of water was determined by complexometric titration and found correct.

Figure 6:
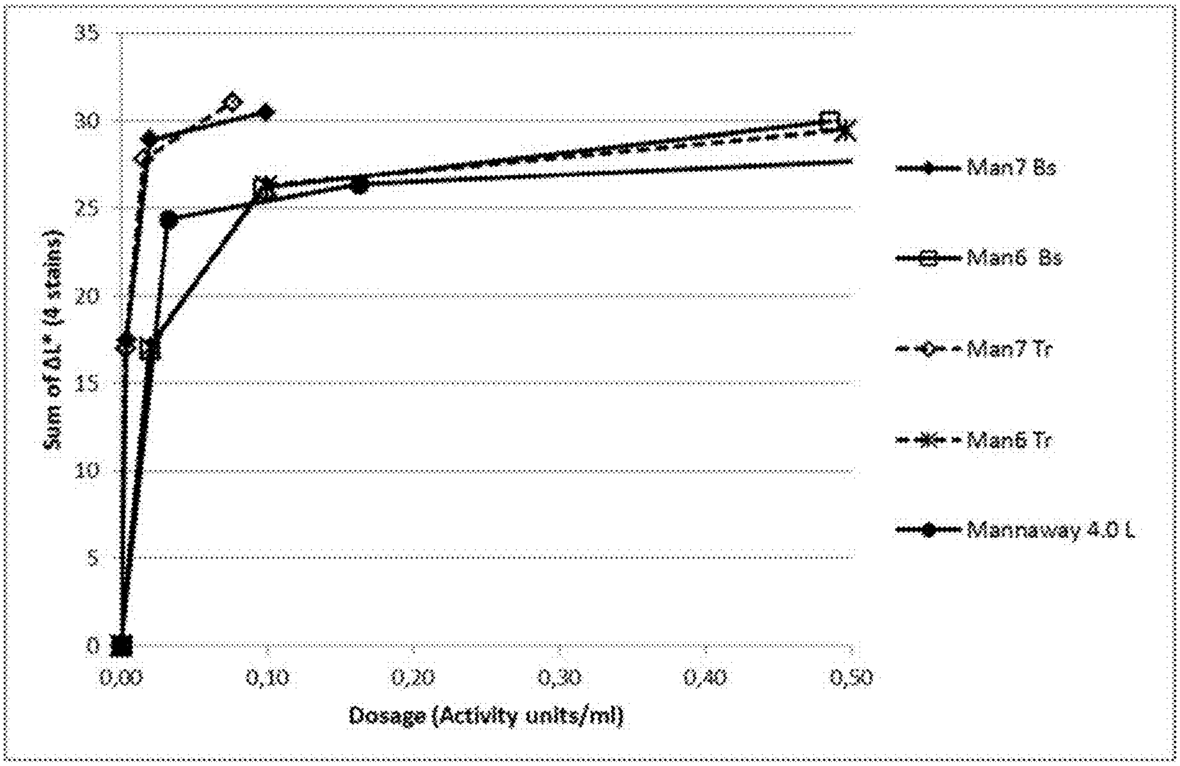
FIG. 6 describes the stain removal performance of Man 6 and Man7 (produced in *Bacillus* and *Trichoderma*) as an increase of lightness (sum of ΔL*of 4 stains) in the presence of about 4.4 g/l of Commercial heavy duty liquid detergent A at about 40° C., about 16° dH, about 60 min, pH approx. 8.3 and enzymes dosed as activity units. Commercial preparation Mannaway® 4.0 L was used for comparison.
Figure 7:
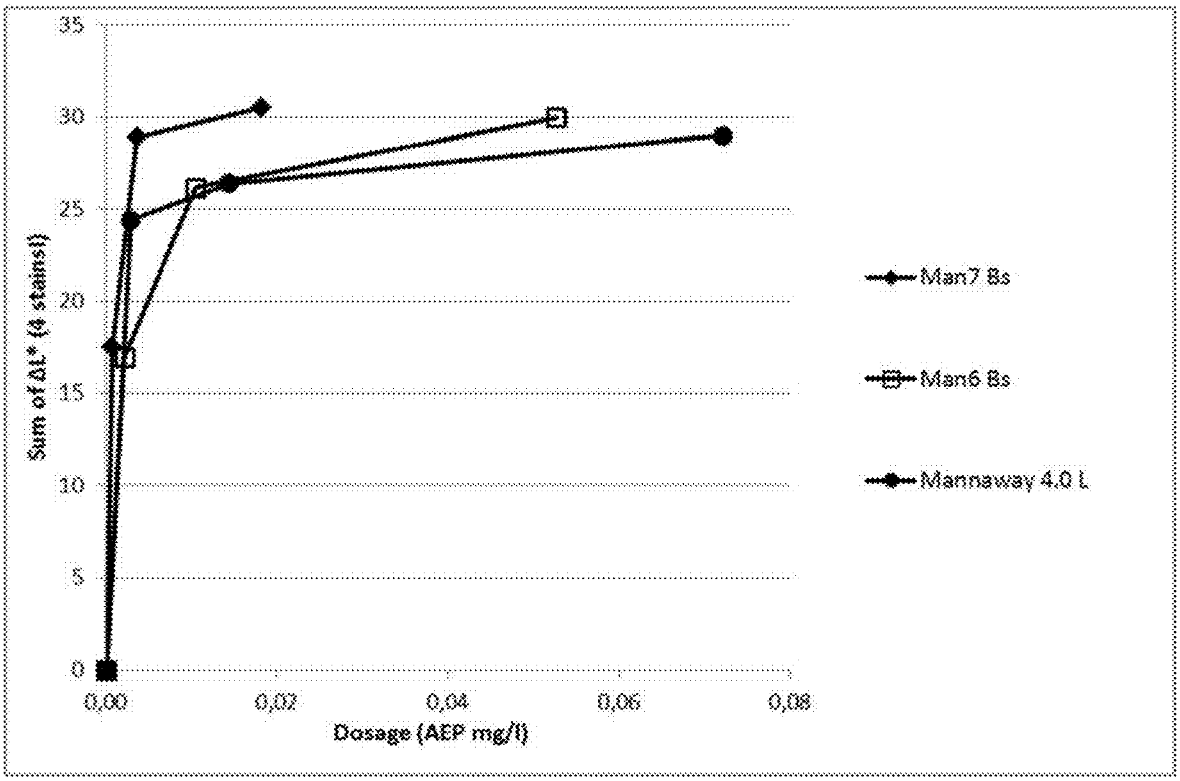
FIG. 7 describes the stain removal performance of Man 6 and Man7 (produced in *Bacillus*) as an increase of lightness (sum of ΔL*of 4 stains) in the presence of about 4.4 g/l of Commercial heavy duty liquid detergent A at about 40° C., about 16° dH, about 60 min, pH approx. 8.3 and enzymes dosed as active enzyme protein (AEP). Commercial preparation Mannaway® 4.0 L was used for comparison.
Figure 8:
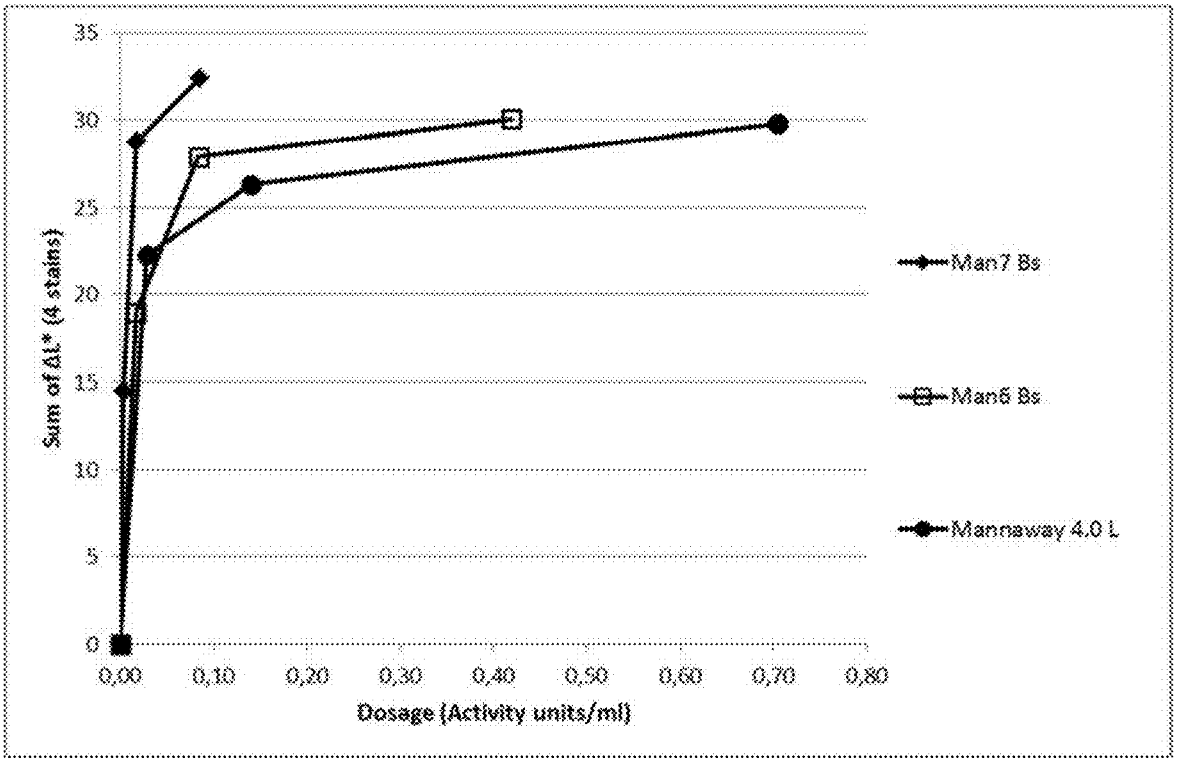
FIG. 8 describes the stain removal performance of Man 6 and Man7 (produced in *Bacillus*) as an increase of lightness (sum of ΔL*of 4 stains) in the presence of about 3.8 g/l of Commercial color detergent powder at about 40° C., about 16° dH, about 60 min, pH approx. 10. and enzymes dosed as activity units. Commercial preparation Mannaway® 4.0 L was used for comparison.
Figure 9:
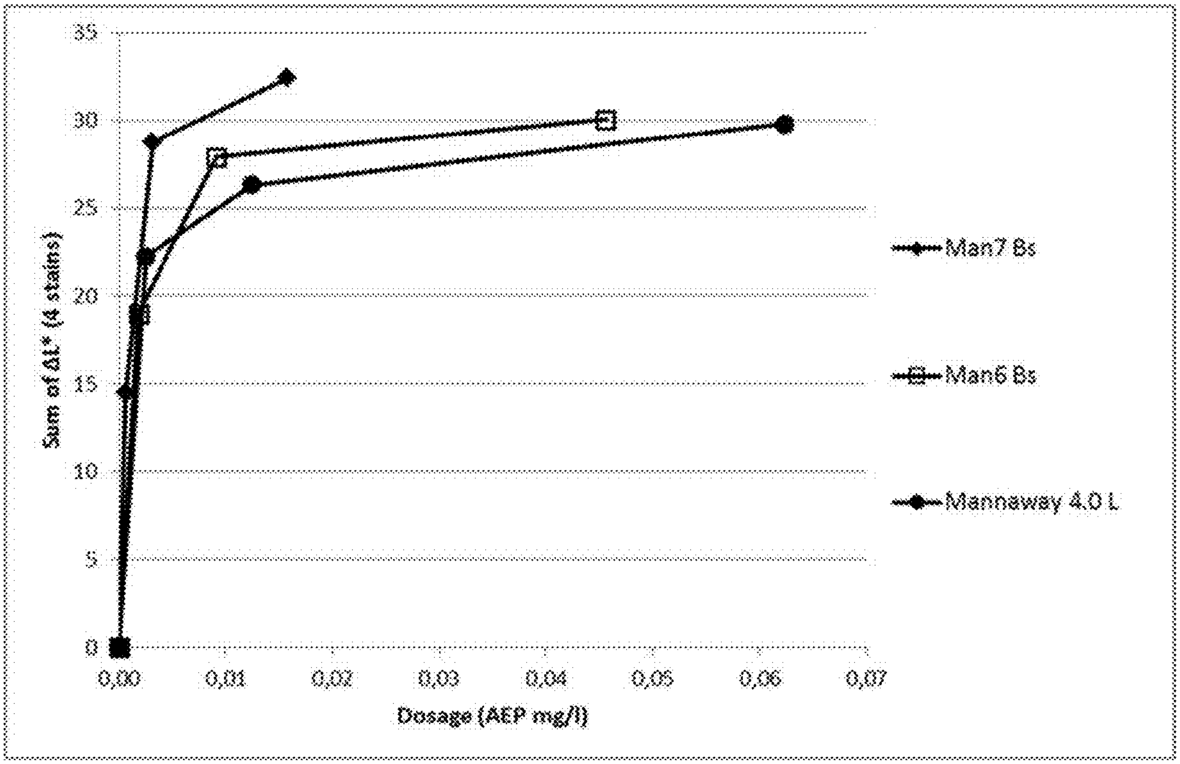
FIG. 9 describes the stain removal performance of Man 6 and Man7 (produced in *Bacillus*) as an increase of lightness (sum of ΔL*of 4 stains) in the presence of about 3.8 g/l of Commercial color detergent powder at about 40° C., about 16° dH, about 60 min, pH approx. 10 and enzymes dosed as active enzyme protein. Commercial preparation Mannaway® 4.0 L was used for comparison.

Stain removal treatments were performed in Atlas LP-2 Launder-Ometer as follows. Launder-Ometer was first preheated to 40° C. Then detergent, 250 ml synthetic tap water with hardness of 16° dH and diluted enzyme (<1.0 ml) were added into 1.2 liter containers. Stains were added and the Launder-Ometer was run at 40° C. for 60 min with a rotation speed of 42 rpm. After that the swatches were carefully rinsed under running water and dried overnight at indoor air, on a grid protected against daylight. The stain removal effect was evaluated by measuring the colour as reflectance values with Konica Minolta CM-3610A spectrophotometer using L*a*b* color space coordinates (illuminant D65/10°, 420 nm cut). Fading of the stains, indicating mannanase performance (stain removal efficiency) was calculated as ΔL* (delta L*), which means lightness value L* of enzyme treated fabric minus lightness value L* of fabric treated with washing liquor without mannanase (control). Final results (total stain removal effect) were shown as sum of ΔL* of each stains. Color values of each stains were average of 2 swatches. The results obtained with commercial liquid detergent are shown in FIGS. 6-7. The mannanases as contemplated herein have similar (Man6) or considerably better (Man7) stain removal performance with liquid detergent when dosed as activity units or as active enzyme protein compared to commercial mannanase preparation Mannaway® 4.0 L. Similar performance was obtained with Man6 and Man7 regardless of the expression host, *Bacillus* or *Trichoderma* (FIG. 6). The results obtained with commercial color detergent powder (FIGS. 8-9) show that the mannanases as contemplated herein have better stain removal performance with color detergent powder when dosed as activity units or as active enzyme protein compared to commercial mannanase preparation Mannaway® 4.0 L.

Figure 10:
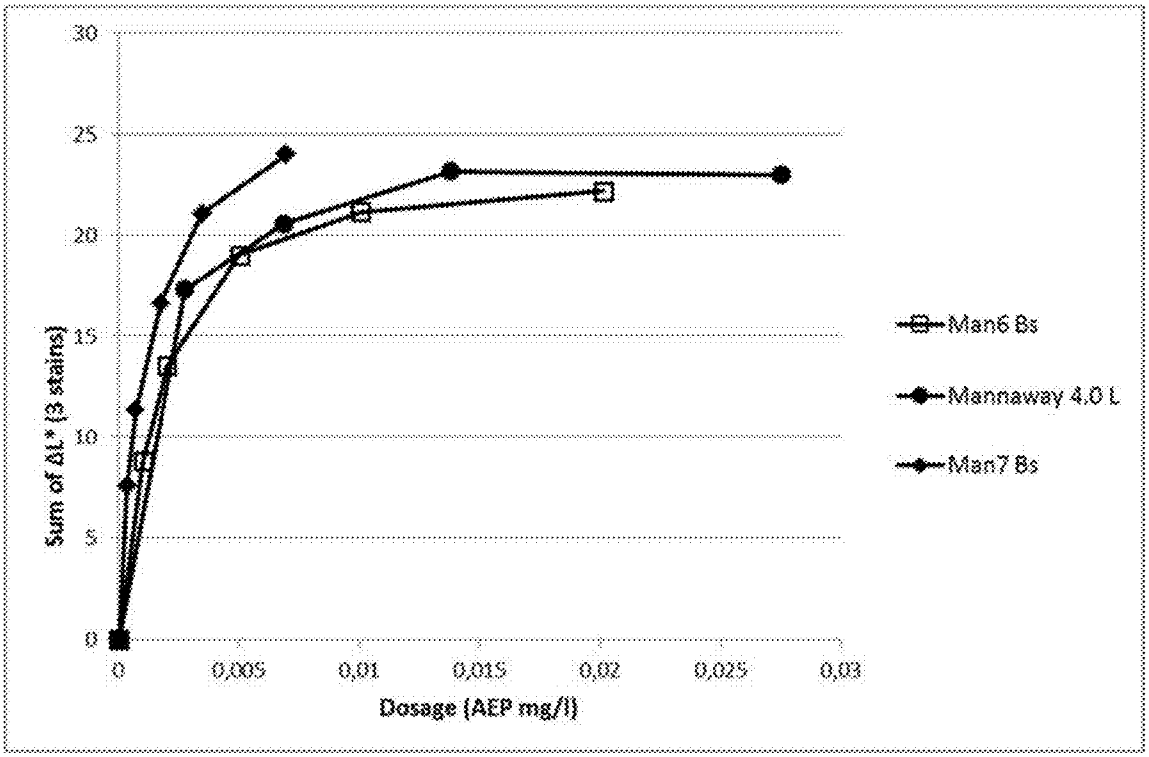
FIG. 10 describes the stain removal performance of Man 6 and Man7 (produced in *Bacillus*) as an increase of lightness (sum of ΔL* of 3 stains) in the presence of about 4.2 g/l of Commercial bleach detergent powder at about 40° C., about 16° dH, about 60 min, pH approx. 9.5 and enzymes dosed as active enzyme protein. Commercial preparation Mannaway® 4.0 L was used for comparison.

Example 10: Stain Removal Performance Man6 and Man7 Mannanases with Bleach Containing Detergent Man6 and Man7 mannanases produced in *Bacillus* (as described in Example 5) were tested for their ability to remove mannanase sensitive standard stains at 40° C. and water hardness of 16° dH with commercial bleach detergent powder and compared to commercial mannanase preparation Mannaway® 4.0 L (Novozymes). Test system was similar to described in Example 9, except 3 different artificially soiled test cloths from Center for testmaterial B.V. (the Netherlands) were used: Chocolate pudding mannanase sensitive on cotton (E-165), Locust bean gum, with pigment on cotton (C-S-73) and Guar gum with carbon black on cotton (C-S-43). Commercial Color detergent powder was used at concentration of 4.2 g per liter of wash liquor and pH of the wash liquor was approx. 9.5. Protease Savinase® 16 L (0.5 w/w %) and amylase Stainzyme® 12 L (0.4 w/w %) were added into hard water used in test, since the detergent didn't contain any enzymes. The color of the swatches after treatment was measured and results calculated as sum of ΔL* of each 3 stains as described in Example 9. The results (FIG. 10) obtained with commercial bleach containing detergent indicate that the mannanase as contemplated herein (Man7) has considerably better stain removal performance compared to commercial mannanase Mannaway® 4.0 L when dosed as active enzyme protein. With Man6 at least similar performance compared to a commercial bacterial mannanase is obtained.

Figure 11:
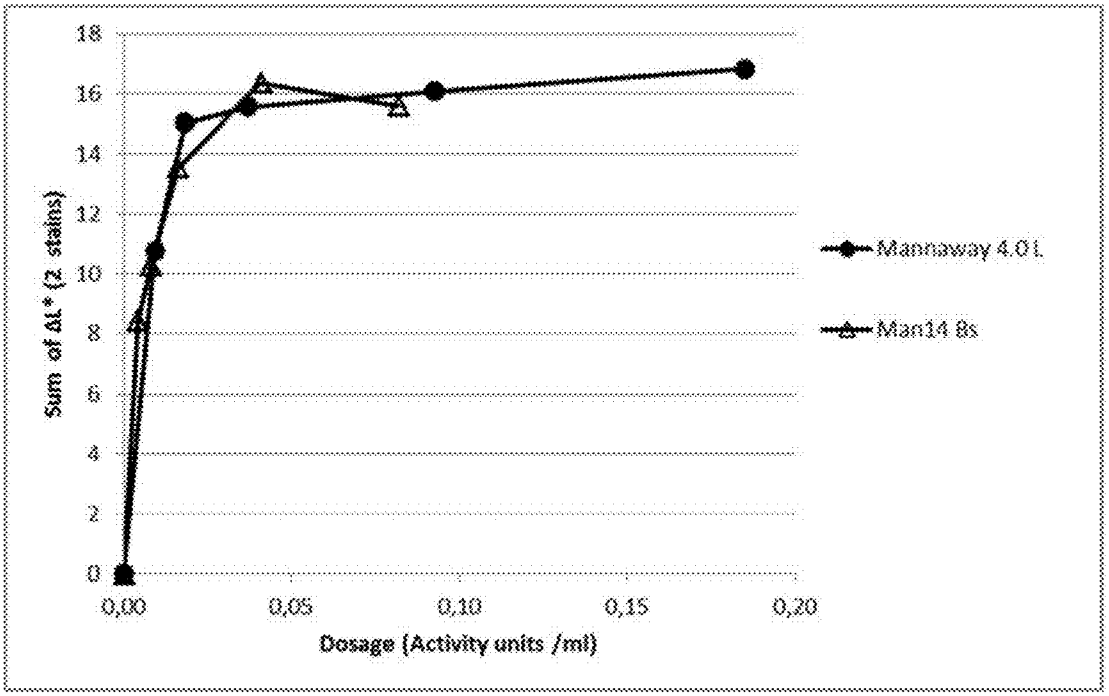
FIG. 11 the stain removal performance of Man14 (produced in *Bacillus*) as an increase of lightness (sum of ΔL*of 2 stains) in the presence of about 5 g/l of Commercial heavy duty liquid detergent B at about 40° C., about 16° dH, about 60 min, pH approx. 8.3 and enzymes dosed as activity units. Commercial preparation Mannaway® 4.0 L was used for comparison.
Figure 12:
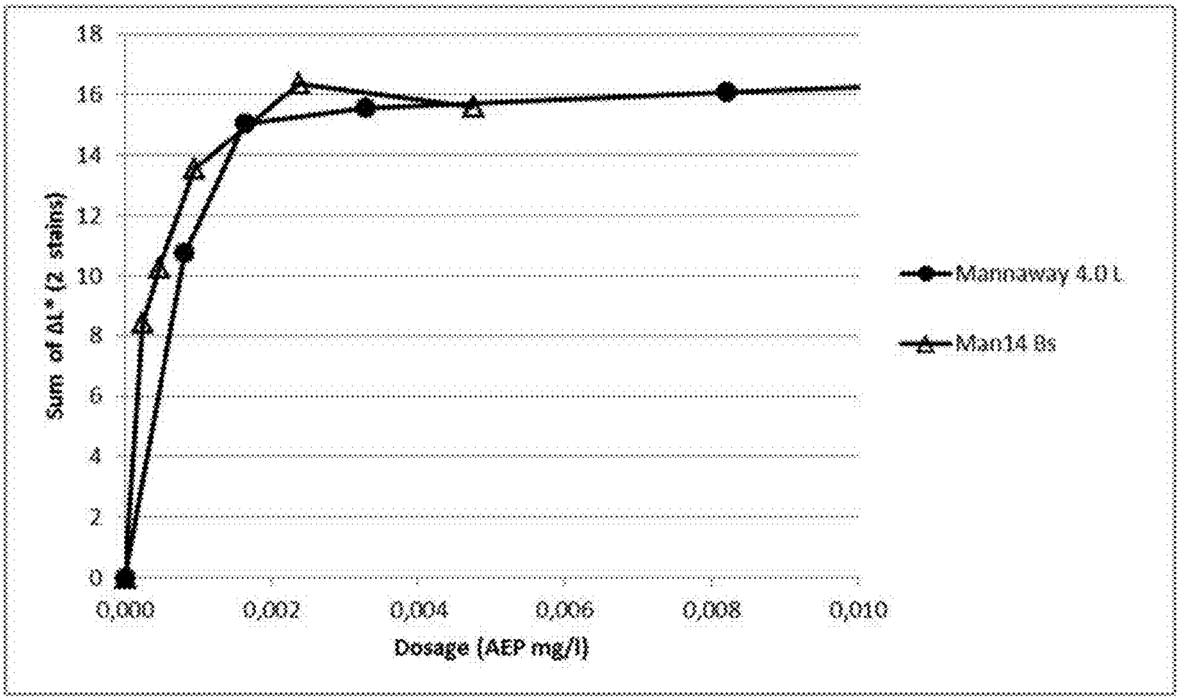
FIG. 12 the stain removal performance of Man14 (produced in *Bacillus*) as an increase of lightness (sum of ΔL*of 2 stains) in the presence of about 5 g/l of Commercial heavy duty liquid detergent B at about 40° C., about 16° dH, about 60 min, pH approx. 8.3 and enzymes dosed as active enzyme protein. Commercial preparation Mannaway® 4.0 L was used for comparison.

Example 11: Stain Removal Performance Man14 Mannanase with Commercial Liquid Detergent Man14 mannanase produced in *Bacillus* (as described in Example 5) was tested for their ability to remove mannanase sensitive standard stains at 40° C. and water hardness of 16° dH with commercial heavy duty liquid detergent B and compared to commercial mannanase preparation Mannaway® 4.0 L (Novozymes). Test system was similar to that described in Example 9, except two different artificially soiled test cloths from Center for testmaterial B.V. (the Netherlands) were used: Chocolate pudding mannanase sensitive on cotton (E-165) and Locust bean gum, with pigment on cotton (C-S-73). Commercial heavy duty liquid detergent B was used at concentration of 5 g per liter of wash liquor and pH of the wash liquor was approx. 8.3. Protease Savinase® 16 L (0.5 w/w %) and amylase Stainzyme® 12 L (0.4 w/w %) were added into hard water used in test, since the detergent didn't contain any enzymes. The color of the swatches after treatment was measured and results calculated as sum of ΔL* of each 2 stains as described in Example 9. The results (FIGS. 11-12) obtained with commercial liquid containing detergent indicate Man14 had good performance in a liquid detergent, comparable to commercial product, when dosed either as activity units or as active enzyme protein.

Figure 13:
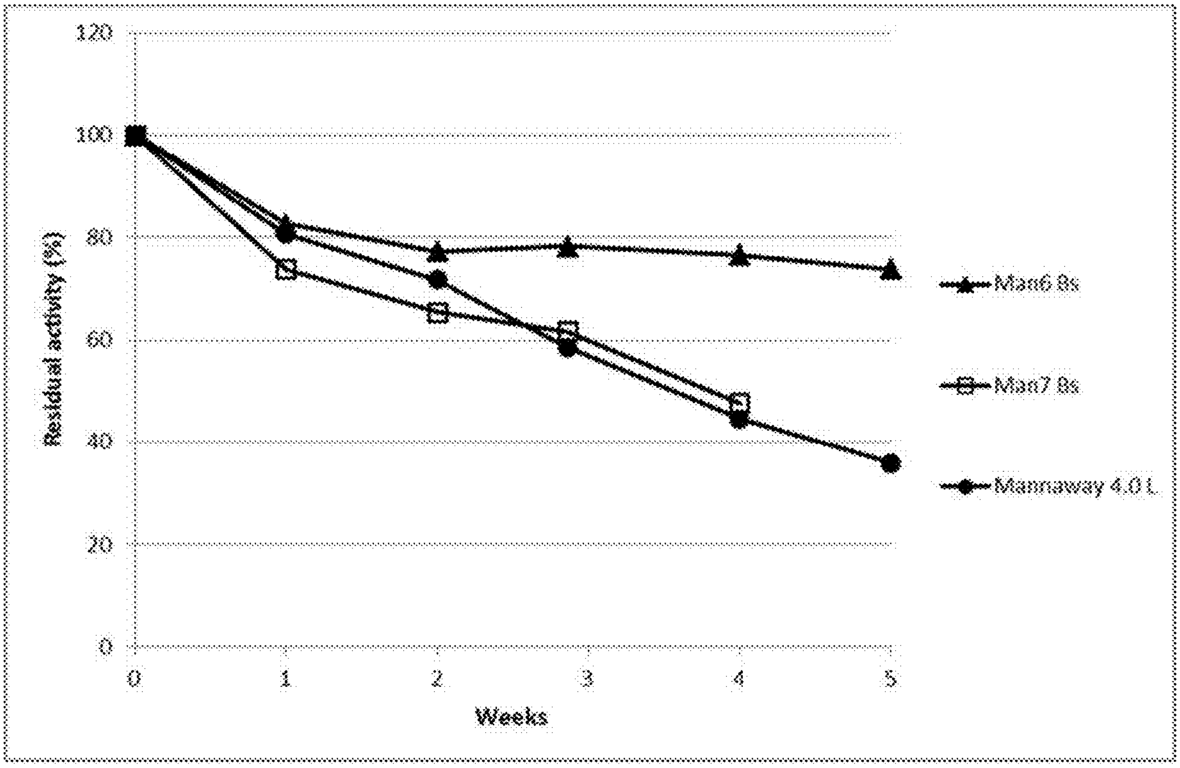
FIG. 13 describes the stability of Man 6 and Man7 (produced in *Bacillus*) in liquid detergent (OMO Color) at about 37° C. Commercial preparation Mannaway® 4.0 L was used for comparison FIG. 14 describes the stability of Man 6 (produced in *Bacillus*) in Commercial heavy duty liquid detergent A. Commercial preparation Mannaway® 4.0 L was used for comparison.
Figure 14:
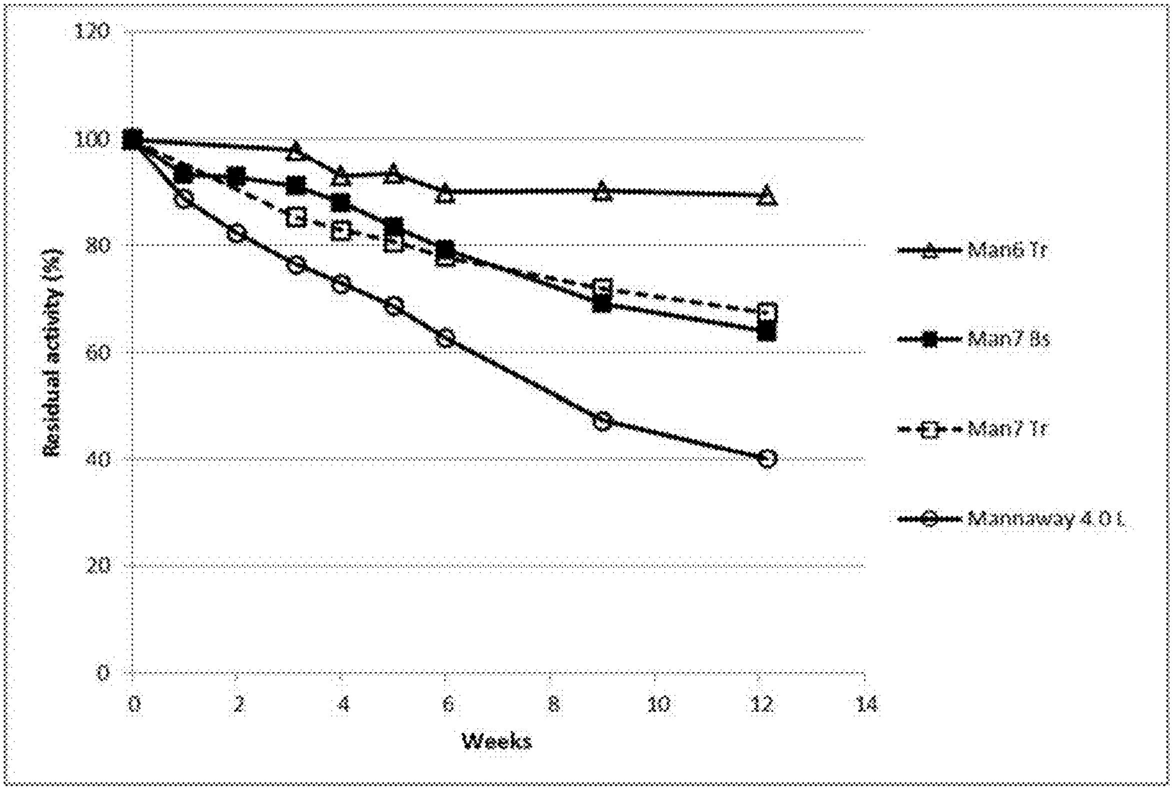

Example 12: Stability of Man6 and Man7 Mannanases in Commercial Liquid Detergents The stability of Man6 and Man7 mannanase preparations produced in *Bacillus* were tested in OMO Color liquid obtained from local super market and compared to commercial mannanase preparation Mannaway® 4.0 L. Mannanase preparations were added 0.5 w/w-% in detergents and samples were incubated in plastic tubes with caps at 37° C. for 5 weeks. The activity was measured at certain intervals by activity assay described in Example 7 except using 30 min incubation time. Results were calculated as residual activity (%), which was obtained by dividing the activity of a sample taken at certain time point by initial activity of the sample. The stability of Man7 produced both in *Bacillus* and *Trichoderma* and Man6 produced in *Trichoderma* were tested against Mannaway® 4.0 L also in commercial liquid heavyduty detergent A containing protease but no mannanase. In this test 1%-(w/w) of mannanases were used and samples incubated for 37° C. for 12 weeks. The results in Omo Color (FIG. 13) show that Man6 had considerably better and Man7 similar stability compared to Mannaway® 4.0 L Both Man7 and especially Man6 were more stable than Mannaway® 4.0 L with another commercial liquid detergent A, as shown in FIG. 14. Results obtained in another test at same conditions showed that Man6 had similar stability regardless of the expression host, *Bacillus* or *Trichoderma* (data not shown). The results of the stability experiments show that the mannanase as contemplated herein is stabile in detergents for several weeks even when stored at high temperature like 37° C. The stability of the mannanases as contemplated herein (Man6 and Man7) is improved compared to a commercial bacterial mannanase in liquid detergent.

Example 13: Wash Performance of Liquid Detergent Compositions as Contemplated Herein The wash performance of liquid detergent compositions according to present disclosure was determined by using standardized stains obtainable from CFT (Center for Testmaterials) B.V., Vlaardingen, Netherlands ("CFT"), Eidgenössische Material- and Prüfanstalt Testmaterialien AG [Federal materials and testing agency, Testmaterials], St. Gallen, Switzerland ("EMPA") and Warwick Equest Ltd Unit 55, Consett Business Park, Consett, County Durham ("Equest").

A liquid washing agent with the following composition was used as base formulation (all values in weight percent):

| Chemical name | Active substance raw material [%] | Active substance detergent formulation [%] |
|---|---|---|
| Water demin. | 100 | Rest |
| Alkyl benzene sulfonic acid | 96 | 2-7 |
| Anionic surfactants | 70 | 6-10 |
| C12-C18 Fatty acid sodium salt | 30 | 1-4 |
| Nonionic surfactants | 100 | 4-7 |
| Phosphonates | 40 | 0.1-2 |
| Citric acid | 100 | 1-3 |
| NaOH | 50 | 1-4 |
| Boronic acid | 100 | 0.1-2 |
| Antifoaming agent | 100 | 0.01-1 |
| Glycerol | 100 | 1-3 |
| Enzymes | 100 | 0.1-2 |
| Preserving agent | 100 | 0.05-1 |
| Ethanol | 93 | 0.5-2 |
| Optical brightener | 90 | 0.01-1 |
| Perfume | 100 | 0.1-1 |
| Dye | 100 | 0.001-0.1 |

The pH of the detergent composition was between 8.2-8.6.

The pH of the detergent composition was between 8.2-8.6.

Based on this base formulation, liquid detergent compositions 1 and 2 were prepared by adding respective enzymes as indicated below:

Composition 1: Enzyme according to SEQ ID NO:12 (Man6)

Composition 2: Enzyme according to SEQ ID NO:16 (Manz)

The wash was performed as follows according to the AISE Method: 3.5 kg Clean ballast cloth, 4 SBL Cloths, Miele washing machine, 20° C. and 40° C. Short program.

All mannanases were added in the same amounts based on total protein content.

The dosing ratio of the liquid washing agent was 4.0 grams per liter of washing liquor. The washing procedure was performed for 60 minutes at a temperature of 20° C. and 40° C., the water having a water hardness between 15.5 and 16.5° (German degrees of hardness).

The results obtained are the difference values between the remission units obtained with the detergents and the remission units obtained with the detergent containing the commercially available reference mannanase (Mannaway® 4.0L, obtained from Novozymes). A positive value therefore indicates an improved wash performance of the detergent compositions comprising the mannanases of present disclosure compared to the same detergent composition comprising the reference mannanase. Within the washing test a large range of stains were tested.

The whiteness, i.e. the brightening of the stains, was determined photometrically as an indication of wash performance. A Minolta CM508d spectrometer device was used, which was calibrated beforehand using a white standard provided with the unit.

The results obtained are the difference values between the remission units obtained with the detergents and the remission units obtained with the detergent containing the enzyme combinations. A positive value therefore indicates an improved wash performance due to the enzyme combinations present in the detergent. Mannanases of the present disclosure in detergent compositions show improved performance on a variety of mannan comprising stains.

| | 20° C. | | 40° C. | |
|---|---|---|---|---|
| Stain | Comp. 1 | Comp. 2 | Comp. 1 | Comp. 2 |
| Chocolate Ice Cream (Equest) | 1.3 | 4.2 | n.d. | n.d. |
| Carte Dor Chocolate Ice Cream (Equest) | n.d. | 3.3 | n.d. | 0.7 |
| Cocoa [CO] (Equest) | n.d. | 2.3 | n.d. | n.d. |
| Mayonnaise/Carbon black color (CFT CS05S [CO]) | 1.3 | 4.3 | 1.1 | 2.2 |
| Salad dressing, with natural black (CFT CS06 [CO]) | 1.2 | 3.5 | 1.2 | 2.6 |
| Lipstick, diluted, Red (CFT CS216 [CO]) | n.d. | 1.5 | n.d. | 0.7 |

Example 14: Wash Performance of Powder Detergent Compositions as Contemplated Herein The wash performance of powder detergent compositions according to present disclosure was determined by using standardized stains obtainable from CFT (Center for Testmaterials) B.V., Vlaardingen, Netherlands ("CFT"), Eidgenössische Material- and Prüfanstalt Testmaterialien AG [Federal materials and testing agency, Testmaterials], St.

Gallen, Switzerland ("EMPA") Warwick Equest Ltd Unit 55, Consett Business Park, Consett, County Durham ("Equest").

A solid washing agent with the following composition was used as base formulation (all values in weight percent):

| Chemical Name | Active substance raw material [%] | Active substance detergent formulation [%] |
|---|---|---|
| Water demin. | 100 | 1-4 |
| Alkyl benzene sulfonic acid | 97 | 9-13 |
| Nonionic surfactants | 100 | 4-7 |
| Percarbonates | 88 | 9-13 |
| TAED | 92 | 1-5 |
| Phosphonates | 60 | 0.1-3 |
| Polyacrylates | 45 | 1-4 |
| Soduim silicate | 40 | 5-10 |
| Sodium carbonate | 100 | 18-22 |
| Carboxymethylcellulose | 69 | 1-4 |
| Soil release polymer | 100 | 0.1-1 |
| Optical brightener | 70 | 0.1-1 |
| Antifoaming agent | t.q. | 0.01-1 |
| Sodium sulfate | 100 | 22-30 |
| Enzymes | 100 | 0.1-1 |
| Perfume | 100 | 0.1-1 |
| NaOH | 100 | 0.1-1 |
| Rest | — | 1-4 |

Based on this base formulation, solid detergent compositions 3 and 4 were prepared by adding respective enzymes as indicated below:

Composition 3: Enzyme according to SEQ ID NO:12 (Man6)

Composition 4: Enzyme according to SEQ ID NO:16 (Manz)

The wash was performed as follows according to the AISE Method: 3.5 kg Clean ballast cloth, 4 SBL Cloths, Miele washing machine, 20° C. and 40° C. Short program. All mannanases were added in the same amounts based on total protein content.

The dosing ratio of the powder washing agent was 3.8 grams per liter of washing liquor. The washing procedure was performed for 60 minutes at a temperature of 20° C. and 40° C., the water having a water hardness between 15.5 and 16.5° (German degrees of hardness).

The whiteness, i.e. the brightening of the stains, was determined photometrically as an indication of wash performance. A Minolta CM508d spectrometer device was used, which was calibrated beforehand using a white standard provided with the unit.

The results obtained are the difference values between the remission units obtained with the detergents and the remission units obtained with the detergent containing the reference mannanase (Mannaway 4.0L, obtained from Novozymes). A positive value therefore indicates an improved wash performance of the variants in the detergent. Mannanases of the present disclosure show improved performance on several stains. Therefore, it is evident that mannanases as contemplated herein show improved wash performance compared to Mannaway.

| | 20° C. | | 40° C. | |
|---|---|---|---|---|
| Stain | Comp. 3 | Comp. 4 | Comp. 3 | Comp. 4 |
| Carte Dor Chocolate Ice Cream (Equest) | 1.4 | 2.8 | 2.1 | 0.5 |
| Vienetta (Equest) | 0.5 | 0.8 | 0.5 | n.d. |

-continued

| | 20° C. | | 40° C. | |
|---|---|---|---|---|
| Stain | Comp. 3 | Comp. 4 | Comp. 3 | Comp. 4 |
| Chocolate Icecream L [CO] (Equest) | 0.9 | 0.9 | 1.1 | n.d. |
| Porridge (EMPA 163 [CO]) | n.d. | n.d. | 1.3 | 5.1 |
| Cocoa (CFT CS02 [CO]) | 1.8 | 3.1 | n.d. | n.d. |
| Mayonnaise/Carbon black color (CFT CS05S [CO]) | n.d. | 1.0 | n.d. | 2.7 |
| Salad dressing, with natural black (CFT CS06 [CO]) | 2.0 | 4.8 | 1.3 | 5.1 |
| Sebum BEY with carbon black (CFT CS32 [CO]) | 0.7 | 1.4 | 0.5 | 0.7 |
| Chocolate drink, pure (CFT CS44 [CO]) | n.d. | 1.4 | n.d. | 0.8 |

Without limiting the scope and interpretation of the patent claims, certain technical effects of one or more of the aspects or embodiments disclosed herein are listed in the following: A technical effect is degradation or modification of mannan. Another technical effect is provision of mannanase which has good storage stability. The foregoing description has provided by way of non-limiting examples of particular implementations and embodiments of the present disclosure a full and informative description of the best mode presently contemplated by the inventors for carrying out the present disclosure. It is however clear to a person skilled in the art that the present disclosure is not restricted to details of the embodiments presented above, but that it can be implemented in other embodiments using equivalent means without deviating from the characteristics of the present disclosure.

Furthermore, some of the features of the above-disclosed aspects and embodiments of this present disclosure may be used to advantage without the corresponding use of other features. As such, the foregoing description should be considered as merely illustrative of the principles of the present disclosure, and not in limitation thereof. Hence, the scope of the present disclosure is only restricted by the appended patent claims. In an embodiment at least one component of the compositions of the present disclosure has a different chemical, structural or physical characteristic compared to the corresponding natural component from which the at least one component is derived from. In an embodiment said characteristic is at least one of uniform size, homogeneous dispersion, different isoform, different codon degeneracy, different post-translational modification, different methylation, different tertiary or quaternary structure, different enzyme activity, different affinity, different binding activity, and different immunogenicity.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A detergent composition comprising at least one enzyme having mannan degrading activity and an amino acid sequence having at least 98% sequence identity to the amino acid sequence of SEQ ID NO: 16.

2. The detergent composition of claim 1, wherein the at least one enzyme has an amino acid sequence having at least 99% sequence identity to the amino acid sequence of SEQ ID NO: 16.

3. The detergent composition of claim 1, the composition further comprising one or more additional enzymes selected from the group of protease, lipase, cutinase, amylase, carbohydrase, cellulase, pectinase, pectatlyase, mannanase, arabinase, galactanase, xylanase, oxidase, xanthanase, laccase, and/or peroxidase.

4. The detergent composition according to claim 1, wherein the composition is in form of a bar, a homogenous tablet, a tablet having two or more layers, a pouch having one or more compartments, a regular or compact powder, a granule, a paste, a gel, or a regular, compact or concentrated liquid.

5. The detergent composition of claim 1, wherein the detergent composition is a laundry detergent composition.

6. A method for removing a stain from a surface, comprising contacting the surface with a detergent composition according to claim 1.

7. A method for degrading mannan comprising applying a detergent composition according to claim 1 to mannan.

8. The detergent composition of claim 1, wherein the at least one enzyme has: (i) a molecular mass in the range of from 50 to 55 kDa; (ii) an optimal temperature at pH 7 in the range of from 50° C. to 70° C.; (iii) an optimal pH range of from pH 7 to pH 10 at 50° C.; or (iv) any of (i)-(iii).

* * * * *

SEQUENCE LISTING

<160> NUMBER OF SEQ ID NOS: 48

<210> SEQ ID NO 1
<211> LENGTH: 39
<212> TYPE: DNA
<213> ORGANISM: Artificial Sequence
<220> FEATURE:
<223> OTHER INFORMATION: primer

<400> SEQUENCE: 1
caaccgcctc tgcagcttat gcacaaaacg gatttcacg 39

<210> SEQ ID NO 2
<211> LENGTH: 39
<212> TYPE: DNA
<213> ORGANISM: Artificial Sequence
<220> FEATURE:
<223> OTHER INFORMATION: primer

<400> SEQUENCE: 2
cggtatatct ctgtcttaat cactcttaag cccattttc 39

<210> SEQ ID NO 3
<211> LENGTH: 37
<212> TYPE: DNA
<213> ORGANISM: Artificial Sequence
<220> FEATURE:
<223> OTHER INFORMATION: primer

<400> SEQUENCE: 3
caaccgcctc tgcagcttct gatggtcata gccaaac 37

<210> SEQ ID NO 4
<211> LENGTH: 36
<212> TYPE: DNA
<213> ORGANISM: Artificial Sequence
<220> FEATURE:
<223> OTHER INFORMATION: primer

<400> SEQUENCE: 4
cggtatatct ctgtcttatt ggattgttac atgatc 36

<210> SEQ ID NO 5
<211> LENGTH: 40
<212> TYPE: DNA
<213> ORGANISM: Artificial Sequence
<220> FEATURE:
<223> OTHER INFORMATION: primer

<400> SEQUENCE: 5
caaccgcctc tgcagctgca agcgggtttt atgtaaacgg 40

<210> SEQ ID NO 6
<211> LENGTH: 39
<212> TYPE: DNA
<213> ORGANISM: Artificial Sequence
<220> FEATURE:
<223> OTHER INFORMATION: primer

<400> SEQUENCE: 6
cggtatatct ctgtcttatt taatggtaac gttatcaac 39

<210> SEQ ID NO 7
<211> LENGTH: 17
<212> TYPE: DNA
<213> ORGANISM: Artificial Sequence
<220> FEATURE:
<223> OTHER INFORMATION: primer

<400> SEQUENCE: 7
agctgcagag gcggttg 17

<210> SEQ ID NO 8
<211> LENGTH: 21
<212> TYPE: DNA
<213> ORGANISM: Artificial Sequence
<220> FEATURE:
<223> OTHER INFORMATION: primer

<400> SEQUENCE: 8
gacagagata taccgacagt g 21

<210> SEQ ID NO 9
<211> LENGTH: 975
<212> TYPE: DNA
<213> ORGANISM: Bacillus clausii

<400> SEQUENCE: 9
atgaagaggg aggacatgga tcaaatgaaa agaaagcggt tacaattgtt tggaacacta 60
gtggtattgg ttttgttcgt gtacggtagc ggttcggcat atgcacaaaa cggatttcac 120
gtatccggta cagagttgtt ggacaaaaat ggcgatcctt atgttatgcg tggcgtcaac 180
catggacact cttggtttaa gcaagatctg gaggaagcaa tccctgccat agcagaaaca 240
ggggcgaaca cggtgagaat ggtcttatcc aatggacagc aatgggaaaa agatgatgcc 300
tctgagcttg cccgtgtgct ggctgccaca gaaacatatg gattgacaac tgtgctggaa 360
gtccatgacg ctacaggaag tgacgatcct gctgatttag agaaagcagt cgattattgg 420
atcgaaatgg ctgatgttct caaggggaca gaagaccgag taatcattaa cgttgccaat 480
gaatggtatg ggtcgtggag gagcgacgtt tgggcagaag catacgcaca agcgatcccg 540
cgcttgcgca gcgctggcct ctcccataca ttaatggttg atgcggcagg ttggggccag 600
taccctgcct ccatccacga gcggggagcc gatgtgtttg cgtccgatcc attaaaaaac 660
acgatgtttt cgatccatat gtacgaatat gcaggagctg atagggcgac aattgcctat 720
aacattgatc gtgtgcttgc tgaaaatctt gctgtggtga tcggtgaatt tggccatagg 780
catcatgatg gcgatgtcga tgaagatgcg attttggcct atacagcaga gcggcaagtg 840
ggctggctgg cctggtcatg gtatggcaac agcgggggtg ttgaatactt ggatttagct 900
gaaggcccat caggcccatt gacgagttgg ggcaaacgaa ttgtttatgg tgaaaatggg 960
cttaagagtg attaa 975

<210> SEQ ID NO 10
<211> LENGTH: 870
<212> TYPE: DNA
<213> ORGANISM: Bacillus clausii

<400> SEQUENCE: 10
cagaacggct tccacgtctc cggcacggag ctcctggaca agaacggcga cccttacgtc 60
atgcgcggcg tcaaccacgg ccacagctgg ttcaagcagg acctcgagga agccatccct 120
gctatcgctg agacgggcgc taacacggtc cgcatggtcc tgagcaacgg ccagcagtgg 180
gagaaggacg acgctagcga gctggctcgc gtcctcgctg ctacggagac gtacggcctc 240
accacggtcc tggaggtcca cgacgctacg ggctcggacg accccgccga cctcgagaag 300

-continued

```
gccgtcgact actggatcga gatggctgac gtcctgaagg gcaccgagga ccgcgtcatc    360

atcaacgtcg ccaacgagtg gtacggctcc tggcgcagcg acgtctgggc cgaggcctac    420

gctcaggcta tccctcgcct ccgctcggcc ggcctctccc acacgctcat ggtcgacgct    480

gccggctggg gccagtaccc tgcttccatc cacgagcgcg gcgctgacgt ctttgcttcg    540

gaccccctga agaacaccat gttctccatc cacatgtacg agtacgctgg cgctgaccgc    600

gctaccatcg cctacaacat cgaccgcgtc ctggctgaga acctggctgt cgtcatcggc    660

gagtttggcc accgccacca cgacggcgac gtcgacgagg acgctatcct ggcttacacc    720

gccgagcgcc aggtcggctg gctggcttgg tcgtggtacg gcaactcggg cggcgtcgag    780

tacctggacc tggctgaggg cccttcgggc cctctcacga gctggggcaa gcgcatcgtc    840

tacggcgaga acggcctgaa gagcgactaa                                     870
```

<210> SEQ ID NO 11
<211> LENGTH: 324
<212> TYPE: PRT
<213> ORGANISM: Bacillus clausii

<400> SEQUENCE: 11

```
Met Lys Arg Glu Asp Met Asp Gln Met Lys Arg Lys Arg Leu Gln Leu
1               5                   10                  15

Phe Gly Thr Leu Val Val Leu Val Leu Phe Val Tyr Gly Ser Gly Ser
            20                  25                  30

Ala Tyr Ala Gln Asn Gly Phe His Val Ser Gly Thr Glu Leu Leu Asp
        35                  40                  45

Lys Asn Gly Asp Pro Tyr Val Met Arg Gly Val Asn His Gly His Ser
    50                  55                  60

Trp Phe Lys Gln Asp Leu Glu Glu Ala Ile Pro Ala Ile Ala Glu Thr
65                  70                  75                  80

Gly Ala Asn Thr Val Arg Met Val Leu Ser Asn Gly Gln Gln Trp Glu
                85                  90                  95

Lys Asp Asp Ala Ser Glu Leu Ala Arg Val Leu Ala Ala Thr Glu Thr
            100                 105                 110

Tyr Gly Leu Thr Thr Val Leu Glu Val His Asp Ala Thr Gly Ser Asp
        115                 120                 125

Asp Pro Ala Asp Leu Glu Lys Ala Val Asp Tyr Trp Ile Glu Met Ala
    130                 135                 140

Asp Val Leu Lys Gly Thr Glu Asp Arg Val Ile Ile Asn Val Ala Asn
145                 150                 155                 160

Glu Trp Tyr Gly Ser Trp Arg Ser Asp Val Trp Ala Glu Ala Tyr Ala
                165                 170                 175

Gln Ala Ile Pro Arg Leu Arg Ser Ala Gly Leu Ser His Thr Leu Met
            180                 185                 190

Val Asp Ala Ala Gly Trp Gly Gln Tyr Pro Ala Ser Ile His Glu Arg
        195                 200                 205

Gly Ala Asp Val Phe Ala Ser Asp Pro Leu Lys Asn Thr Met Phe Ser
    210                 215                 220

Ile His Met Tyr Glu Tyr Ala Gly Ala Asp Arg Ala Thr Ile Ala Tyr
225                 230                 235                 240

Asn Ile Asp Arg Val Leu Ala Glu Asn Leu Ala Val Val Ile Gly Glu
                245                 250                 255

Phe Gly His Arg His His Asp Gly Asp Val Asp Glu Asp Ala Ile Leu
            260                 265                 270
```

-continued

Ala Tyr Thr Ala Glu Arg Gln Val Gly Trp Leu Ala Trp Ser Trp Tyr
275 280 285

Gly Asn Ser Gly Gly Val Glu Tyr Leu Asp Leu Ala Glu Gly Pro Ser
290 295 300

Gly Pro Leu Thr Ser Trp Gly Lys Arg Ile Val Tyr Gly Glu Asn Gly
305 310 315 320

Leu Lys Ser Asp

<210> SEQ ID NO 12
<211> LENGTH: 289
<212> TYPE: PRT
<213> ORGANISM: Bacillus clausii

<400> SEQUENCE: 12

Gln Asn Gly Phe His Val Ser Gly Thr Glu Leu Leu Asp Lys Asn Gly
1 5 10 15

Asp Pro Tyr Val Met Arg Gly Val Asn His Gly His Ser Trp Phe Lys
20 25 30

Gln Asp Leu Glu Glu Ala Ile Pro Ala Ile Ala Glu Thr Gly Ala Asn
35 40 45

Thr Val Arg Met Val Leu Ser Asn Gly Gln Gln Trp Glu Lys Asp Asp
50 55 60

Ala Ser Glu Leu Ala Arg Val Leu Ala Ala Thr Glu Thr Tyr Gly Leu
65 70 75 80

Thr Thr Val Leu Glu Val His Asp Ala Thr Gly Ser Asp Asp Pro Ala
85 90 95

Asp Leu Glu Lys Ala Val Asp Tyr Trp Ile Glu Met Ala Asp Val Leu
100 105 110

Lys Gly Thr Glu Asp Arg Val Ile Ile Asn Val Ala Asn Glu Trp Tyr
115 120 125

Gly Ser Trp Arg Ser Asp Val Trp Ala Glu Ala Tyr Ala Gln Ala Ile
130 135 140

Pro Arg Leu Arg Ser Ala Gly Leu Ser His Thr Leu Met Val Asp Ala
145 150 155 160

Ala Gly Trp Gly Gln Tyr Pro Ala Ser Ile His Glu Arg Gly Ala Asp
165 170 175

Val Phe Ala Ser Asp Pro Leu Lys Asn Thr Met Phe Ser Ile His Met
180 185 190

Tyr Glu Tyr Ala Gly Ala Asp Arg Ala Thr Ile Ala Tyr Asn Ile Asp
195 200 205

Arg Val Leu Ala Glu Asn Leu Ala Val Val Ile Gly Glu Phe Gly His
210 215 220

Arg His His Asp Gly Asp Val Asp Glu Asp Ala Ile Leu Ala Tyr Thr
225 230 235 240

Ala Glu Arg Gln Val Gly Trp Leu Ala Trp Ser Trp Tyr Gly Asn Ser
245 250 255

Gly Gly Val Glu Tyr Leu Asp Leu Ala Glu Gly Pro Ser Gly Pro Leu
260 265 270

Thr Ser Trp Gly Lys Arg Ile Val Tyr Gly Glu Asn Gly Leu Lys Ser
275 280 285

Asp

<210> SEQ ID NO 13
<211> LENGTH: 1473
<212> TYPE: DNA

<213> ORGANISM: Bacillus hemicellulosilyticus

<400> SEQUENCE: 13

```
atgagaaatt tcggtaagtt aattgtcagt tcttgtcttc tattcagttt ttttcttttt     60
gcctctgatg gtcatagcca aacacattct ggtttttata tcgaaggttc aaccctttat    120
gacgccaacg gagagccctt tgtaatgaga ggtatcaatc atggacatgc ctggtataaa    180
catgattcta acgtcgctat accagctatt gctaatcaag gagcaaatac aattcgtatt    240
gttctgtcag atggtggtca atgggcaaaa gatgatataa acacattaaa tcaagtgctc    300
gatttagcag aggaacatga gatgattgct gttgttgagg ttcacgatgc aacaggatct    360
aattctatgg ctgacttaaa tcgtgctgtc gattattgga ttgaaatgaa agacgcttta    420
attggaaaag aagatcgcgt cataattaac attgccaatg aatggtatgg agcatgggac    480
ggacaaggct gggcaaatgg ctataaggag gttattccac gtttacgaaa tgctggcttc    540
actcatacat taatggtaga tgcagctggt tggggacaat accctcaatc gattcatgat    600
tatggtcaag aggtatttaa tgctgatcct ttagcaaata cgatgttttc catccatatg    660
tatgaatatg ctggcggaaa tgcttcaatg gtacaatcta atatcgatgg tgtcgtcgat    720
caagggttag ctcttgtaat aggagaattt gggcatatgc atacggacgg agatgttgat    780
gaagcaacga tattgagcta ctcgcaacaa agaggagtcg gttggctagc ttggtcttgg    840
aaaggcaatg ggactcaatg ggaatatcta gatttatctt atgattggca aggaacaaac    900
ttaacttctt ggggaaatac cattgtccac gggcctaatg gattactcga aacatccatt    960
ccaagctcga ttttccatac cgctccaaac aatggagatc cccctcctca taacggtaat   1020
gaaacgatct tatatgattt cgaacatggc actcaaggct ggtcaggttc ttcacttctt   1080
ggaggacctt ggacgacgaa tgaatggagt acaaatggta accattcatt aaaggccgat   1140
attttcttat cagctaactc caaacatgaa ttagcaaaag ttgaaaatcg aaatttatca   1200
ggctactcta ctttacaagc cactgtccgc catgcacatt ggggaaatgt tggtaattta   1260
acggcgagaa tgtatgtaaa aacgggctca aactatagct ggtttaatgg tgatcctatc   1320
ccagtaaact cagcaaatgg tacgactgtc actttgcctc tttcatctat tccaaaccta   1380
aatgacgtaa aagaaattgg cgttgaattt attggagctt caaatagcaa tggacaaacc   1440
gccatttatt tagatcatgt aacaatccaa taa                                1473
```

<210> SEQ ID NO 14
<211> LENGTH: 1395
<212> TYPE: DNA
<213> ORGANISM: Bacillus hemicellulosilyticus

<400> SEQUENCE: 14

```
cagacccact cgggcttcta catcgagggc tcgacgctct acgacgctaa cggcgagcct     60
tttgtcatgc gcggcatcaa ccacggccac gcctggtaca agcacgactc caacgtcgct    120
atccctgcta tcgctaacca gggcgctaac accatccgca tcgtcctcag cgacggtggc    180
cagtgggcca aggacgacat caacacgctg aaccaggtcc tcgacctggc cgaggagcac    240
gagatgatcg ctgtcgtcga ggtccacgac gctaccggct ccaacagcat ggccgacctc    300
aaccgcgccg tcgactactg gatcgagatg aaggacgccc tgatcggcaa ggaagaccgc    360
gtcatcatca acatcgctaa cgagtggtac ggcgcttggg acggccaggg ctgggccaac    420
ggctacaagg aagtcatccc tcgcctgcgc aacgctggct tcacccacac cctcatggtc    480
gacgctgccg gctggggcca gtaccctcag agcatccacg actacggcca agaggtcttc    540
```

```
aacgccgacc ctctggccaa caccatgttc tccatccaca tgtacgagta cgctggcggc    600

aacgcctcca tggtccagag caacatcgac ggcgtcgtcg accagggcct cgctctggtc    660

atcggcgagt tcggccacat gcacacggac ggcgacgtcg acgaggctac catcctgagc    720

tactcgcagc agcgcggcgt cggctggctg gcctggtcgt ggaagggcaa cggcacccag    780

tgggagtacc tcgacctgag ctacgactgg cagggcacca acctcacgtc gtggggcaac    840

acgatcgtcc acggccctaa cggcctcctg gagacgtcca tcccttccag catctttcac    900

accgctccta acaacggcga ccctcctccc cacaacggca acgagacgat cctgtacgac    960

ttcgagcacg gcacgcaggg ctggtcgggc tcgtccctgc tgggcggccc ttggaccacc   1020

aacgagtggt cgaccaacgg caaccactcc ctcaaggccg acatcttcct gtccgccaac   1080

agcaagcacg agctcgccaa ggtcgagaac cgcaacctca gcggctactc gacgctgcag   1140

gctaccgtcc gccacgctca ctggggcaac gtcggcaacc tgacggctcg catgtacgtc   1200

aagacgggca gcaactactc gtggttcaac ggcgacccca tccctgtcaa ctcggctaac   1260

ggcaccaccg tcaccctccc tctgagctcg atccccaacc tcaacgacgt caaggagatc   1320

ggcgtcgagt tcatcggcgc tagcaacagc aacggccaga ccgccatcta cctggaccac   1380

gtcacgatcc agtaa                                                    1395
```

<210> SEQ ID NO 15
<211> LENGTH: 490
<212> TYPE: PRT
<213> ORGANISM: Bacillus hemicellulosilyticus

<400> SEQUENCE: 15

```
Met Arg Asn Phe Gly Lys Leu Ile Val Ser Ser Cys Leu Leu Phe Ser
1               5                   10                  15

Phe Phe Leu Phe Ala Ser Asp Gly His Ser Gln Thr His Ser Gly Phe
            20                  25                  30

Tyr Ile Glu Gly Ser Thr Leu Tyr Asp Ala Asn Gly Glu Pro Phe Val
        35                  40                  45

Met Arg Gly Ile Asn His Gly His Ala Trp Tyr Lys His Asp Ser Asn
    50                  55                  60

Val Ala Ile Pro Ala Ile Ala Asn Gln Gly Ala Asn Thr Ile Arg Ile
65                  70                  75                  80

Val Leu Ser Asp Gly Gly Gln Trp Ala Lys Asp Asp Ile Asn Thr Leu
                85                  90                  95

Asn Gln Val Leu Asp Leu Ala Glu Glu His Glu Met Ile Ala Val Val
            100                 105                 110

Glu Val His Asp Ala Thr Gly Ser Asn Ser Met Ala Asp Leu Asn Arg
        115                 120                 125

Ala Val Asp Tyr Trp Ile Glu Met Lys Asp Ala Leu Ile Gly Lys Glu
    130                 135                 140

Asp Arg Val Ile Ile Asn Ile Ala Asn Glu Trp Tyr Gly Ala Trp Asp
145                 150                 155                 160

Gly Gln Gly Trp Ala Asn Gly Tyr Lys Glu Val Ile Pro Arg Leu Arg
                165                 170                 175

Asn Ala Gly Phe Thr His Thr Leu Met Val Asp Ala Ala Gly Trp Gly
            180                 185                 190

Gln Tyr Pro Gln Ser Ile His Asp Tyr Gly Gln Glu Val Phe Asn Ala
        195                 200                 205

Asp Pro Leu Ala Asn Thr Met Phe Ser Ile His Met Tyr Glu Tyr Ala
```

-continued

```
    210                 215                 220

Gly Gly Asn Ala Ser Met Val Gln Ser Asn Ile Asp Gly Val Val Asp
225                 230                 235                 240

Gln Gly Leu Ala Leu Val Ile Gly Glu Phe Gly His Met His Thr Asp
                245                 250                 255

Gly Asp Val Asp Glu Ala Thr Ile Leu Ser Tyr Ser Gln Gln Arg Gly
            260                 265                 270

Val Gly Trp Leu Ala Trp Ser Trp Lys Gly Asn Gly Thr Gln Trp Glu
        275                 280                 285

Tyr Leu Asp Leu Ser Tyr Asp Trp Gln Gly Thr Asn Leu Thr Ser Trp
    290                 295                 300

Gly Asn Thr Ile Val His Gly Pro Asn Gly Leu Leu Glu Thr Ser Ile
305                 310                 315                 320

Pro Ser Ser Ile Phe His Thr Ala Pro Asn Asn Gly Asp Pro Pro Pro
                325                 330                 335

His Asn Gly Asn Glu Thr Ile Leu Tyr Asp Phe Glu His Gly Thr Gln
            340                 345                 350

Gly Trp Ser Gly Ser Ser Leu Leu Gly Gly Pro Trp Thr Thr Asn Glu
        355                 360                 365

Trp Ser Thr Asn Gly Asn His Ser Leu Lys Ala Asp Ile Phe Leu Ser
    370                 375                 380

Ala Asn Ser Lys His Glu Leu Ala Lys Val Glu Asn Arg Asn Leu Ser
385                 390                 395                 400

Gly Tyr Ser Thr Leu Gln Ala Thr Val Arg His Ala His Trp Gly Asn
                405                 410                 415

Val Gly Asn Leu Thr Ala Arg Met Tyr Val Lys Thr Gly Ser Asn Tyr
            420                 425                 430

Ser Trp Phe Asn Gly Asp Pro Ile Pro Val Asn Ser Ala Asn Gly Thr
        435                 440                 445

Thr Val Thr Leu Pro Leu Ser Ser Ile Pro Asn Leu Asn Asp Val Lys
    450                 455                 460

Glu Ile Gly Val Glu Phe Ile Gly Ala Ser Asn Ser Asn Gly Gln Thr
465                 470                 475                 480

Ala Ile Tyr Leu Asp His Val Thr Ile Gln
                485                 490


<210> SEQ ID NO 16
<211> LENGTH: 464
<212> TYPE: PRT
<213> ORGANISM: Bacillus hemicellulosilyticus

<400> SEQUENCE: 16

Gln Thr His Ser Gly Phe Tyr Ile Glu Gly Ser Thr Leu Tyr Asp Ala
1               5                   10                  15

Asn Gly Glu Pro Phe Val Met Arg Gly Ile Asn His Gly His Ala Trp
            20                  25                  30

Tyr Lys His Asp Ser Asn Val Ala Ile Pro Ala Ile Ala Asn Gln Gly
        35                  40                  45

Ala Asn Thr Ile Arg Ile Val Leu Ser Asp Gly Gly Gln Trp Ala Lys
    50                  55                  60

Asp Asp Ile Asn Thr Leu Asn Gln Val Leu Asp Leu Ala Glu Glu His
65                  70                  75                  80

Glu Met Ile Ala Val Val Glu Val His Asp Ala Thr Gly Ser Asn Ser
                85                  90                  95
```

-continued

```
Met Ala Asp Leu Asn Arg Ala Val Asp Tyr Trp Ile Glu Met Lys Asp
            100                 105                 110

Ala Leu Ile Gly Lys Glu Asp Arg Val Ile Ile Asn Ile Ala Asn Glu
        115                 120                 125

Trp Tyr Gly Ala Trp Asp Gly Gln Gly Trp Ala Asn Gly Tyr Lys Glu
    130                 135                 140

Val Ile Pro Arg Leu Arg Asn Ala Gly Phe Thr His Thr Leu Met Val
145                 150                 155                 160

Asp Ala Ala Gly Trp Gly Gln Tyr Pro Gln Ser Ile His Asp Tyr Gly
                165                 170                 175

Gln Glu Val Phe Asn Ala Asp Pro Leu Ala Asn Thr Met Phe Ser Ile
            180                 185                 190

His Met Tyr Glu Tyr Ala Gly Gly Asn Ala Ser Met Val Gln Ser Asn
        195                 200                 205

Ile Asp Gly Val Val Asp Gln Gly Leu Ala Leu Val Ile Gly Glu Phe
    210                 215                 220

Gly His Met His Thr Asp Gly Asp Val Asp Glu Ala Thr Ile Leu Ser
225                 230                 235                 240

Tyr Ser Gln Gln Arg Gly Val Gly Trp Leu Ala Trp Ser Trp Lys Gly
                245                 250                 255

Asn Gly Thr Gln Trp Glu Tyr Leu Asp Leu Ser Tyr Asp Trp Gln Gly
            260                 265                 270

Thr Asn Leu Thr Ser Trp Gly Asn Thr Ile Val His Gly Pro Asn Gly
        275                 280                 285

Leu Leu Glu Thr Ser Ile Pro Ser Ser Ile Phe His Thr Ala Pro Asn
    290                 295                 300

Asn Gly Asp Pro Pro Pro His Asn Gly Asn Glu Thr Ile Leu Tyr Asp
305                 310                 315                 320

Phe Glu His Gly Thr Gln Gly Trp Ser Gly Ser Ser Leu Leu Gly Gly
                325                 330                 335

Pro Trp Thr Thr Asn Glu Trp Ser Thr Asn Gly Asn His Ser Leu Lys
            340                 345                 350

Ala Asp Ile Phe Leu Ser Ala Asn Ser Lys His Glu Leu Ala Lys Val
        355                 360                 365

Glu Asn Arg Asn Leu Ser Gly Tyr Ser Thr Leu Gln Ala Thr Val Arg
    370                 375                 380

His Ala His Trp Gly Asn Val Gly Asn Leu Thr Ala Arg Met Tyr Val
385                 390                 395                 400

Lys Thr Gly Ser Asn Tyr Ser Trp Phe Asn Gly Asp Pro Ile Pro Val
                405                 410                 415

Asn Ser Ala Asn Gly Thr Thr Val Thr Leu Pro Leu Ser Ser Ile Pro
            420                 425                 430

Asn Leu Asn Asp Val Lys Glu Ile Gly Val Glu Phe Ile Gly Ala Ser
        435                 440                 445

Asn Ser Asn Gly Gln Thr Ala Ile Tyr Leu Asp His Val Thr Ile Gln
    450                 455                 460
```

<210> SEQ ID NO 17
<211> LENGTH: 1449
<212> TYPE: DNA
<213> ORGANISM: Virgibacillus soli

<400> SEQUENCE: 17

```
atgttattct ctacttcact gtttacttct acttcaaaag cgaatgcagc aagcgggttt      60
```

```
tatgtaaacg gaaacacact ctatgacgca acaggtaccc cttttgtgat aagaggaatc    120

aatcatgctc actcttggtt taaagacgac acagcaaccg caatacctgc cattgcagca    180

actggggcga atactattag aatcgtatta tcggatggca gccaatatag tcgggatgat    240

attgatggcg tgaggaatct aatatcattg gctgaggaaa ataatctaat tgctatgtta    300

gaggtccacg atgctactgg aaaagatgat atcagctcat tagatagtgc ggcagattat    360

tggattagta taaaagaagc acttatcggc aaggaagaca aagtcctaat aaacatcgca    420

aatgaatggt acggtacttg ggatggggct agttgggcgg atggctacaa acaagtgatt    480

cccaaattaa gaaatgcagg acttaaccac acactaatag tagactctgc tggctggggg    540

caatttccgg agtccattca caattacgga aaagaagtat tcaatgctga ccccctacaa    600

aatacaatgt tctctattca tatgtatgaa tatgctggtg gggacgcttc tactgtcaaa    660

gcaaatattg acggtgtatt aaatcaaggt ctagccgtaa tcattggaga atttggacat    720

aggcatacag acggagatgt agatgaagca acaattatga attattccca agagaaaaat    780

gttggctggc tcgcatggtc gtggaaaggt aatggcatgg aatgggatta tttagactta    840

tcctatgatt gggccggaaa taacctaacc gactggggaa ataccattgt aaatagtaca    900

aacggcttaa aagctacatc tgaaataagt ccagtatttg gagatggaga tgacggtgta    960

ggcgacggtg gtcctgggga ttctaacgga actgaaacta cgctttataa cttcgaaacc   1020

gggacagaag gatggagcgg cgaaaatata gaaactggac cttggtcagt gaatgagtgg   1080

gcagcaaaag gtaaccactc tttaaaagct gatgttaatt tgggtgataa ctctgaacat   1140

tatctatacc taactcaaaa cctaaatttt agcggaaagt cacaactcac agcgactgta   1200

aagcatgctg attggggaaa cttcggggat gaaataaatg caaagttata tgtaaaaaca   1260

gaatcagatt ggcaatggtt tgatggagga attgaaaaga tcaattcttc aattggaact   1320

attataacct tagatttatc atcgctctca aacccaagtg atattaaaga agttggtgtt   1380

cagtttacgg gttcttcaaa tagttatggc ctaacagctt tatatgttga taacgttacc   1440

attaaataa                                                           1449
```

<210> SEQ ID NO 18
<211> LENGTH: 1401
<212> TYPE: DNA
<213> ORGANISM: Virgibacillus soli

<400> SEQUENCE: 18

```
gcctcgggct tctacgtcaa cggcaacact ctctacgacg ccacgggcac cccatttgtc     60

atccgcggca tcaaccacgc tcactcgtgg ttcaaggacg acactgccac cgctatccct    120

gctatcgctg ctacgggcgc caacacgatc cgcatcgtcc tcagcgacgg ctcgcagtac    180

tcccgcgacg acatcgacgg cgtccgcaac ctcatctccc tggccgagga gaacaacctc    240

atcgccatgc tggaggtcca cgacgctacc ggcaaggacg acatcagctc gctggacagc    300

gccgccgact actggatctc gatcaaggaa gccctcatcg gcaaggaaga caaggtcctg    360

atcaacatcg ccaacgagtg gtacggcacc tgggacggcg ctagctgggc tgacggctac    420

aagcaggtca tccctaagct ccgcaacgcc ggcctcaacc acacgctcat cgtcgactcg    480

gctggctggg gccagttccc ggagagcatc cacaactacg gcaaggaagt cttcaacgcc    540

gaccccctgc agaacacgat gttctcgatc cacatgtacg agtacgccgg cggcgacgct    600

tccacggtca aggccaacat cgacggcgtc ctcaaccagg gcctggctgt catcatcggc    660

gagtttggcc accgccacac cgacggcgac gtcgacgagg ccaccatcat gaactacagc    720
```

```
caggagaaga acgtcggctg gctggcttgg agctggaagg gcaacggcat ggagtgggac    780

tacctcgacc tgagctacga ctgggccggc aacaacctca ccgactgggg caacacgatc    840

gtcaactcga ccaacggcct gaaggccacc tcggagatca gccctgtctt tggcgacggc    900

gacgacggcg tcggcgacgg tggccccggc gacagcaacg gcaccgagac gacgctgtac    960

aactttgaga cgggcaccga gggctggagc ggcgagaaca tcgagacggg cccttggtcg   1020

gtcaacgagt gggctgccaa gggcaaccac tccctcaagg ccgacgtcaa cctgggcgac   1080

aacagcgagc actacctcta cctgacgcag aacctcaact tctccggcaa gtcgcagctg   1140

acggctaccg tcaagcacgc tgactggggc aacttcggcg acgagatcaa cgccaagctc   1200

tacgtcaaga ccgagagcga ctggcagtgg ttcgacggtg gcatcgagaa gatcaactcc   1260

agcatcggca ccatcatcac gctcgacctg tcgtccctgt cgaacccgtc cgacatcaag   1320

gaagtcggcg tccagttcac tggctcgtct aactcttacg gcctcactgc tctttacgtc   1380

gacaacgtca ctatcaagta g                                              1401


<210> SEQ ID NO 19
<211> LENGTH: 482
<212> TYPE: PRT
<213> ORGANISM: Virgibacillus soli

<400> SEQUENCE: 19

Met Leu Phe Ser Thr Ser Leu Phe Thr Ser Thr Ser Lys Ala Asn Ala
1               5                   10                  15

Ala Ser Gly Phe Tyr Val Asn Gly Asn Thr Leu Tyr Asp Ala Thr Gly
            20                  25                  30

Thr Pro Phe Val Ile Arg Gly Ile Asn His Ala His Ser Trp Phe Lys
        35                  40                  45

Asp Asp Thr Ala Thr Ala Ile Pro Ala Ile Ala Ala Thr Gly Ala Asn
    50                  55                  60

Thr Ile Arg Ile Val Leu Ser Asp Gly Ser Gln Tyr Ser Arg Asp Asp
65                  70                  75                  80

Ile Asp Gly Val Arg Asn Leu Ile Ser Leu Ala Glu Glu Asn Asn Leu
                85                  90                  95

Ile Ala Met Leu Glu Val His Asp Ala Thr Gly Lys Asp Asp Ile Ser
            100                 105                 110

Ser Leu Asp Ser Ala Ala Asp Tyr Trp Ile Ser Ile Lys Glu Ala Leu
        115                 120                 125

Ile Gly Lys Glu Asp Lys Val Leu Ile Asn Ile Ala Asn Glu Trp Tyr
    130                 135                 140

Gly Thr Trp Asp Gly Ala Ser Trp Ala Asp Gly Tyr Lys Gln Val Ile
145                 150                 155                 160

Pro Lys Leu Arg Asn Ala Gly Leu Asn His Thr Leu Ile Val Asp Ser
                165                 170                 175

Ala Gly Trp Gly Gln Phe Pro Glu Ser Ile His Asn Tyr Gly Lys Glu
            180                 185                 190

Val Phe Asn Ala Asp Pro Leu Gln Asn Thr Met Phe Ser Ile His Met
        195                 200                 205

Tyr Glu Tyr Ala Gly Gly Asp Ala Ser Thr Val Lys Ala Asn Ile Asp
    210                 215                 220

Gly Val Leu Asn Gln Gly Leu Ala Val Ile Ile Gly Glu Phe Gly His
225                 230                 235                 240

Arg His Thr Asp Gly Asp Val Asp Glu Ala Thr Ile Met Asn Tyr Ser
```

```
                245                 250                 255

Gln Glu Lys Asn Val Gly Trp Leu Ala Trp Ser Trp Lys Gly Asn Gly
            260                 265                 270

Met Glu Trp Asp Tyr Leu Asp Leu Ser Tyr Asp Trp Ala Gly Asn Asn
        275                 280                 285

Leu Thr Asp Trp Gly Asn Thr Ile Val Asn Ser Thr Asn Gly Leu Lys
    290                 295                 300

Ala Thr Ser Glu Ile Ser Pro Val Phe Gly Asp Gly Asp Asp Gly Val
305                 310                 315                 320

Gly Asp Gly Gly Pro Gly Asp Ser Asn Gly Thr Glu Thr Thr Leu Tyr
                325                 330                 335

Asn Phe Glu Thr Gly Thr Glu Gly Trp Ser Gly Glu Asn Ile Glu Thr
            340                 345                 350

Gly Pro Trp Ser Val Asn Glu Trp Ala Ala Lys Gly Asn His Ser Leu
        355                 360                 365

Lys Ala Asp Val Asn Leu Gly Asp Asn Ser Glu His Tyr Leu Tyr Leu
    370                 375                 380

Thr Gln Asn Leu Asn Phe Ser Gly Lys Ser Gln Leu Thr Ala Thr Val
385                 390                 395                 400

Lys His Ala Asp Trp Gly Asn Phe Gly Asp Glu Ile Asn Ala Lys Leu
                405                 410                 415

Tyr Val Lys Thr Glu Ser Asp Trp Gln Trp Phe Asp Gly Gly Ile Glu
            420                 425                 430

Lys Ile Asn Ser Ser Ile Gly Thr Ile Ile Thr Leu Asp Leu Ser Ser
        435                 440                 445

Leu Ser Asn Pro Ser Asp Ile Lys Glu Val Gly Val Gln Phe Thr Gly
    450                 455                 460

Ser Ser Asn Ser Tyr Gly Leu Thr Ala Leu Tyr Val Asp Asn Val Thr
465                 470                 475                 480

Ile Lys


<210> SEQ ID NO 20
<211> LENGTH: 466
<212> TYPE: PRT
<213> ORGANISM: Virgibacillus soli

<400> SEQUENCE: 20

Ala Ser Gly Phe Tyr Val Asn Gly Asn Thr Leu Tyr Asp Ala Thr Gly
1               5                   10                  15

Thr Pro Phe Val Ile Arg Gly Ile Asn His Ala His Ser Trp Phe Lys
            20                  25                  30

Asp Asp Thr Ala Thr Ala Ile Pro Ala Ile Ala Ala Thr Gly Ala Asn
        35                  40                  45

Thr Ile Arg Ile Val Leu Ser Asp Gly Ser Gln Tyr Ser Arg Asp Asp
    50                  55                  60

Ile Asp Gly Val Arg Asn Leu Ile Ser Leu Ala Glu Glu Asn Asn Leu
65                  70                  75                  80

Ile Ala Met Leu Glu Val His Asp Ala Thr Gly Lys Asp Asp Ile Ser
                85                  90                  95

Ser Leu Asp Ser Ala Ala Asp Tyr Trp Ile Ser Ile Lys Glu Ala Leu
            100                 105                 110

Ile Gly Lys Glu Asp Lys Val Leu Ile Asn Ile Ala Asn Glu Trp Tyr
        115                 120                 125

Gly Thr Trp Asp Gly Ala Ser Trp Ala Asp Gly Tyr Lys Gln Val Ile
```

```
    130                 135                 140

Pro Lys Leu Arg Asn Ala Gly Leu Asn His Thr Leu Ile Val Asp Ser
145                 150                 155                 160

Ala Gly Trp Gly Gln Phe Pro Glu Ser Ile His Asn Tyr Gly Lys Glu
                165                 170                 175

Val Phe Asn Ala Asp Pro Leu Gln Asn Thr Met Phe Ser Ile His Met
            180                 185                 190

Tyr Glu Tyr Ala Gly Gly Asp Ala Ser Thr Val Lys Ala Asn Ile Asp
        195                 200                 205

Gly Val Leu Asn Gln Gly Leu Ala Val Ile Ile Gly Glu Phe Gly His
    210                 215                 220

Arg His Thr Asp Gly Asp Val Asp Glu Ala Thr Ile Met Asn Tyr Ser
225                 230                 235                 240

Gln Glu Lys Asn Val Gly Trp Leu Ala Trp Ser Trp Lys Gly Asn Gly
                245                 250                 255

Met Glu Trp Asp Tyr Leu Asp Leu Ser Tyr Asp Trp Ala Gly Asn Asn
            260                 265                 270

Leu Thr Asp Trp Gly Asn Thr Ile Val Asn Ser Thr Asn Gly Leu Lys
        275                 280                 285

Ala Thr Ser Glu Ile Ser Pro Val Phe Gly Asp Gly Asp Asp Gly Val
    290                 295                 300

Gly Asp Gly Gly Pro Gly Asp Ser Asn Gly Thr Glu Thr Thr Leu Tyr
305                 310                 315                 320

Asn Phe Glu Thr Gly Thr Glu Gly Trp Ser Gly Glu Asn Ile Glu Thr
                325                 330                 335

Gly Pro Trp Ser Val Asn Glu Trp Ala Ala Lys Gly Asn His Ser Leu
            340                 345                 350

Lys Ala Asp Val Asn Leu Gly Asp Asn Ser Glu His Tyr Leu Tyr Leu
        355                 360                 365

Thr Gln Asn Leu Asn Phe Ser Gly Lys Ser Gln Leu Thr Ala Thr Val
    370                 375                 380

Lys His Ala Asp Trp Gly Asn Phe Gly Asp Glu Ile Asn Ala Lys Leu
385                 390                 395                 400

Tyr Val Lys Thr Glu Ser Asp Trp Gln Trp Phe Asp Gly Gly Ile Glu
                405                 410                 415

Lys Ile Asn Ser Ser Ile Gly Thr Ile Ile Thr Leu Asp Leu Ser Ser
            420                 425                 430

Leu Ser Asn Pro Ser Asp Ile Lys Glu Val Gly Val Gln Phe Thr Gly
        435                 440                 445

Ser Ser Asn Ser Tyr Gly Leu Thr Ala Leu Tyr Val Asp Asn Val Thr
    450                 455                 460

Ile Lys
465


<210> SEQ ID NO 21
<211> LENGTH: 60
<212> TYPE: DNA
<213> ORGANISM: Artificial Sequence
<220> FEATURE:
<223> OTHER INFORMATION: primer

<400> SEQUENCE: 21

agtcaatcgc gacaagcgcc agacccactc gggcttctac atcgagggct cgacgctcta      60


<210> SEQ ID NO 22
```

<211> LENGTH: 46
<212> TYPE: DNA
<213> ORGANISM: Artificial Sequence
<220> FEATURE:
<223> OTHER INFORMATION: primer

<400> SEQUENCE: 22
cgcgccggat ccttactgga tcgtgacgtg gtccaggtag atggcg 46

<210> SEQ ID NO 23
<211> LENGTH: 60
<212> TYPE: DNA
<213> ORGANISM: Artificial Sequence
<220> FEATURE:
<223> OTHER INFORMATION: primer

<400> SEQUENCE: 23
agtcaatcgc gacaagcgcc agaacggctt ccacgtctcc ggcacggagc tcctggacaa 60

<210> SEQ ID NO 24
<211> LENGTH: 51
<212> TYPE: DNA
<213> ORGANISM: Artificial Sequence
<220> FEATURE:
<223> OTHER INFORMATION: primer

<400> SEQUENCE: 24
cgcgccggat ccttagtcgc tcttcaggcc gttctcgccg tagacgatgc g 51

<210> SEQ ID NO 25
<211> LENGTH: 1846
<212> TYPE: DNA
<213> ORGANISM: Bacillus pumilus

<400> SEQUENCE: 25
atgaaaaaat gggttcaacg ggtggcttgt tttatgctgc tgatcacttt atgggcgggt 60
tggttcactc tgaccgtaaa ggcctcctcc tatgtgcaaa catctggtac acattttgta 120
ttgaacaacc acccatttta ctttgctggc acaaataatt attatttcca ttacaaatca 180
aaaaagatgg tagatgctgt ttttgacgat atgaaggcaa tggatttaaa ggttattcgt 240
atttggggat ttcacgatgg taccccctcaa gaaaactcag tcttacaatc tcgtccaggt 300
gtttatgaag aatccggttt tcaaaaacta gactatgcga tttataaagc agggcaggaa 360
ggaatcaagc tggtcatacc gctcgtgaac aattgggatg actttggcgg gatgaatcaa 420
tatgtgaagt ggtttcaggc aggatcacat gatcactttt atacagattc tcggattaaa 480
acagcttaca aaaactatgt gcgctatgta ttagagagaa ccaatacgta ctcaggtgtt 540
caatataaag atgaccctgc tattatgaca tgggagctcg ccaatgagcc gcgcgctcag 600
tcagaccctt cgggagatat actagtaaac tgggcagatg aaatgagtgc atggatcaaa 660
tcaattgact cgaatcatct tgttgctgta ggagacgaag ggttctttcg catgacaggt 720
catgatgatt ggttttacag tggaggagaa ggtgttgatt gggatcgttt gactgctctc 780
cctcatattg attatggaac ctatcattta tacccggatc actggaatca gtctgctgca 840
tggggagtga aatggatcaa agatcatatc acccgaggaa acgcaatcgg aaaacctgtt 900
gtattagaag agtttggcta tcaaaatcaa gcagcccgtc ctgatgtata tgatagctgg 960
ctgaagacaa ttgaacagct cggaggcgca ggtagccaat tttggatttt aacaagcatt 1020
caagacgatg attccctcta cccggattat gatggttttc gagttttaaa ggagagccgg 1080
gaggcaggaa ttattcgtga acacgccaaa agaatgaatg aaaagaactg atgaagaatg 1140

-continued

```
cctgtttata aggaacttca tttgcataaa aaaattggat atggtatagt ttttatggaa   1200

atgctaacga ttaccgagac aagagtgggg aaacccgctc ttttgtattg aacaggcaat   1260

ttttgtctcg acattattca tccgttttct gctccccctg ctcacaataa agcagggttt   1320

ttatgcagaa tgattgataa gagcgtttat cgaaagcaca aggaggaaga gaatgagcaa   1380

aaaagtagtg gatatcgtaa gcgacatggt gcagccaatt ttagatggct tacagcttga   1440

actcgttgat gttgaatttg tcaaagaggg tcaaaactgg ttccttcgcg tatttattga   1500

ctctgataaa ggcgtcgata tcgaggagtg tgccaaagtg agcgaagcct tgagcgaaaa   1560

gcttgatgag gcagatccaa ttagccaaaa ctactttctt gaagtgtcct ctcctggagc   1620

ggagcgccca ttaaagaaaa aagctgattt tgaaaaagca cttggaaaaa atgttttcat   1680

gaaaacatac gaaccaattg atggtgaaaa ggcatttgaa ggtgagctta caagctttga   1740

tggtgagatt gcaacagtga cagtgaagat caagacaaga aagaaagaga tcaatattcc   1800

atacgaaaaa attgctaacg caagattagc agtttcgttc aattaa                  1846
```

<210> SEQ ID NO 26
<211> LENGTH: 376
<212> TYPE: PRT
<213> ORGANISM: Bacillus pumilus

<400> SEQUENCE: 26

```
Met Lys Lys Trp Val Gln Arg Val Ala Cys Phe Met Leu Leu Ile Thr
1               5                   10                  15

Leu Trp Ala Gly Trp Phe Thr Leu Thr Val Lys Ala Ser Ser Tyr Val
            20                  25                  30

Gln Thr Ser Gly Thr His Phe Val Leu Asn Asn His Pro Phe Tyr Phe
        35                  40                  45

Ala Gly Thr Asn Asn Tyr Tyr Phe His Tyr Lys Ser Lys Lys Met Val
    50                  55                  60

Asp Ala Val Phe Asp Asp Met Lys Ala Met Asp Leu Lys Val Ile Arg
65                  70                  75                  80

Ile Trp Gly Phe His Asp Gly Thr Pro Gln Glu Asn Ser Val Leu Gln
                85                  90                  95

Ser Arg Pro Gly Val Tyr Glu Glu Ser Gly Phe Gln Lys Leu Asp Tyr
            100                 105                 110

Ala Ile Tyr Lys Ala Gly Gln Glu Gly Ile Lys Leu Val Ile Pro Leu
        115                 120                 125

Val Asn Asn Trp Asp Asp Phe Gly Gly Met Asn Gln Tyr Val Lys Trp
    130                 135                 140

Phe Gln Ala Gly Ser His Asp His Phe Tyr Thr Asp Ser Arg Ile Lys
145                 150                 155                 160

Thr Ala Tyr Lys Asn Tyr Val Arg Tyr Val Leu Glu Arg Thr Asn Thr
                165                 170                 175

Tyr Ser Gly Val Gln Tyr Lys Asp Asp Pro Ala Ile Met Thr Trp Glu
            180                 185                 190

Leu Ala Asn Glu Pro Arg Ala Gln Ser Asp Pro Ser Gly Asp Ile Leu
        195                 200                 205

Val Asn Trp Ala Asp Glu Met Ser Ala Trp Ile Lys Ser Ile Asp Ser
    210                 215                 220

Asn His Leu Val Ala Val Gly Asp Glu Gly Phe Phe Arg Met Thr Gly
225                 230                 235                 240

His Asp Asp Trp Phe Tyr Ser Gly Gly Glu Gly Val Asp Trp Asp Arg
```

-continued

```
            245                 250                 255

Leu Thr Ala Leu Pro His Ile Asp Tyr Gly Thr Tyr His Leu Tyr Pro
        260                 265                 270

Asp His Trp Asn Gln Ser Ala Ala Trp Gly Val Lys Trp Ile Lys Asp
    275                 280                 285

His Ile Thr Arg Gly Asn Ala Ile Gly Lys Pro Val Val Leu Glu Glu
290                 295                 300

Phe Gly Tyr Gln Asn Gln Ala Ala Arg Pro Asp Val Tyr Asp Ser Trp
305                 310                 315                 320

Leu Lys Thr Ile Glu Gln Leu Gly Gly Ala Gly Ser Gln Phe Trp Ile
                325                 330                 335

Leu Thr Ser Ile Gln Asp Asp Asp Ser Leu Tyr Pro Asp Tyr Asp Gly
            340                 345                 350

Phe Arg Val Leu Lys Glu Ser Arg Glu Ala Gly Ile Ile Arg Glu His
        355                 360                 365

Ala Lys Arg Met Asn Glu Lys Asn
    370                 375
```

<210> SEQ ID NO 27
<211> LENGTH: 1083
<212> TYPE: DNA
<213> ORGANISM: Bacillus amyloliquefaciens

<400> SEQUENCE: 27

```
atgctcaaaa agttcgcagt ctgtctgtct atcattttat tactcatctc agccgcccgt     60

ccgatatcgg ctcacaccgt ttaccctgtc aatcccaatg cccagcagac gacaaaagac    120

gtcatgaact ggctggcgca tttgcccaac cgttcagaaa acagggtcat gtccggtgca    180

ttcggcgggt acagcgatgt caccttttca atgacggagg aaaaccgctt gaaaaacgcg    240

acgggacagt ctcccgccat ctacggctgt gattatggga gagggtggct ggaaacatcg    300

gatatcaccg attctatcga ctacagctgc aacagcagcc tcatttcgta ctggaaaagc    360

ggcggcctcc ctcaggtcag cctgcatctc gcaaatccgg cctttccatc aggacactat    420

aaaacggcca tttcaaacag ccagtataaa aatatcctga acccttcaac tgttgaagga    480

cggcggcttg aggccttgct cagcaaaatc gccgacggcc ttactcagct gaaaaatcaa    540

ggcgtcaccg ttctgttcag gccgctgcat gagatgaacg gtgaatggtt ctggtggggg    600

ctgacaggct acaaccaaaa agacactgag agaatctcgc tgtacaaaga gctttacaag    660

aagatatacc gctatatgac agagacaaga ggattggata atcttttgtg ggtgtattcg    720

cctgatgcca acagagactt caaaacagac ttctacccag gctcatctta tgtggatatt    780

accggactgg atgcttactt caccgacccg tatgcgatat caggctatga tgaaatgctg    840

tctctgaaaa aaccgtttgc ctttgccgag accggtccgt ccggtaatat cggaagcttt    900

gattacgctg tttttatcaa tgcgatcagg caaaagtatc ccgagacaac ctacttttg     960

acatgggatg aacaattaag cccggcagcc aatcaaggcg cgcaaagcct ttatcaaaac   1020

agctggacgc tgaacaaggg cgaaatgtgg aatggcggaa ccttgacgcc gatcgcggaa   1080

taa                                                                 1083
```

<210> SEQ ID NO 28
<211> LENGTH: 360
<212> TYPE: PRT
<213> ORGANISM: Bacillus amyloliquefaciens

<400> SEQUENCE: 28

-continued

```
Met Leu Lys Lys Phe Ala Val Cys Leu Ser Ile Ile Leu Leu Leu Ile
1               5                   10                  15

Ser Ala Ala Arg Pro Ile Ser Ala His Thr Val Tyr Pro Val Asn Pro
            20                  25                  30

Asn Ala Gln Gln Thr Thr Lys Asp Val Met Asn Trp Leu Ala His Leu
        35                  40                  45

Pro Asn Arg Ser Glu Asn Arg Val Met Ser Gly Ala Phe Gly Gly Tyr
    50                  55                  60

Ser Asp Val Thr Phe Ser Met Thr Glu Glu Asn Arg Leu Lys Asn Ala
65                  70                  75                  80

Thr Gly Gln Ser Pro Ala Ile Tyr Gly Cys Asp Tyr Gly Arg Gly Trp
                85                  90                  95

Leu Glu Thr Ser Asp Ile Thr Asp Ser Ile Asp Tyr Ser Cys Asn Ser
            100                 105                 110

Ser Leu Ile Ser Tyr Trp Lys Ser Gly Gly Leu Pro Gln Val Ser Leu
        115                 120                 125

His Leu Ala Asn Pro Ala Phe Pro Ser Gly His Tyr Lys Thr Ala Ile
    130                 135                 140

Ser Asn Ser Gln Tyr Lys Asn Ile Leu Asn Pro Ser Thr Val Glu Gly
145                 150                 155                 160

Arg Arg Leu Glu Ala Leu Leu Ser Lys Ile Ala Asp Gly Leu Thr Gln
                165                 170                 175

Leu Lys Asn Gln Gly Val Thr Val Leu Phe Arg Pro Leu His Glu Met
            180                 185                 190

Asn Gly Glu Trp Phe Trp Trp Gly Leu Thr Gly Tyr Asn Gln Lys Asp
        195                 200                 205

Thr Glu Arg Ile Ser Leu Tyr Lys Glu Leu Tyr Lys Lys Ile Tyr Arg
    210                 215                 220

Tyr Met Thr Glu Thr Arg Gly Leu Asp Asn Leu Leu Trp Val Tyr Ser
225                 230                 235                 240

Pro Asp Ala Asn Arg Asp Phe Lys Thr Asp Phe Tyr Pro Gly Ser Ser
                245                 250                 255

Tyr Val Asp Ile Thr Gly Leu Asp Ala Tyr Phe Thr Asp Pro Tyr Ala
            260                 265                 270

Ile Ser Gly Tyr Asp Glu Met Leu Ser Leu Lys Lys Pro Phe Ala Phe
        275                 280                 285

Ala Glu Thr Gly Pro Ser Gly Asn Ile Gly Ser Phe Asp Tyr Ala Val
    290                 295                 300

Phe Ile Asn Ala Ile Arg Gln Lys Tyr Pro Glu Thr Thr Tyr Phe Leu
305                 310                 315                 320

Thr Trp Asp Glu Gln Leu Ser Pro Ala Ala Asn Gln Gly Ala Gln Ser
                325                 330                 335

Leu Tyr Gln Asn Ser Trp Thr Leu Asn Lys Gly Glu Met Trp Asn Gly
            340                 345                 350

Gly Thr Leu Thr Pro Ile Ala Glu
        355                 360
```

<210> SEQ ID NO 29
<211> LENGTH: 1494
<212> TYPE: DNA
<213> ORGANISM: Amphibacillus xylanus

<400> SEQUENCE: 29

```
gtgaagttaa ctaaactaaa actattgagt agtgtatttt ttgttgtatt aactgtgtta     60
```

```
atgttgtttg tccctgggaa tattgtgaat gtaaaagctg ctaacggctt ttatgtaagc    120

gattccaatc tgtatgatgc aaatggaaat caatttgtta tgcgtggggt taatcatgcc    180

cattcatggt ataaggacac gtataccgag gcaattcctg caattgcggc tacaggagcg    240

aatactatcc gaattgtatt atctgatgga gggcaatacc aaaaagatga tataaacata    300

gtcagaaatt tgattgaaac cgcagaagcc aataatttag tcgctgtact tgaggttcat    360

gatgctactg ggtcggattc attatcggat ttgaaccggg ctgtagatta ttggattgaa    420

attaaagatg cgttaattgg taaagaagat acggtgatca taaacattgt caatgaatgg    480

tatggcactt gggatggtcg tctctgggca gatggttata aacaggcgat accgagatta    540

agagatgctg gattaacaca tacgttgatg attgatgcag caggttgggg gcaatttcct    600

agctcgatcc atcaatatgg tagagaagta tttaatgcag atcgtttagg gaatacaatg    660

ttttcgattc atatgtatga atatgctggc ggtgatgatc aaatggttag agataatatt    720

aacggtgtga tcaatcaaga cttagctcta gtgattggtg aatttggtca ttatcacaca    780

gatggcgatg ttgatgaaga tacgattttg agttacgcgg agcagacagg tgttggttgg    840

ttagcatggt catggaaagg caatggaact gagtgggagt atcttgatct atcaaatgat    900

tggggaggaa attatttaac atcttggggt gacaggattg taaatggagc aaatggatta    960

agagaaacga gtcaaattgc ttctgttttt tcaggaaaca atggcgggac tcctggaaat   1020

ggtgaggaag agactcctgg tgatgtaagt catttcgcaa acttcgagaa tggtactgaa   1080

ggttgggaag caagcaatgt atctggtgga ccttgggcaa caaatgaatg gagtgctagt   1140

ggttcatatg ctttaaaagc cgatgcgcaa ttagcatctg gaagagaaca ctatttatat   1200

cgaatcggtc cctttaattt atctgggtca acattaaacg caacggtaag ggtgctaat   1260

tgggggaatt atggatctgg tatcgacgtg aagctatacg ttaagtacgg agatggctgg   1320

acgtggagag atagtggtgt acagacaatt agagcgggag aatctattga tctatcacta   1380

gatttatcaa atgttgatcg ctcaaacatt agagaagttg gtatccagtt tattggtgga   1440

aatcattcat ctggaaaaac cgctttttat gttgatcatg tttattcaca ttag         1494
```

```
<210> SEQ ID NO 30
<211> LENGTH: 497
<212> TYPE: PRT
<213> ORGANISM: Amphibacillus xylanus

<400> SEQUENCE: 30

Val Lys Leu Thr Lys Leu Lys Leu Leu Ser Ser Val Phe Phe Val Val
1               5                   10                  15

Leu Thr Val Leu Met Leu Phe Val Pro Gly Asn Ile Val Asn Val Lys
            20                  25                  30

Ala Ala Asn Gly Phe Tyr Val Ser Asp Ser Asn Leu Tyr Asp Ala Asn
        35                  40                  45

Gly Asn Gln Phe Val Met Arg Gly Val Asn His Ala His Ser Trp Tyr
    50                  55                  60

Lys Asp Thr Tyr Thr Glu Ala Ile Pro Ala Ile Ala Ala Thr Gly Ala
65                  70                  75                  80

Asn Thr Ile Arg Ile Val Leu Ser Asp Gly Gly Gln Tyr Gln Lys Asp
                85                  90                  95

Asp Ile Asn Ile Val Arg Asn Leu Ile Glu Thr Ala Glu Ala Asn Asn
            100                 105                 110

Leu Val Ala Val Leu Glu Val His Asp Ala Thr Gly Ser Asp Ser Leu
```

```
        115                 120                 125

Ser Asp Leu Asn Arg Ala Val Asp Tyr Trp Ile Glu Ile Lys Asp Ala
    130                 135                 140

Leu Ile Gly Lys Glu Asp Thr Val Ile Ile Asn Ile Val Asn Glu Trp
145                 150                 155                 160

Tyr Gly Thr Trp Asp Gly Arg Leu Trp Ala Asp Gly Tyr Lys Gln Ala
                165                 170                 175

Ile Pro Arg Leu Arg Asp Ala Gly Leu Thr His Thr Leu Met Ile Asp
            180                 185                 190

Ala Ala Gly Trp Gly Gln Phe Pro Ser Ser Ile His Gln Tyr Gly Arg
        195                 200                 205

Glu Val Phe Asn Ala Asp Arg Leu Gly Asn Thr Met Phe Ser Ile His
    210                 215                 220

Met Tyr Glu Tyr Ala Gly Gly Asp Asp Gln Met Val Arg Asp Asn Ile
225                 230                 235                 240

Asn Gly Val Ile Asn Gln Asp Leu Ala Leu Val Ile Gly Glu Phe Gly
                245                 250                 255

His Tyr His Thr Asp Gly Asp Val Asp Glu Asp Thr Ile Leu Ser Tyr
            260                 265                 270

Ala Glu Gln Thr Gly Val Gly Trp Leu Ala Trp Ser Trp Lys Gly Asn
        275                 280                 285

Gly Thr Glu Trp Glu Tyr Leu Asp Leu Ser Asn Asp Trp Gly Gly Asn
    290                 295                 300

Tyr Leu Thr Ser Trp Gly Asp Arg Ile Val Asn Gly Ala Asn Gly Leu
305                 310                 315                 320

Arg Glu Thr Ser Gln Ile Ala Ser Val Phe Ser Gly Asn Asn Gly Gly
                325                 330                 335

Thr Pro Gly Asn Gly Glu Glu Glu Thr Pro Gly Asp Val Ser His Phe
            340                 345                 350

Ala Asn Phe Glu Asn Gly Thr Glu Gly Trp Glu Ala Ser Asn Val Ser
        355                 360                 365

Gly Gly Pro Trp Ala Thr Asn Glu Trp Ser Ala Ser Gly Ser Tyr Ala
    370                 375                 380

Leu Lys Ala Asp Ala Gln Leu Ala Ser Gly Arg Glu His Tyr Leu Tyr
385                 390                 395                 400

Arg Ile Gly Pro Phe Asn Leu Ser Gly Ser Thr Leu Asn Ala Thr Val
                405                 410                 415

Arg Gly Ala Asn Trp Gly Asn Tyr Gly Ser Gly Ile Asp Val Lys Leu
            420                 425                 430

Tyr Val Lys Tyr Gly Asp Gly Trp Thr Trp Arg Asp Ser Gly Val Gln
        435                 440                 445

Thr Ile Arg Ala Gly Glu Ser Ile Asp Leu Ser Leu Asp Leu Ser Asn
    450                 455                 460

Val Asp Arg Ser Asn Ile Arg Glu Val Gly Ile Gln Phe Ile Gly Gly
465                 470                 475                 480

Asn His Ser Ser Gly Lys Thr Ala Phe Tyr Val Asp His Val Tyr Ser
                485                 490                 495

His
```

<210> SEQ ID NO 31
<211> LENGTH: 1767
<212> TYPE: DNA
<213> ORGANISM: Paenibacillus polymyxa

<400> SEQUENCE: 31

```
atgaaaaaac tactgtcttg tctcatttcg ctgtcaatgc ttgtgtatat cttaccgaca     60
atgatagtgt ccgctaacaa tgatggcgta acgaaccttg ctcttgattc aacacctagt    120
gcgcaaagtg atattatttc tgatgctgtc tacaaaatca cagctcagca ttcaggaaaa    180
agccttgagg ttgaaggcgg ttctaaagat gacggcgcga atgttcaaca atggacagat    240
aacgggaaag aacagcagaa atggagagtt gtggacgtcg gtggcggata ttacaagctc    300
atcagtcaat ctagcggaaa agcactggat gtggcaggtg gtaatacaca tgatggtgcc    360
aatgtgcaac agtggacgga caacggaaat gctcagcaaa agtggaagat catcgatgta    420
ggaggaggct attataagtt gatctcacaa agctctggaa aggcactcga cgtcgttggt    480
ggttatacgc acgacggggc caatgtgcag caatgggcag acaatggatc tgctcaacag    540
cgctggcgtt tcacacaaat tgatacaacc acggatacga cgccgccaac agcaccaacg    600
aatttacaat catcatcgaa aacaagtacc tctgtaacat tgacttggac cacaagcatt    660
gataatgtag gtgtgacagg ctatgtcatt tataatggaa cagatttggt cgggacttct    720
acaactacat cttatattgt tacaggatta acagcgaaca cttcctataa cttcactgtc    780
aaagcgaagg atgccgctgg gaatatttca gaaccatcaa atgtcttgaa agtcacaacg    840
agttcagatt cttctcaaaa cacaggtttt tatgtgaagg gcacaacatt atatgatgga    900
aacggtaatc catttgtgat gagaggaatc aatcatgcat acacatggta taaagggcaa    960
gaatcagtag caattcctgc gattgcgaaa acgggtgcaa acaccatccg gattgtctta   1020
tctgacggac agcagtggac aaaagatgat ttaagcgcgc ttcaaaattt gattacactc   1080
agtgagcaaa acaaacttgt agtgatttta gaggtgcacg acggtactgg caatgacaat   1140
gccgcagttt taaataaaat tgctgattat tggattgaaa tgaagtcagc tttaattggg   1200
aaggaaaata cagttatttt aaacatcgca aatgaatggt ttggtacatg ggatggaaac   1260
ggctgggcgc agggctacaa atcagtcata ccaaagctgc gaaatgcggg catcaaaaac   1320
acgattatgg tggatgcggc tggatgggga caatatccaa aatcgatttt tgattacgga   1380
acgcaagtgt tcgatgcaga tccgctcaag aatacgatgt tttccattca tatgtatgaa   1440
tacgcaggcg gcaacgcaga aacagtgaaa agtaatatcg acaacgtcct gaataaaaat   1500
cttgcactca tcattggaga atttggaatt aaacatacaa acggagatgt tgatgaagca   1560
acgatcatgt catacgcaca gcaaaaaggt gttgggtatc ttggctggtc atggaaagga   1620
aatggttcag gtcttgaata tttagatatg agtaacgatt gggctggcag cagttataca   1680
gagcaaggac atgccattat cgaaggacca aatggcattc gtgcaacatc aaaattatca   1740
accatttaca gcaatgggaa acaataa                                       1767
```

<210> SEQ ID NO 32
<211> LENGTH: 588
<212> TYPE: PRT
<213> ORGANISM: Paenibacillus polymyxa

<400> SEQUENCE: 32

```
Met Lys Lys Leu Leu Ser Cys Leu Ile Ser Leu Ser Met Leu Val Tyr
1               5                   10                  15

Ile Leu Pro Thr Met Ile Val Ser Ala Asn Asn Asp Gly Val Thr Asn
            20                  25                  30

Leu Ala Leu Asp Ser Thr Pro Ser Ala Gln Ser Asp Ile Ile Ser Asp
        35                  40                  45
```

-continued

```
Ala Val Tyr Lys Ile Thr Ala Gln His Ser Gly Lys Ser Leu Glu Val
    50                  55                  60

Glu Gly Gly Ser Lys Asp Asp Gly Ala Asn Val Gln Gln Trp Thr Asp
65                  70                  75                  80

Asn Gly Lys Glu Gln Gln Lys Trp Arg Val Val Asp Val Gly Gly Gly
                85                  90                  95

Tyr Tyr Lys Leu Ile Ser Gln Ser Ser Gly Lys Ala Leu Asp Val Ala
            100                 105                 110

Gly Gly Asn Thr His Asp Gly Ala Asn Val Gln Gln Trp Thr Asp Asn
        115                 120                 125

Gly Asn Ala Gln Gln Lys Trp Lys Ile Ile Asp Val Gly Gly Gly Tyr
    130                 135                 140

Tyr Lys Leu Ile Ser Gln Ser Ser Gly Lys Ala Leu Asp Val Val Gly
145                 150                 155                 160

Gly Tyr Thr His Asp Gly Ala Asn Val Gln Gln Trp Ala Asp Asn Gly
                165                 170                 175

Ser Ala Gln Gln Arg Trp Arg Phe Thr Gln Ile Asp Thr Thr Thr Asp
            180                 185                 190

Thr Thr Pro Pro Thr Ala Pro Thr Asn Leu Gln Ser Ser Ser Lys Thr
        195                 200                 205

Ser Thr Ser Val Thr Leu Thr Trp Thr Thr Ser Ile Asp Asn Val Gly
    210                 215                 220

Val Thr Gly Tyr Val Ile Tyr Asn Gly Thr Asp Leu Val Gly Thr Ser
225                 230                 235                 240

Thr Thr Thr Ser Tyr Ile Val Thr Gly Leu Thr Ala Asn Thr Ser Tyr
                245                 250                 255

Asn Phe Thr Val Lys Ala Lys Asp Ala Ala Gly Asn Ile Ser Glu Pro
            260                 265                 270

Ser Asn Val Leu Lys Val Thr Thr Ser Ser Asp Ser Ser Gln Asn Thr
        275                 280                 285

Gly Phe Tyr Val Lys Gly Thr Thr Leu Tyr Asp Gly Asn Gly Asn Pro
    290                 295                 300

Phe Val Met Arg Gly Ile Asn His Ala Tyr Thr Trp Tyr Lys Gly Gln
305                 310                 315                 320

Glu Ser Val Ala Ile Pro Ala Ile Ala Lys Thr Gly Ala Asn Thr Ile
                325                 330                 335

Arg Ile Val Leu Ser Asp Gly Gln Gln Trp Thr Lys Asp Asp Leu Ser
            340                 345                 350

Ala Leu Gln Asn Leu Ile Thr Leu Ser Glu Gln Asn Lys Leu Val Val
        355                 360                 365

Ile Leu Glu Val His Asp Gly Thr Gly Asn Asp Asn Ala Ala Val Leu
    370                 375                 380

Asn Lys Ile Ala Asp Tyr Trp Ile Glu Met Lys Ser Ala Leu Ile Gly
385                 390                 395                 400

Lys Glu Asn Thr Val Ile Leu Asn Ile Ala Asn Glu Trp Phe Gly Thr
                405                 410                 415

Trp Asp Gly Asn Gly Trp Ala Gln Gly Tyr Lys Ser Val Ile Pro Lys
            420                 425                 430

Leu Arg Asn Ala Gly Ile Lys Asn Thr Ile Met Val Asp Ala Ala Gly
        435                 440                 445

Trp Gly Gln Tyr Pro Lys Ser Ile Phe Asp Tyr Gly Thr Gln Val Phe
    450                 455                 460

Asp Ala Asp Pro Leu Lys Asn Thr Met Phe Ser Ile His Met Tyr Glu
```

-continued 465 470 475 480

Tyr Ala Gly Gly Asn Ala Glu Thr Val Lys Ser Asn Ile Asp Asn Val
485 490 495

Leu Asn Lys Asn Leu Ala Leu Ile Ile Gly Glu Phe Gly Ile Lys His
500 505 510

Thr Asn Gly Asp Val Asp Glu Ala Thr Ile Met Ser Tyr Ala Gln Gln
515 520 525

Lys Gly Val Gly Tyr Leu Gly Trp Ser Trp Lys Gly Asn Gly Ser Gly
530 535 540

Leu Glu Tyr Leu Asp Met Ser Asn Asp Trp Ala Gly Ser Ser Tyr Thr
545 550 555 560

Glu Gln Gly His Ala Ile Ile Glu Gly Pro Asn Gly Ile Arg Ala Thr
565 570 575

Ser Lys Leu Ser Thr Ile Tyr Ser Asn Gly Lys Gln
580 585

<210> SEQ ID NO 33
<211> LENGTH: 1470
<212> TYPE: DNA
<213> ORGANISM: Bacillus hemicellulosilyticus

<400> SEQUENCE: 33
atggatatat taagaaagtg tgtacttgta ctattggcct tactattgtt gttacctacg 60
acatcaacgg cattttctga aagcgcttct actaatgaga gagtgctaaa tttatctgat 120
ccgaatgcga cacgctatac gaaggaattg tttgcgtttc ttcaagacgt gagtggtgag 180
caagtgttgt tcgggcaaca gcatgcaaca gatgaagggt tgactctgac aggtgaagga 240
aatcgaattg gttcaactga gtcggaggtg aagaatgcag taggtgatta tccagctgtt 300
tttgggtggg atacgaacag cttggatggt cgtgaaaagc caggtacaga tgtggaaagt 360
caagagcaac gaattttaaa tacagcagaa tcgatgaaag tggcacatga attaggaggg 420
atcatcacat taagtatgca tccggataac tttgttaccg gtcattacta tggcgatacg 480
gatggtaacg tcgttcaaga aatattgcca ggtggctcca agcacaatga atttaacgct 540
tggctagata atattgctgc cctagcacat gaattagttg atgataatgg agagcctatt 600
ccggttatct tccgtccatt ccatgagcaa acaggttcgt ggttttggtg gggtgcgagc 660
acaacaactc ctgagcaata caaagcgatt tttcgatata cagtcgaata cttaagagat 720
gcaaagggtg ttcataactt tttatatgga ttctcccctg gtgcgggtcc tgctggcgat 780
ctagatcgat atttagaaac gtacccaggt gataattatg tcgatatctt aggtattgat 840
aattatgata gtaagtcaaa tgcggggtca gacgcttggt tatctggaat ggtaaaagat 900
ttagcgatga tctcgaaatt agcagaggaa agagggaagg tatcagcctt tactgaattt 960
ggatacagcg ctgaagggat gagtcaaacg ggtgatgcgt tagattggta tacacgtgtg 1020
ttaaatgcga taaaagcaga tgaagatgcg cgaaacatat cctacatgct aacgtgggct 1080
aactttgggt ggcctaataa tatatttgtt ccgtatcgtg atgtgaatgg ggatttaggt 1140
ggagatcatg agttattacc tgactttgta cagttttatg aagatgaata ctcagcattt 1200
cgtgaagata taaatgaaag tgtttacaat cgtaatgaga gttatattgt tgcggatcat 1260
gagccattta tgtatgttgt ttcccctacg acaggtacat atataacagg ctcgtctgtt 1320
gtcttacgag cgaaagtagt taacgatgag gatccgtccg ttacgtatca agtggcgggt 1380
tctgaagaag tctatgagat gactttagat gaaaatgggt attactctgc tgattatatt 1440
cctactgctc ctaagaatgg agctctgtag 1470

<210> SEQ ID NO 34
<211> LENGTH: 489
<212> TYPE: PRT
<213> ORGANISM: Bacillus hemicellulosilyticus

<400> SEQUENCE: 34

Met Asp Ile Leu Arg Lys Cys Val Leu Val Leu Leu Ala Leu Leu Leu
1 5 10 15

Leu Leu Pro Thr Thr Ser Thr Ala Phe Ser Glu Ser Ala Ser Thr Asn
20 25 30

Glu Arg Val Leu Asn Leu Ser Asp Pro Asn Ala Thr Arg Tyr Thr Lys
35 40 45

Glu Leu Phe Ala Phe Leu Gln Asp Val Ser Gly Glu Gln Val Leu Phe
50 55 60

Gly Gln Gln His Ala Thr Asp Glu Gly Leu Thr Leu Thr Gly Glu Gly
65 70 75 80

Asn Arg Ile Gly Ser Thr Glu Ser Glu Val Lys Asn Ala Val Gly Asp
85 90 95

Tyr Pro Ala Val Phe Gly Trp Asp Thr Asn Ser Leu Asp Gly Arg Glu
100 105 110

Lys Pro Gly Thr Asp Val Glu Ser Gln Glu Gln Arg Ile Leu Asn Thr
115 120 125

Ala Glu Ser Met Lys Val Ala His Glu Leu Gly Gly Ile Ile Thr Leu
130 135 140

Ser Met His Pro Asp Asn Phe Val Thr Gly His Tyr Tyr Gly Asp Thr
145 150 155 160

Asp Gly Asn Val Val Gln Glu Ile Leu Pro Gly Gly Ser Lys His Asn
165 170 175

Glu Phe Asn Ala Trp Leu Asp Asn Ile Ala Ala Leu Ala His Glu Leu
180 185 190

Val Asp Asp Asn Gly Glu Pro Ile Pro Val Ile Phe Arg Pro Phe His
195 200 205

Glu Gln Thr Gly Ser Trp Phe Trp Trp Gly Ala Ser Thr Thr Thr Pro
210 215 220

Glu Gln Tyr Lys Ala Ile Phe Arg Tyr Thr Val Glu Tyr Leu Arg Asp
225 230 235 240

Ala Lys Gly Val His Asn Phe Leu Tyr Gly Phe Ser Pro Gly Ala Gly
245 250 255

Pro Ala Gly Asp Leu Asp Arg Tyr Leu Glu Thr Tyr Pro Gly Asp Asn
260 265 270

Tyr Val Asp Ile Leu Gly Ile Asp Asn Tyr Asp Ser Lys Ser Asn Ala
275 280 285

Gly Ser Asp Ala Trp Leu Ser Gly Met Val Lys Asp Leu Ala Met Ile
290 295 300

Ser Lys Leu Ala Glu Glu Arg Gly Lys Val Ser Ala Phe Thr Glu Phe
305 310 315 320

Gly Tyr Ser Ala Glu Gly Met Ser Gln Thr Gly Asp Ala Leu Asp Trp
325 330 335

Tyr Thr Arg Val Leu Asn Ala Ile Lys Ala Asp Glu Asp Ala Arg Asn
340 345 350

Ile Ser Tyr Met Leu Thr Trp Ala Asn Phe Gly Trp Pro Asn Asn Ile
355 360 365

-continued

```
Phe Val Pro Tyr Arg Asp Val Asn Gly Asp Leu Gly Gly Asp His Glu
    370                 375                 380

Leu Leu Pro Asp Phe Val Gln Phe Tyr Glu Asp Glu Tyr Ser Ala Phe
385                 390                 395                 400

Arg Glu Asp Ile Asn Glu Ser Val Tyr Asn Arg Asn Glu Ser Tyr Ile
                405                 410                 415

Val Ala Asp His Glu Pro Phe Met Tyr Val Val Ser Pro Thr Thr Gly
            420                 425                 430

Thr Tyr Ile Thr Gly Ser Ser Val Val Leu Arg Ala Lys Val Val Asn
        435                 440                 445

Asp Glu Asp Pro Ser Val Thr Tyr Gln Val Ala Gly Ser Glu Glu Val
    450                 455                 460

Tyr Glu Met Thr Leu Asp Glu Asn Gly Tyr Tyr Ser Ala Asp Tyr Ile
465                 470                 475                 480

Pro Thr Ala Pro Lys Asn Gly Ala Leu
                485
```

<210> SEQ ID NO 35
<211> LENGTH: 1110
<212> TYPE: DNA
<213> ORGANISM: Bacillus alcalophilus

<400> SEQUENCE: 35

```
atgagaagta tgaagctttt atttgctatg tttattttag tttttcctc ttttactttt      60

aacttagtag ttgcgcaagc tagtggacat ggacaaatgc ataaagtacc ttgggcaccc    120

caagctgaag cacctggaaa aacggctgag aatggagtct gggataaagt tagaaataat    180

cctggaaaag ccaatcctcc agcaggaaaa gtcaatggtt tttatataga tggaacaacc    240

ttatatgatg caaatggtaa gccatttgtg atgcgcggaa ttaaccacgc tcattcctgg    300

tacaagcctc acatagaaac cgcgatggag gcaattgctg atactggagc aaactccatt    360

cgtgtagttc tctcagatgg acaacagtgg accaaagatg atgttgacga agtagcaaaa    420

attatatctt tagcagaaaa acattcttta gttgctgttc ttgaggtaca tgatgcactc    480

ggaacagatg atattgaacc attacttaaa acagtcgatt actggattga gatcaaagat    540

gctttaatcg gaaaagagga caaagtaatt attaacattt ctaatgaatg gtttggttct    600

tggagcagtg aaggttgggc agaaggatat aaaaaagcaa ttcctttact aagagaggcg    660

ggtctaaaac atacacttat ggttgacgca gctgggtggg gacaatttcc tagatctatt    720

catgaaaaag gattagacgt ttttaactca gacccattaa agaatacaat gttttccatt    780

catatgtatg aatgggcagc gggtaatcct caacaagtaa aagacaatat tgacggtgtt    840

cttgaaaaga atttagctgt agtaattggt gagttcggtc atcatcacta cggaagagat    900

gttgctgttg atacgatctt aagtcattca gagaagtatg atgtaggttg gcttgcctgg    960

tcttggcacg gaaatagtgg tggtgtagag tatcttgact tagcaacaga tttttcaggg   1020

acgcaactaa ctgaatgggg agaaagaatt gtgtacggtc cgaatggttt aaaagaaact   1080

tctgaaatcg ttagtgtata caaaaaataa                                    1110
```

<210> SEQ ID NO 36
<211> LENGTH: 369
<212> TYPE: PRT
<213> ORGANISM: Bacillus alcalophilus

<400> SEQUENCE: 36

```
Met Arg Ser Met Lys Leu Leu Phe Ala Met Phe Ile Leu Val Phe Ser
```

-continued

```
1               5                   10                  15

Ser Phe Thr Phe Asn Leu Val Val Ala Gln Ala Ser Gly His Gly Gln
            20                  25                  30

Met His Lys Val Pro Trp Ala Pro Gln Ala Glu Ala Pro Gly Lys Thr
        35                  40                  45

Ala Glu Asn Gly Val Trp Asp Lys Val Arg Asn Asn Pro Gly Lys Ala
    50                  55                  60

Asn Pro Pro Ala Gly Lys Val Asn Gly Phe Tyr Ile Asp Gly Thr Thr
65                  70                  75                  80

Leu Tyr Asp Ala Asn Gly Lys Pro Phe Val Met Arg Gly Ile Asn His
                85                  90                  95

Ala His Ser Trp Tyr Lys Pro His Ile Glu Thr Ala Met Glu Ala Ile
            100                 105                 110

Ala Asp Thr Gly Ala Asn Ser Ile Arg Val Val Leu Ser Asp Gly Gln
        115                 120                 125

Gln Trp Thr Lys Asp Asp Val Asp Glu Val Ala Lys Ile Ile Ser Leu
    130                 135                 140

Ala Glu Lys His Ser Leu Val Ala Val Leu Glu Val His Asp Ala Leu
145                 150                 155                 160

Gly Thr Asp Asp Ile Glu Pro Leu Leu Lys Thr Val Asp Tyr Trp Ile
                165                 170                 175

Glu Ile Lys Asp Ala Leu Ile Gly Lys Glu Asp Lys Val Ile Ile Asn
            180                 185                 190

Ile Ser Asn Glu Trp Phe Gly Ser Trp Ser Ser Glu Gly Trp Ala Glu
        195                 200                 205

Gly Tyr Lys Lys Ala Ile Pro Leu Leu Arg Glu Ala Gly Leu Lys His
    210                 215                 220

Thr Leu Met Val Asp Ala Ala Gly Trp Gly Gln Phe Pro Arg Ser Ile
225                 230                 235                 240

His Glu Lys Gly Leu Asp Val Phe Asn Ser Asp Pro Leu Lys Asn Thr
                245                 250                 255

Met Phe Ser Ile His Met Tyr Glu Trp Ala Ala Gly Asn Pro Gln Gln
            260                 265                 270

Val Lys Asp Asn Ile Asp Gly Val Leu Glu Lys Asn Leu Ala Val Val
        275                 280                 285

Ile Gly Glu Phe Gly His His His Tyr Gly Arg Asp Val Ala Val Asp
    290                 295                 300

Thr Ile Leu Ser His Ser Glu Lys Tyr Asp Val Gly Trp Leu Ala Trp
305                 310                 315                 320

Ser Trp His Gly Asn Ser Gly Gly Val Glu Tyr Leu Asp Leu Ala Thr
                325                 330                 335

Asp Phe Ser Gly Thr Gln Leu Thr Glu Trp Gly Glu Arg Ile Val Tyr
            340                 345                 350

Gly Pro Asn Gly Leu Lys Glu Thr Ser Glu Ile Val Ser Val Tyr Lys
        355                 360                 365

Lys
```

<210> SEQ ID NO 37
<211> LENGTH: 1482
<212> TYPE: DNA
<213> ORGANISM: Bacillus sp.

<400> SEQUENCE: 37

```
atgaaaaaaa agttatcaca gatttatcat ttaattattt gcacacttat aataagtgtg     60
```

```
ggaataatgg ggattacaac gtccccatca gaagcaagtt caggctttta tgttgatggc    120

aatacgttat atgacgcaaa cgggcaacca tttgtcatga aaggcattaa ccatggacat    180

gcttggtata aagacaccgc ttcaacagct attcctgcca ttgcagagca aggcgcgaac    240

acgatacgta ttgttttatc agatggcggt caatgggaaa aagacgacat tgacaccgtt    300

cgtgaagtta ttgagcttgc ggagcaaaat aaaatggtgg ctgtcgttga agttcatgat    360

gccacgggcc gtgattcacg cagtgattta gatcgggcag tcgattattg gatagagatg    420

aaagatgcac ttatcggcaa agaggatact gtcattatta acattgcaaa cgaatggtat    480

ggcagttggg atggcgccgc ttgggctgat ggctacattg atgtcattcc gaagcttcgc    540

gatgccggct taacacacac cttaatggtt gatgcagcag gatgggggca atatccgcaa    600

tctattcatg attacggaca agatgtgttt aatgcagatc cgttaaaaaa tacgatattc    660

tccatccata tgtatgagta tgctggtggt gatgctaaca ctgttagatc aaatattgat    720

agagtcatag atcaagacct tgctctcgta ataggtgagt tcggtcatag acacactgat    780

ggcgatgttg atgaagatac aatccttagt tattctgaag aaactggcac aggatggctc    840

gcttggtctt ggaaaggcaa cagtgccgaa tgggattatt tagacctttc agaagattgg    900

gctggtaacc atttaactga ttggggaaat aggattgtcc acggggcaaa tggcttgcag    960

gaaacctcca aaccatccac cgtatttaca gatgataacg gtggtgcccc tgaaccgcca   1020

actactacta ccttgtatga ctttgaagga agcacacaag ggtggcatgg aagcaacgtg   1080

atgggtggcc cttggtccgt aacagaatgg ggtgcgtcag gcaactactc tttaaagggc   1140

gatgtcaatt taagctcaaa ttcttcacat gaactgtata gtgaacaaag tcgtaatcta   1200

cacggatact ctcagctaaa tgcaaccgtt cgccatgcca attggggaaa tcccggtaat   1260

ggcatgaatg caagacttta cgtgaaaacg ggctctgatt atacatggta tagcggtcct   1320

tttacacgta tcaatagctc caactcaggt acaacgttat cttttgattt aaacaacatc   1380

gaaaatagtc atcatgttag ggaaataggt gtgcaatttt cagctgcaga taatagcagc   1440

ggtcaaactg ctctatacgt tgataatgtt actttaagat aa                      1482
```

<210> SEQ ID NO 38
<211> LENGTH: 493
<212> TYPE: PRT
<213> ORGANISM: Bacillus sp.

<400> SEQUENCE: 38

```
Met Lys Lys Lys Leu Ser Gln Ile Tyr His Leu Ile Ile Cys Thr Leu
1               5                   10                  15

Ile Ile Ser Val Gly Ile Met Gly Ile Thr Thr Ser Pro Ser Glu Ala
            20                  25                  30

Ser Ser Gly Phe Tyr Val Asp Gly Asn Thr Leu Tyr Asp Ala Asn Gly
        35                  40                  45

Gln Pro Phe Val Met Lys Gly Ile Asn His Gly His Ala Trp Tyr Lys
    50                  55                  60

Asp Thr Ala Ser Thr Ala Ile Pro Ala Ile Ala Glu Gln Gly Ala Asn
65                  70                  75                  80

Thr Ile Arg Ile Val Leu Ser Asp Gly Gly Gln Trp Glu Lys Asp Asp
                85                  90                  95

Ile Asp Thr Val Arg Glu Val Ile Glu Leu Ala Glu Gln Asn Lys Met
            100                 105                 110

Val Ala Val Val Glu Val His Asp Ala Thr Gly Arg Asp Ser Arg Ser
```

-continued

```
        115                 120                 125

Asp Leu Asp Arg Ala Val Asp Tyr Trp Ile Glu Met Lys Asp Ala Leu
    130                 135                 140

Ile Gly Lys Glu Asp Thr Val Ile Ile Asn Ile Ala Asn Glu Trp Tyr
145                 150                 155                 160

Gly Ser Trp Asp Gly Ala Ala Trp Ala Asp Gly Tyr Ile Asp Val Ile
                165                 170                 175

Pro Lys Leu Arg Asp Ala Gly Leu Thr His Thr Leu Met Val Asp Ala
            180                 185                 190

Ala Gly Trp Gly Gln Tyr Pro Gln Ser Ile His Asp Tyr Gly Gln Asp
        195                 200                 205

Val Phe Asn Ala Asp Pro Leu Lys Asn Thr Ile Phe Ser Ile His Met
    210                 215                 220

Tyr Glu Tyr Ala Gly Gly Asp Ala Asn Thr Val Arg Ser Asn Ile Asp
225                 230                 235                 240

Arg Val Ile Asp Gln Asp Leu Ala Leu Val Ile Gly Glu Phe Gly His
                245                 250                 255

Arg His Thr Asp Gly Asp Val Asp Glu Asp Thr Ile Leu Ser Tyr Ser
            260                 265                 270

Glu Glu Thr Gly Thr Gly Trp Leu Ala Trp Ser Trp Lys Gly Asn Ser
        275                 280                 285

Ala Glu Trp Asp Tyr Leu Asp Leu Ser Glu Asp Trp Ala Gly Asn His
    290                 295                 300

Leu Thr Asp Trp Gly Asn Arg Ile Val His Gly Ala Asn Gly Leu Gln
305                 310                 315                 320

Glu Thr Ser Lys Pro Ser Thr Val Phe Thr Asp Asp Asn Gly Gly Ala
                325                 330                 335

Pro Glu Pro Pro Thr Thr Thr Thr Leu Tyr Asp Phe Glu Gly Ser Thr
            340                 345                 350

Gln Gly Trp His Gly Ser Asn Val Met Gly Gly Pro Trp Ser Val Thr
        355                 360                 365

Glu Trp Gly Ala Ser Gly Asn Tyr Ser Leu Lys Gly Asp Val Asn Leu
    370                 375                 380

Ser Ser Asn Ser Ser His Glu Leu Tyr Ser Glu Gln Ser Arg Asn Leu
385                 390                 395                 400

His Gly Tyr Ser Gln Leu Asn Ala Thr Val Arg His Ala Asn Trp Gly
                405                 410                 415

Asn Pro Gly Asn Gly Met Asn Ala Arg Leu Tyr Val Lys Thr Gly Ser
            420                 425                 430

Asp Tyr Thr Trp Tyr Ser Gly Pro Phe Thr Arg Ile Asn Ser Ser Asn
        435                 440                 445

Ser Gly Thr Thr Leu Ser Phe Asp Leu Asn Asn Ile Glu Asn Ser His
    450                 455                 460

His Val Arg Glu Ile Gly Val Gln Phe Ser Ala Ala Asp Asn Ser Ser
465                 470                 475                 480

Gly Gln Thr Ala Leu Tyr Val Asp Asn Val Thr Leu Arg
                485                 490


<210> SEQ ID NO 39
<211> LENGTH: 1551
<212> TYPE: DNA
<213> ORGANISM: Bacillus circulans

<400> SEQUENCE: 39
```

```
atggggtggt ttttagtgat tttacgcaag tggttgattg cttttgtcgc atttttactg     60

atgttctcgt ggactggaca acttacgaac aaagcacatg ctgcaagcgg attttatgta    120

agcggtacca aattattgga tgctacagga caaccatttg tgatgcgagg agtcaatcat    180

gcgcacacat ggtataaaga tcaactatcc accgcaatac cagccattgc taaaacaggt    240

gccaacacga tacgtattgt actggcgaat ggacacaaat ggacgcttga tgatgtaaac    300

accgtcaaca atattctcac cctctgtgaa caaaacaaac taattgccgt tttggaagta    360

catgacgcta caggaagcga tagtctttcc gatttagaca acgccgttaa ttactggatt    420

ggtattaaaa gcgcgttgat cggcaaggaa gaccgtgtaa tcattaatat agctaacgag    480

tggtacggaa catgggatgg agtcgcctgg gctaatggtt ataagcaagc catacccaaa    540

ctgcgtaatg ctggtctaac tcatacgctg attgttgact ccgctggatg gggacaatat    600

ccagattcgg tcaaaaatta tgggacagaa gtactgaatg cagacccgtt aaaaaacaca    660

gtattctcta tccatatgta tgaatatgct gggggcaatg caagtaccgt caaatccaat    720

attgacggtg tgctgaacaa gaatcttgca ctgattatcg gcgaatttgg tggacaacat    780

acaaacggtg atgtggatga agccaccatt atgagttatt cccaagagaa gggagtcggc    840

tggttggctt ggtcctggaa gggaaatagc agtgatttgg cttatctcga tatgacaaat    900

gattgggctg gtaactccct cacctcgttc ggtaataccg tagtgaatgg cagtaacggc    960

attaaagcaa cttctgtgtt atccggcatt tttggaggtg ttacgccaac ctcaagccct   1020

acttctacac ctacatctac gccaacctca actcctactc ctacgccaag tccgaccccg   1080

agtccaggta ataacgggac gatcttatat gatttcgaaa caggaactca aggctggtcg   1140

ggaaacaata tttcgggagg cccatgggtc accaatgaat ggaaagcaac gggagcgcaa   1200

actctcaaag ccgatgtctc cttacaatcc aattccacgc atagtctata tataacctct   1260

aatcaaaatc tgtctggaaa aagcagtctg aaagcaacgg ttaagcatgc gaactggggc   1320

aatatcggca acgggattta tgcaaaacta tacgtaaaga ccgggtccgg gtggacatgg   1380

tacgattccg gagagaatct gattcagtca aacgacggta ccattttgac actatccctc   1440

agcggcattt cgaatttgtc ctcagtcaaa gaaattgggg tagaattccg cgcctcctca   1500

aacagtagtg gccaatcagc tatttatgta gatagtgtta gtctgcaata a            1551
```

<210> SEQ ID NO 40
<211> LENGTH: 516
<212> TYPE: PRT
<213> ORGANISM: Bacillus circulans

<400> SEQUENCE: 40

```
Met Gly Trp Phe Leu Val Ile Leu Arg Lys Trp Leu Ile Ala Phe Val
1               5                   10                  15

Ala Phe Leu Leu Met Phe Ser Trp Thr Gly Gln Leu Thr Asn Lys Ala
            20                  25                  30

His Ala Ala Ser Gly Phe Tyr Val Ser Gly Thr Lys Leu Leu Asp Ala
        35                  40                  45

Thr Gly Gln Pro Phe Val Met Arg Gly Val Asn His Ala His Thr Trp
    50                  55                  60

Tyr Lys Asp Gln Leu Ser Thr Ala Ile Pro Ala Ile Ala Lys Thr Gly
65                  70                  75                  80

Ala Asn Thr Ile Arg Ile Val Leu Ala Asn Gly His Lys Trp Thr Leu
                85                  90                  95

Asp Asp Val Asn Thr Val Asn Asn Ile Leu Thr Leu Cys Glu Gln Asn
```

-continued

```
            100                 105                 110

Lys Leu Ile Ala Val Leu Glu Val His Asp Ala Thr Gly Ser Asp Ser
        115                 120                 125

Leu Ser Asp Leu Asp Asn Ala Val Asn Tyr Trp Ile Gly Ile Lys Ser
    130                 135                 140

Ala Leu Ile Gly Lys Glu Asp Arg Val Ile Ile Asn Ile Ala Asn Glu
145                 150                 155                 160

Trp Tyr Gly Thr Trp Asp Gly Val Ala Trp Ala Asn Gly Tyr Lys Gln
                165                 170                 175

Ala Ile Pro Lys Leu Arg Asn Ala Gly Leu Thr His Thr Leu Ile Val
            180                 185                 190

Asp Ser Ala Gly Trp Gly Gln Tyr Pro Asp Ser Val Lys Asn Tyr Gly
        195                 200                 205

Thr Glu Val Leu Asn Ala Asp Pro Leu Lys Asn Thr Val Phe Ser Ile
    210                 215                 220

His Met Tyr Glu Tyr Ala Gly Gly Asn Ala Ser Thr Val Lys Ser Asn
225                 230                 235                 240

Ile Asp Gly Val Leu Asn Lys Asn Leu Ala Leu Ile Ile Gly Glu Phe
                245                 250                 255

Gly Gly Gln His Thr Asn Gly Asp Val Asp Glu Ala Thr Ile Met Ser
            260                 265                 270

Tyr Ser Gln Glu Lys Gly Val Gly Trp Leu Ala Trp Ser Trp Lys Gly
        275                 280                 285

Asn Ser Ser Asp Leu Ala Tyr Leu Asp Met Thr Asn Asp Trp Ala Gly
    290                 295                 300

Asn Ser Leu Thr Ser Phe Gly Asn Thr Val Val Asn Gly Ser Asn Gly
305                 310                 315                 320

Ile Lys Ala Thr Ser Val Leu Ser Gly Ile Phe Gly Gly Val Thr Pro
                325                 330                 335

Thr Ser Ser Pro Thr Ser Thr Pro Thr Ser Thr Pro Thr Ser Thr Pro
            340                 345                 350

Thr Pro Thr Pro Ser Pro Thr Pro Ser Pro Gly Asn Asn Gly Thr Ile
        355                 360                 365

Leu Tyr Asp Phe Glu Thr Gly Thr Gln Gly Trp Ser Gly Asn Asn Ile
    370                 375                 380

Ser Gly Gly Pro Trp Val Thr Asn Glu Trp Lys Ala Thr Gly Ala Gln
385                 390                 395                 400

Thr Leu Lys Ala Asp Val Ser Leu Gln Ser Asn Ser Thr His Ser Leu
                405                 410                 415

Tyr Ile Thr Ser Asn Gln Asn Leu Ser Gly Lys Ser Ser Leu Lys Ala
            420                 425                 430

Thr Val Lys His Ala Asn Trp Gly Asn Ile Gly Asn Gly Ile Tyr Ala
        435                 440                 445

Lys Leu Tyr Val Lys Thr Gly Ser Gly Trp Thr Trp Tyr Asp Ser Gly
    450                 455                 460

Glu Asn Leu Ile Gln Ser Asn Asp Gly Thr Ile Leu Thr Leu Ser Leu
465                 470                 475                 480

Ser Gly Ile Ser Asn Leu Ser Ser Val Lys Glu Ile Gly Val Glu Phe
                485                 490                 495

Arg Ala Ser Ser Asn Ser Ser Gly Gln Ser Ala Ile Tyr Val Asp Ser
            500                 505                 510

Val Ser Leu Gln
        515
```

<210> SEQ ID NO 41
<211> LENGTH: 984
<212> TYPE: DNA
<213> ORGANISM: Paenibacillus sp.

<400> SEQUENCE: 41
atgagacaac ttttagcaaa aggtatttta gctgcactgg tcatgatgtt agcgatgtat 60
ggattgggga atctctcttc taaagcttcg gctgcaacag gtttttatgt aagcggtacc 120
actctatatg attctactgg taaacctttt gtaatgcgcg gtgtcaatca ttcgcatacc 180
tggttcaaaa atgatctaaa tgcagccatc cctgctattg ccaaaacagg tgcaaataca 240
gtacgtatcg ttttatctaa tggtgttcag tatactagag atgatgtaaa ctcagtcaaa 300
aatattattt ccctggttaa ccaaaacaaa atgattgctg ttcttgaggt gcatgatgct 360
accggtaaag acgattacgc ttctcttgat gccgctgtaa actactggat cagcatcaaa 420
gatgccttga ttggcaagga agatcgagtc attgttaata ttgccaatga atggtacggt 480
acatggaatg gcagtgcttg ggcagatggt tataagcagg ctattcccaa actaagaaat 540
gcaggcatca aaaacacttt aatcgttgat gccgccggct ggggacaatg tcctcaatcg 600
atcgttgatt acgggcaaag tgtatttgca gcagattcgc ttaaaaatac aatttctct 660 attcacatgt atgaatatgc aggcggtaca gatgcgatcg tcaaaagcaa tatggaaaat 720
gtactgaaca aaggacttcc tttgatcatc ggtgaatttg gcgggcagca tacaaacggc 780
gatgtagatg aacatgcaat tatgcgttat ggtcagcaaa aaggtgtagg ttggctggca 840
tggtcgtggt atggcaacaa tagtgaactc agttatctgg atttggctac aggtcccgcc 900
ggtagtctga caagtatcgg caatacgatt gtaaatgatc catatggtat caaagctacc 960
tcgaaaaaag cgggtatctt ctaa 984

<210> SEQ ID NO 42
<211> LENGTH: 327
<212> TYPE: PRT
<213> ORGANISM: Paenibacillus sp.

<400> SEQUENCE: 42

Met Arg Gln Leu Leu Ala Lys Gly Ile Leu Ala Ala Leu Val Met Met
1 5 10 15

Leu Ala Met Tyr Gly Leu Gly Asn Leu Ser Ser Lys Ala Ser Ala Ala
20 25 30

Thr Gly Phe Tyr Val Ser Gly Thr Thr Leu Tyr Asp Ser Thr Gly Lys
35 40 45

Pro Phe Val Met Arg Gly Val Asn His Ser His Thr Trp Phe Lys Asn
50 55 60

Asp Leu Asn Ala Ala Ile Pro Ala Ile Ala Lys Thr Gly Ala Asn Thr
65 70 75 80

Val Arg Ile Val Leu Ser Asn Gly Val Gln Tyr Thr Arg Asp Asp Val
85 90 95

Asn Ser Val Lys Asn Ile Ile Ser Leu Val Asn Gln Asn Lys Met Ile
100 105 110

Ala Val Leu Glu Val His Asp Ala Thr Gly Lys Asp Asp Tyr Ala Ser
115 120 125

Leu Asp Ala Ala Val Asn Tyr Trp Ile Ser Ile Lys Asp Ala Leu Ile
130 135 140

Gly Lys Glu Asp Arg Val Ile Val Asn Ile Ala Asn Glu Trp Tyr Gly

-continued

```
145                 150                 155                 160

Thr Trp Asn Gly Ser Ala Trp Ala Asp Gly Tyr Lys Gln Ala Ile Pro
                165                 170                 175

Lys Leu Arg Asn Ala Gly Ile Lys Asn Thr Leu Ile Val Asp Ala Ala
            180                 185                 190

Gly Trp Gly Gln Cys Pro Gln Ser Ile Val Asp Tyr Gly Gln Ser Val
        195                 200                 205

Phe Ala Ala Asp Ser Leu Lys Asn Thr Ile Phe Ser Ile His Met Tyr
    210                 215                 220

Glu Tyr Ala Gly Gly Thr Asp Ala Ile Val Lys Ser Asn Met Glu Asn
225                 230                 235                 240

Val Leu Asn Lys Gly Leu Pro Leu Ile Ile Gly Glu Phe Gly Gly Gln
                245                 250                 255

His Thr Asn Gly Asp Val Asp Glu His Ala Ile Met Arg Tyr Gly Gln
            260                 265                 270

Gln Lys Gly Val Gly Trp Leu Ala Trp Ser Trp Tyr Gly Asn Asn Ser
        275                 280                 285

Glu Leu Ser Tyr Leu Asp Leu Ala Thr Gly Pro Ala Gly Ser Leu Thr
    290                 295                 300

Ser Ile Gly Asn Thr Ile Val Asn Asp Pro Tyr Gly Ile Lys Ala Thr
305                 310                 315                 320

Ser Lys Lys Ala Gly Ile Phe
                325
```

<210> SEQ ID NO 43
<211> LENGTH: 981
<212> TYPE: DNA
<213> ORGANISM: Bacillus circulans

<400> SEQUENCE: 43

```
atggccaagt tgcaaaaggg tacaatctta acagtcattg cagcactgat gtttgtcatt      60

ttggggagcg cggcgcccaa agccgcagca gctacaggtt tttacgtgaa tggaggcaaa     120

ttgtacgatt ctacgggtaa accattttac atgaggggta tcaatcatgg gcactcctgg     180

tttaaaaatg atttgaacac ggctatccct gcgatcgcaa aaacgggtgc caatacggta     240

cgaattgttt tatcaaacgg tacacaatac accaaggatg atctgaattc cgtaaaaaac     300

atcattaatg tcgtaaatgc aaacaagatg attgctgtgc ttgaagtaca cgatgccact     360

gggaaagatg acttcaactc gttggatgca gcggtcaact actggataag catcaaagaa     420

gcactgatcg ggaaggaaga tcgggttatt gtaaacattg caaacgagtg gtacggaaca     480

tggaacggaa gcgcgtgggc tgacgggtac aaaaaagcta ttccgaaatt aagagatgcg     540

ggtattaaaa ataccttgat tgtagatgca gcaggctggg gtcagtaccc tcaatcgatc     600

gtcgattacg gacaaagcgt attcgccgcg gattcacaga aaaatacggc gttttccatt     660

cacatgtatg agtatgcagg caaggatgcg gccaccgtca aatccaatat ggaaaatgtg     720

ctgaataagg ggctggcctt aatcattggt gagttcggag gatatcacac caatggagat     780

gtcgatgaat atgcaatcat gaaatatggt ctggaaaaag gggtaggatg gcttgcatgg     840

tcttggtacg gtaatagctc tggattaaac tatcttgatt tggcaacagg acctaacggc     900

agtttgacga gctatggtaa tacggttgtc aatgatactt acggaattaa aaatacgtcc     960

caaaaagcgg gaatctttta a                                                981
```

<210> SEQ ID NO 44

<211> LENGTH: 326
<212> TYPE: PRT
<213> ORGANISM: Bacillus circulans

<400> SEQUENCE: 44

```
Met Ala Lys Leu Gln Lys Gly Thr Ile Leu Thr Val Ile Ala Ala Leu
1               5                   10                  15

Met Phe Val Ile Leu Gly Ser Ala Ala Pro Lys Ala Ala Ala Ala Thr
            20                  25                  30

Gly Phe Tyr Val Asn Gly Gly Lys Leu Tyr Asp Ser Thr Gly Lys Pro
        35                  40                  45

Phe Tyr Met Arg Gly Ile Asn His Gly His Ser Trp Phe Lys Asn Asp
    50                  55                  60

Leu Asn Thr Ala Ile Pro Ala Ile Ala Lys Thr Gly Ala Asn Thr Val
65                  70                  75                  80

Arg Ile Val Leu Ser Asn Gly Thr Gln Tyr Thr Lys Asp Asp Leu Asn
                85                  90                  95

Ser Val Lys Asn Ile Ile Asn Val Val Asn Ala Asn Lys Met Ile Ala
            100                 105                 110

Val Leu Glu Val His Asp Ala Thr Gly Lys Asp Asp Phe Asn Ser Leu
        115                 120                 125

Asp Ala Ala Val Asn Tyr Trp Ile Ser Ile Lys Glu Ala Leu Ile Gly
    130                 135                 140

Lys Glu Asp Arg Val Ile Val Asn Ile Ala Asn Glu Trp Tyr Gly Thr
145                 150                 155                 160

Trp Asn Gly Ser Ala Trp Ala Asp Gly Tyr Lys Lys Ala Ile Pro Lys
                165                 170                 175

Leu Arg Asp Ala Gly Ile Lys Asn Thr Leu Ile Val Asp Ala Ala Gly
            180                 185                 190

Trp Gly Gln Tyr Pro Gln Ser Ile Val Asp Tyr Gly Gln Ser Val Phe
        195                 200                 205

Ala Ala Asp Ser Gln Lys Asn Thr Ala Phe Ser Ile His Met Tyr Glu
    210                 215                 220

Tyr Ala Gly Lys Asp Ala Ala Thr Val Lys Ser Asn Met Glu Asn Val
225                 230                 235                 240

Leu Asn Lys Gly Leu Ala Leu Ile Ile Gly Glu Phe Gly Gly Tyr His
                245                 250                 255

Thr Asn Gly Asp Val Asp Glu Tyr Ala Ile Met Lys Tyr Gly Leu Glu
            260                 265                 270

Lys Gly Val Gly Trp Leu Ala Trp Ser Trp Tyr Gly Asn Ser Ser Gly
        275                 280                 285

Leu Asn Tyr Leu Asp Leu Ala Thr Gly Pro Asn Gly Ser Leu Thr Ser
    290                 295                 300

Tyr Gly Asn Thr Val Val Asn Asp Thr Tyr Gly Ile Lys Asn Thr Ser
305                 310                 315                 320

Gln Lys Ala Gly Ile Phe
                325
```

<210> SEQ ID NO 45
<211> LENGTH: 1110
<212> TYPE: DNA
<213> ORGANISM: Bacillus nealsonii

<400> SEQUENCE: 45

```
atggttgtga aaaaattatc aagttttatt ctaattttac tgttagttac ttctgctttg     60
```

-continued

```
tttattactg attcaaaagc aagtgctgct tcgggatttt atgtaagcgg taccacttta    120

tatgatgcaa cgggtaaacc gtttactatg agaggtgtaa atcatgctca ttcttggttt    180

aaagaagatt cagcagctgc tattccagca atagcagcaa ctggagcaaa cacagtaaga    240

attgttttat ctgatggtgg acaatacacc aaagatgata ttaatactgt taaaagcctt    300

ttgtcattgg cagaaaaaat aaacttgcat tctggagtca tgacgcacag aaaagacgat    360

gtggaatctt taaatcgtgc agtcgattat tggatcagct taaaagacac attgataggc    420

aaagaagata aagtgataat aaacattgcg aatgaatggt atggtacttg ggatggtgcg    480

gcatgggcag ctggttataa acaagctatt ccaaagttac ggaatgcagg cttaaatcat    540

actctaataa ttgattctgc tggatgggga caatacccag cttccattca taattatgga    600

aaagaggtat ttaatgcgga tccattgaaa aatacaatgt tctccataca tatgtatgag    660

tacgctggtg gggatgcagc aactgttaag tcaaatattg atggtgtctt aaaccaagga    720

ttagctttaa taataggaga gtttggacaa aaacatacaa atggagatgt agatgaagca    780

accatcatga gttattcaca gcaaaaaaat atcggttggc ttgcatggtc ttggaaagga    840

aatagcacag attggagcta tctggattta agcaacgatt ggtctggtaa cagtttaact    900

gattggggta atacggttgt taatggggca aatgggttaa aagccacttc aaaactaagc    960

ggagtattcg gtagctcagc aggaacaaat aatatattgt atgattttga aagcggtaat   1020

caaaactgga ctggatcaaa tatcgcgggt ggaccttgga acgaattcaa gcttgatatc   1080

attcaggacg agcctcagac tccagcgtaa                                    1110
```

<210> SEQ ID NO 46
<211> LENGTH: 369
<212> TYPE: PRT
<213> ORGANISM: Bacillus nealsonii

<400> SEQUENCE: 46

```
Met Val Val Lys Lys Leu Ser Ser Phe Ile Leu Ile Leu Leu Leu Val
1               5                   10                  15

Thr Ser Ala Leu Phe Ile Thr Asp Ser Lys Ala Ser Ala Ala Ser Gly
            20                  25                  30

Phe Tyr Val Ser Gly Thr Thr Leu Tyr Asp Ala Thr Gly Lys Pro Phe
        35                  40                  45

Thr Met Arg Gly Val Asn His Ala His Ser Trp Phe Lys Glu Asp Ser
    50                  55                  60

Ala Ala Ala Ile Pro Ala Ile Ala Ala Thr Gly Ala Asn Thr Val Arg
65                  70                  75                  80

Ile Val Leu Ser Asp Gly Gly Gln Tyr Thr Lys Asp Asp Ile Asn Thr
                85                  90                  95

Val Lys Ser Leu Leu Ser Leu Ala Glu Lys Ile Asn Leu His Ser Gly
            100                 105                 110

Val Met Thr His Arg Lys Asp Asp Val Glu Ser Leu Asn Arg Ala Val
        115                 120                 125

Asp Tyr Trp Ile Ser Leu Lys Asp Thr Leu Ile Gly Lys Glu Asp Lys
    130                 135                 140

Val Ile Ile Asn Ile Ala Asn Glu Trp Tyr Gly Thr Trp Asp Gly Ala
145                 150                 155                 160

Ala Trp Ala Ala Gly Tyr Lys Gln Ala Ile Pro Lys Leu Arg Asn Ala
                165                 170                 175

Gly Leu Asn His Thr Leu Ile Ile Asp Ser Ala Gly Trp Gly Gln Tyr
            180                 185                 190
```

-continued

```
Pro Ala Ser Ile His Asn Tyr Gly Lys Glu Val Phe Asn Ala Asp Pro
        195                 200                 205

Leu Lys Asn Thr Met Phe Ser Ile His Met Tyr Glu Tyr Ala Gly Gly
    210                 215                 220

Asp Ala Ala Thr Val Lys Ser Asn Ile Asp Gly Val Leu Asn Gln Gly
225                 230                 235                 240

Leu Ala Leu Ile Ile Gly Glu Phe Gly Gln Lys His Thr Asn Gly Asp
                245                 250                 255

Val Asp Glu Ala Thr Ile Met Ser Tyr Ser Gln Gln Lys Asn Ile Gly
            260                 265                 270

Trp Leu Ala Trp Ser Trp Lys Gly Asn Ser Thr Asp Trp Ser Tyr Leu
        275                 280                 285

Asp Leu Ser Asn Asp Trp Ser Gly Asn Ser Leu Thr Asp Trp Gly Asn
    290                 295                 300

Thr Val Val Asn Gly Ala Asn Gly Leu Lys Ala Thr Ser Lys Leu Ser
305                 310                 315                 320

Gly Val Phe Gly Ser Ser Ala Gly Thr Asn Asn Ile Leu Tyr Asp Phe
                325                 330                 335

Glu Ser Gly Asn Gln Asn Trp Thr Gly Ser Asn Ile Ala Gly Gly Pro
            340                 345                 350

Trp Asn Glu Phe Lys Leu Asp Ile Ile Gln Asp Glu Pro Gln Thr Pro
        355                 360                 365

Ala
```

<210> SEQ ID NO 47
<211> LENGTH: 984
<212> TYPE: DNA
<213> ORGANISM: Bacillus circulans

<400> SEQUENCE: 47

```
atgatgttga tatggatgca gggatggaag tctattctag tcgcgatctt ggcgtgtgtg      60

tcagtaggcg gtgggcttcc tagtccagaa gcagccacag gattttatgt aaacggtacc     120

aagctgtatg attcaacggg caaggccttt gtgatgaggg gtgtaaatca tccccacacc     180

tggtacaaga atgatctgaa cgcggctatt ccggctatcg cgcaaacggg agccaatacc     240

gtacgagtcg tcttgtcgaa cgggtcgcaa tggaccaagg atgacctgaa ctccgtcaac     300

agtatcatct cgctggtgtc gcagcatcaa atgatagccg ttctggaggt gcatgatgcg     360

acaggcaaag atgagtatgc ttcccttgaa gcggccgtcg actattggat cagcatcaaa     420

ggggcattga tcggaaaaga agaccgcgtc atcgtcaata ttgctaatga atggtatgga     480

aattggaaca gcagcggatg ggccgatggt tataagcagg ccattcccaa attaagaaac     540

gcgggcatta agaatacgtt gatcgttgat gcagcgggat gggggcaata cccgcaatcc     600

atcgtggatg agggggccgc ggtatttgct tccgatcaac tgaagaatac ggtattctcc     660

atccatatgt atgagtatgc cggtaaggat gccgctacgg tgaaaacgaa tatggacgat     720

gttttaaaca aaggattgcc tttaatcatt ggggagttcg gcggctatca tcaaggtgcc     780

gatgtcgatg agattgctat tatgaagtac ggacagcaga aggaagtggg ctggctggct     840

tggtcctggt acggaaacag cccggagctg aacgatttgg atctggctgc agggccaagc     900

ggaaacctga ccggctgggg aaacacggtg gttcatggaa ccgacgggat tcagcaaacc     960

tccaagaaag cgggcattta ttaa                                            984
```

-continued

```
<210> SEQ ID NO 48
<211> LENGTH: 327
<212> TYPE: PRT
<213> ORGANISM: Bacillus circulans

<400> SEQUENCE: 48

Met Met Leu Ile Trp Met Gln Gly Trp Lys Ser Ile Leu Val Ala Ile
1               5                   10                  15

Leu Ala Cys Val Ser Val Gly Gly Gly Leu Pro Ser Pro Glu Ala Ala
            20                  25                  30

Thr Gly Phe Tyr Val Asn Gly Thr Lys Leu Tyr Asp Ser Thr Gly Lys
        35                  40                  45

Ala Phe Val Met Arg Gly Val Asn His Pro His Thr Trp Tyr Lys Asn
    50                  55                  60

Asp Leu Asn Ala Ala Ile Pro Ala Ile Ala Gln Thr Gly Ala Asn Thr
65                  70                  75                  80

Val Arg Val Val Leu Ser Asn Gly Ser Gln Trp Thr Lys Asp Asp Leu
                85                  90                  95

Asn Ser Val Asn Ser Ile Ile Ser Leu Val Ser Gln His Gln Met Ile
            100                 105                 110

Ala Val Leu Glu Val His Asp Ala Thr Gly Lys Asp Glu Tyr Ala Ser
        115                 120                 125

Leu Glu Ala Ala Val Asp Tyr Trp Ile Ser Ile Lys Gly Ala Leu Ile
    130                 135                 140

Gly Lys Glu Asp Arg Val Ile Val Asn Ile Ala Asn Glu Trp Tyr Gly
145                 150                 155                 160

Asn Trp Asn Ser Ser Gly Trp Ala Asp Gly Tyr Lys Gln Ala Ile Pro
                165                 170                 175

Lys Leu Arg Asn Ala Gly Ile Lys Asn Thr Leu Ile Val Asp Ala Ala
            180                 185                 190

Gly Trp Gly Gln Tyr Pro Gln Ser Ile Val Asp Glu Gly Ala Ala Val
        195                 200                 205

Phe Ala Ser Asp Gln Leu Lys Asn Thr Val Phe Ser Ile His Met Tyr
    210                 215                 220

Glu Tyr Ala Gly Lys Asp Ala Ala Thr Val Lys Thr Asn Met Asp Asp
225                 230                 235                 240

Val Leu Asn Lys Gly Leu Pro Leu Ile Ile Gly Glu Phe Gly Gly Tyr
                245                 250                 255

His Gln Gly Ala Asp Val Asp Glu Ile Ala Ile Met Lys Tyr Gly Gln
            260                 265                 270

Gln Lys Glu Val Gly Trp Leu Ala Trp Ser Trp Tyr Gly Asn Ser Pro
        275                 280                 285

Glu Leu Asn Asp Leu Asp Leu Ala Ala Gly Pro Ser Gly Asn Leu Thr
    290                 295                 300

Gly Trp Gly Asn Thr Val Val His Gly Thr Asp Gly Ile Gln Gln Thr
305                 310                 315                 320

Ser Lys Lys Ala Gly Ile Tyr
                325
```